United States Patent [19]
Rostoker et al.

[11] Patent Number: 6,026,088
[45] Date of Patent: Feb. 15, 2000

[54] NETWORK ARCHITECTURE

[75] Inventors: Michael D. Rostoker, Boulder Creek; John P. Daane, Saratoga; Sanjay Desai, Sunnyvale; D. Tony Stelliga, Pleasanton, all of Calif.

[73] Assignee: LSI Logic Corporation, Milpitas, Calif.

[21] Appl. No.: 08/412,536

[22] Filed: Mar. 28, 1995

Related U.S. Application Data

[63] Continuation-in-part of application No. 08/389,601, Feb. 16, 1995, Pat. No. 5,708,659, which is a continuation-in-part of application No. 08/354,682, Dec. 8, 1994, which is a continuation-in-part of application No. 08/139,551, Oct. 20, 1993, Pat. No. 5,446,726.

[51] Int. Cl.[7] .............................. H04L 12/40; H04L 12/56
[52] U.S. Cl. ......................... 370/395; 370/402; 370/466; 370/474
[58] Field of Search ........................... 364/514 R, 514 A, 364/514 C; 395/200.02, 200.2, 285, 309, 311, 500, 800; 370/357, 360, 395, 396, 400, 401, 402, 403, 404, 405, 406, 407, 408, 410, 419, 420, 421, 465, 466, 467, 474, 522

[56] References Cited

U.S. PATENT DOCUMENTS

| | | | |
|---|---|---|---|
| 4,771,286 | 9/1988 | Niessen et al. | 370/402 |
| 4,939,724 | 7/1990 | Ebersole | 370/85.15 |
| 5,072,442 | 12/1991 | Todd | 370/62 |
| 5,157,662 | 10/1992 | Tadamura | 370/110.1 |
| 5,214,650 | 5/1993 | Renner | 370/110.1 |
| 5,229,994 | 7/1993 | Balzano et al. | 370/85.13 |
| 5,315,582 | 5/1994 | Morizono et al. | 370/404 |
| 5,340,978 | 8/1994 | Rostoker et al. | 250/208.1 |
| 5,418,838 | 5/1995 | Havermans et al. | 379/60 |
| 5,557,745 | 9/1996 | Perlman et al. | 395/200.02 |

Primary Examiner—Alpus H. Hsu

[57] ABSTRACT

A digital network system accommodates a plurality of network protocols. The digital network system includes a backbone bus for communicating digital information. A first switching interface unit is coupled to the backbone bus and has at least one port connected to a first network. A second switching interface unit is also coupled to the backbone bus and has at least one port connected to a second network. The first and second interface units transferring digital information in first and second network protocols, respectively. First and second memories are coupled to the backbone bus and to the first and second switching interface units, respectively, and store digital information to be transferred between the switching interface units via the backbone bus. The first switching interface unit and the first memory are formed on a single substrate, and the second switching interface unit and the second memory are formed on a single substrate. A controller is coupled to the backbone bus and controls the transfer of digital information from the first switching interface unit to the second switching interface unit.

1 Claim, 45 Drawing Sheets

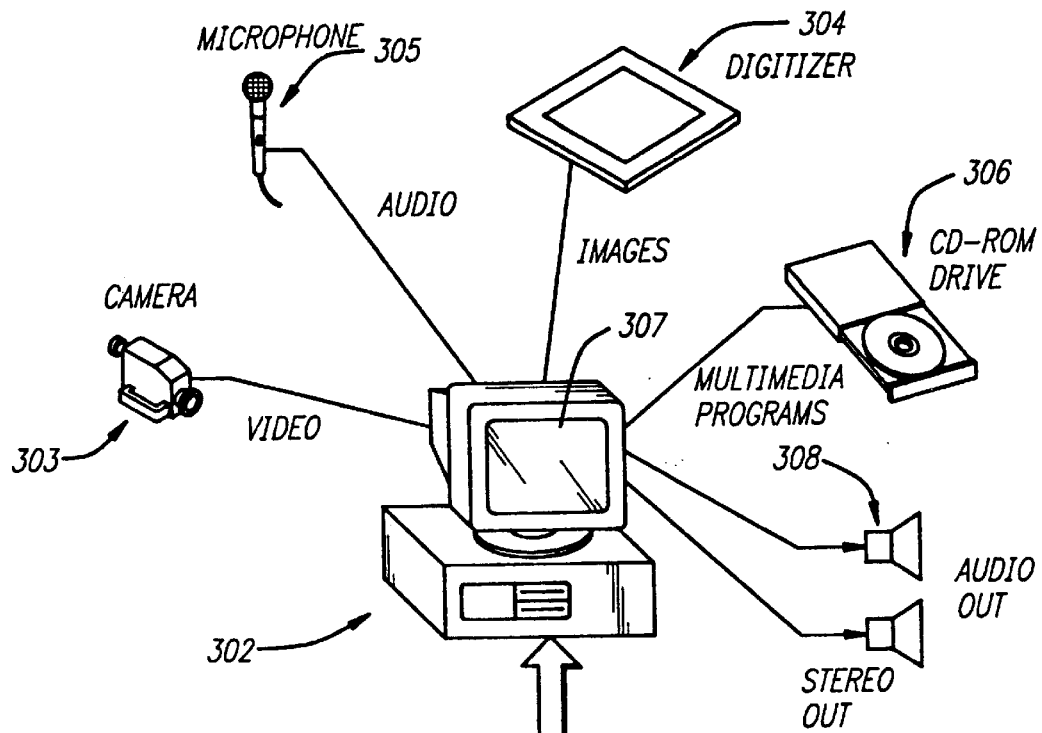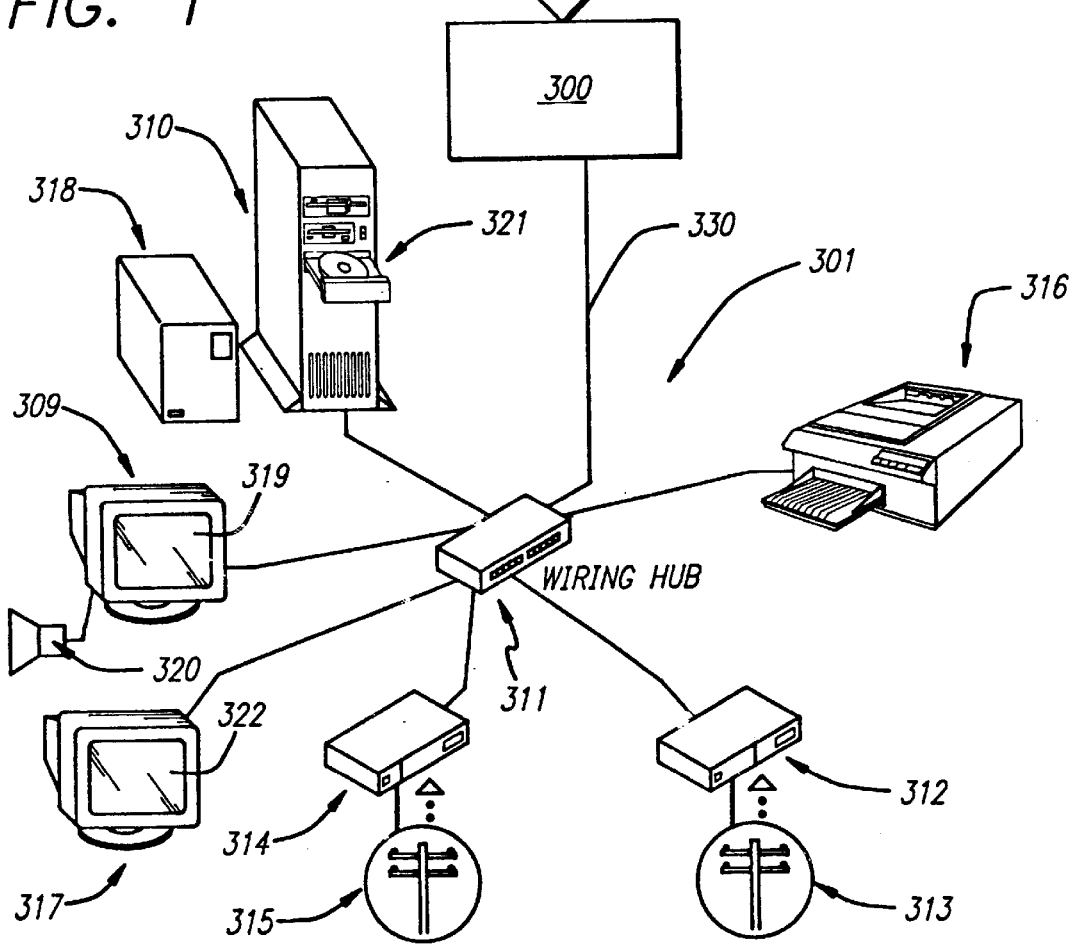
FIG. 1

| 32 BITS | 32 BITS |
|---|---|
| 0x0000 0x0003 RECEIVED CELL HOLDER 1 0x003C 0x003F | TRANSMIT CELL BUILDER 1 |
| 0x0040 0x0043 RECEIVED CELL HOLDER 2 0x007C 0x007F | TRANSMIT CELL BUILDER 2 |
| RECEIVED CELL HOLDER 3 | TRANSMIT CELL BUILDER 3 |
| RECEIVED CELL HOLDER 4 | TRANSMIT CELL BUILDER 4 |
| RECEIVED CELL HOLDER 5 | TRANSMIT VC/CS-PDU 1 |
| | TRANSMIT VC/CS-PDU 2 |
| ⋮ | ⋮ |
| | TRANSMIT VC/CS-PDU 31 |
| | TRANSMIT VC/CS-PDU 32 |
| | RECEIVE VC/CS-PDU 1 |
| | RECEIVE VC/CS-PDU 2 |
| | ⋮ |
| | RECEIVE VC/CS-PDU 31 |
| ⋮ | RECEIVE VC/CS-PDU 32 |
| RECEIVED CELL HOLDER 31 | FREE SPACE FOR GROUP TABLE |
| 0x07C0 0x07C3 RECEIVED CELL HOLDER 32 0x07FC 0x07FF | IDLE CELL HOLDER |

*FIG. 23A*

AAL5 RECEIVE CELL HOLDER & TRANSMIT CELL BUILDER

| | |
|---|---|
| 0x0000 0x0004 0x0008 0x000C | NOT USED |
| | ATM HEADER |
| ⋮ 0x0034 0x0038 0x003C | PAYLOAD |

*FIG. 23B*

AAL5 TRANSMIT CHANNEL PARAMETER ENTRY

| NEXT CPE |
|---|
| CRC32 PARTIAL RESULT |
| NEXT DMA ADDRESS |
| BYTES LEFT \| TOTAL BYTES |
| ATM HEADER |
| CS-PDU STARTING ADDRESS |
| PREVIOUS CPE |
| GROUP NUMBER |

*FIG. 23C*

AAL5 RECEIVE CHANNEL PARAMETER ENTRY

| CS-PDU STARTING ADDRESS |
|---|
| CRC32 PARTIAL RESULT |
| NEXT DMA ADDRESS |
| CRC32 FINAL RESULT |

*FIG. 23D*

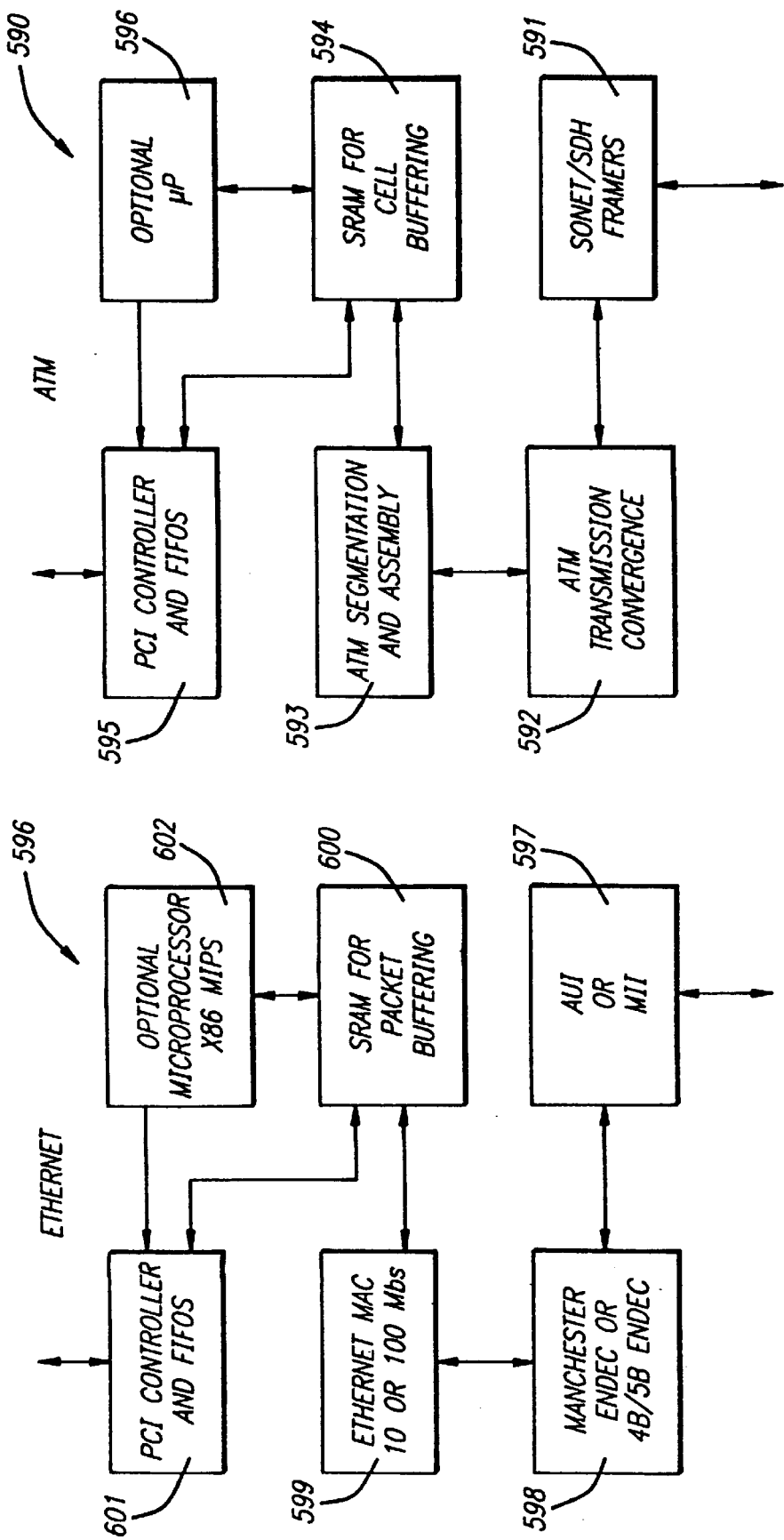

NETWORK ARCHITECTURE

CROSS-REFERENCE TO RELATED APPLICATIONS

This application is a continuation-in-part of application Ser. No. 08/389,601, filed Feb. 16, 1995, now U.S. Pat. No. 5,708,659 by Michael D. Rostoker, et al., entitled "Method for Hashing in a Packet Network Switching System," which was a continuation-in-part of application Ser. No. 08/354,682, filed Dec. 8, 1994, by Michael D. Rostoker, et al., entitled "High Speed Single Chip Digital Video Network Apparatus," which was a continuation-in-part of application Ser. No. 08/139,551, filed Oct. 20, 1993, by Michael D. Rostoker, et al., now U.S. Pat. No. 5,446,726, issused Aug. 29, 1995, the entirety of which is incorporated herein by reference. This application discloses subject matter related to application Ser. No. 08/139,997, filed Oct. 20, 1993, now U.S. Pat. No. 5,668,809, by Michael D. Rostoker, et al.; application Ser. No. 08/139,998, filed Oct. 20, 1993, now abandoned, by Michael D. Rostoker, et al.; application Ser. No. 08/139,999, filed Oct. 20, 1993, now abandoned, by Michael D. Rostoker, et al.; application Ser. No. 08/141,194, filed Oct. 21, 1993, now U.S. Pat. No. 5,625,825 by Michael D. Rostoker, et al.; and the entire disclosures of all of these applications are incorporated herein by reference.

BACKGROUND OF THE INVENTION

Efforts to improve the networking of digital computers and the transmission of digital data have been the object of significant research and development in the past. Networking allows computers to share resources, access huge stores of information, communicate via e-mail, share data, and transfer files.

Networking technology and digital data transmission have been subject to a number of bandwidth and speed limitations.

In the past, networking technology has suffered from limitations on data transmission rates which limit the bandwidth of the system. For example, local area networks (LANs) may be connected with cables that have finite limitations on the amount of data they can pass, and the speed at which it can be done. LAN's may be connected to extended wide area networks (WAN's) over transmission lines that have bandwidth limitations. When modems are required for communication over conventional telephone lines, severe limitations may be imposed upon data transmission rates.

In order for a network to accommodate a number of users efficiently, routing and flow control procedures have to be established. There are many rules that must be followed, and these rules are typically referred to as protocols. Packet-switched networks subdivide digital data messages into packets. The digital data is then transmitted packet by packet. Each packet must contain not only the information bits comprising the digital data that is to be transmitted, but also information bits which are overhead required by the protocol in use, such as information bits which identify the destination of the packet, the source of the packet, and synchronization bits. Overhead bits typically appear in a header and trailer to each packet. In addition, acknowledgement packets must be transmitted over the network to confirm receipt of a packet of data. Alternatively, a protocol may include information in the overhead bits in each packet indicating the number of the packet. This information may be used to reassemble the received packets in the correct order, and if a packet is missing, a negative acknowledgement packet may be sent to request retransmission of the missing packet. Otherwise, data loss could occur and not be detected by the system. In any event, acknowledgement packets and other similar handshaking information which must be transmitted over the network according to the protocol impose some limitations upon the data throughput of the network. While this may be acceptable in many instances, in applications where the transfer of huge amounts of data are required, these bandwidth limitations may render such applications impractical in practice.

It is not uncommon for two or more users on a network to attempt to transmit a packet at the same time. When this occurs, it is referred to as a collision. Neither packet will be received successfully, and both must be retransmitted. Obviously, this reduces the throughput of the network. Different protocols employ various schemes to determine the timing of retransmission attempts in an effort to avoid repeated collisions between the same two users.

Data transmission may sometimes experience data errors, where a digital "1" is erroneously received as a "0", or vice versa, due to such events as signal fluctuations or noise. Thus, error correction schemes may be employed in an effort to detect data errors. If an error is detected, then a packet must be retransmitted. Of course, when a packet must be retransmitted, it reduces the overall throughput of the network.

Networking technology has suffered from limitations resulting from a proliferation of non-standard protocols, and limitations due to the nature of the protocols and transmission schemes which are employed. Additional overhead may be imposed when conversion from one protocol to another is required. This additional overhead may effectively limit the overall bandwidth of the network.

Networks may need to be connected by hubs, routers, and other switches. A hub, for example, may have a number of ports, and each port may be connected to a network, such as a LAN or a wide area network. When a packet is received at a hub, the hub switch must determine to which port the packet is to be switched. Alternatively, the packet may be switched to all ports and broadcast over every network connected to the hub. However, if every hub broadcasts every packet on every port, the amount of traffic on the network will be increased and the throughput will invariably suffer. Under heavy traffic, any attempt to determine to which port a packet must be switched must be accomplished speedily to avoid slowing throughput of the network. Therefore, it is desirable to have a method for determining over which port a packet should be transmitted.

In addition to limitations on bandwidth, all of the above discussed factors may affect cost, response time, throughput, delay, maximum transmission rates, and reliability.

Some applications, such as full motion video, require transfer of hugh amounts of data. Efforts to reduce the performance requirements upon the data transmission system when large amounts of data must be transferred over the system have resulted in various data compression schemes. For example, video or graphical data may be compressed to occupy less space. Compressed data may then be transmitted and, because the data has been compressed into fewer information bits, fewer bits need to be transmitted, thereby relieving to some extent the loading upon the data transmission system. However, there are limits on the extent to which data may be compressed. In the past, compression imposed computational overhead upon the system and sometimes took too much time to complete. Compressed data must be decompressed at the destination at the other end of the transmission system in order to be useable, which imposes additional computational overhead upon the system. Although compression and decompression may be performed in software, the speeds at which such operations can be performed limit the usefulness of such techniques in some applications such as realtime full motion video. If dedicated hardware is utilized, the additional hardware required to perform compression and decompression has limited the use in some applications where small size and miniaturization are required, and in other instances the cost of such additional hardware may be impractical.

Television programming is increasingly being delivered to the consumer by means other than traditional terrestrial broadcast. In the United States, the prime broadcast medium is cable (CATV). At the present time, 90 percent of approximately 93 million TV households in the U.S. are passed by cable—in other words, they could receive cable TV if they chose to subscribe to the cable service. Of these, 55 million, or 60 percent, subscribe to at least a basic cable service. In Europe, the picture is different—roughly 20 percent of all households are passed by cable. Of these, about 60 percent are subscribers. Both Germany and the U.K. have installed bases of 2.5 million direct broadcast by satellite (DBS) satellite dishes. In Asia, DBS services are booming, led by the activities of Star TV in Hong Kong.

The U.S. cable industry consists of two main components: program providers and service operators. The program providers produce the programming (MTV, HBO, Showtime, ESPN), which is distributed by satellite. The local service operator (typically one for each town or city in the U.S.) receives the programming through of satellite dish at what is called a cable headend, and re-transmits it by cable to subscribers. Other functions performed at the headend include receiving and re-transmitting local off-the-air services and local insertion of advertising. These local service operators are typically owned by large corporations known as multiple service operators (MSO). The largest MSOs in the U.S. at present are TCI, Time Warner, Viacom and CableVision. These companies also have interests as Program Providers.

Compressed digital video allows more channels to be transmitted without increasing system bandwidth. Typically 4–10 compressed channels (depending on quality and source) can be transmitted in the space of one conventional channel. This allows for reduction of costs and/or increased capacity.

For the CATV industry, compressed digital video is expected to be rolled out in two phases. The first phase will be the utilization of compressed digital video to deliver programming from the provider to the cable headend. This is motivated by both the cost of satellite transponder rental and by a looming shortage of available slots.

The second phase will be the implementation of compressed digital video to the home. Compressed digital video will give cable operators the ability to deliver as many as 500 channels to the home. The most likely use of these channels will be extended pay per view (PPV) services. The huge channel capacity will allow films to be shown on multiple channels separated by a 10–20 minute interval, thus offering near video on demand to the user.

In its present form, the U.S. CATV industry is close to saturation. Recent regulatory events make it difficult to increase revenues by rate hikes so the industry's best chance for growth is to offer new services, allowing it to compete with the video rental industry and perhaps ultimately with the first run cinema industry. An increase in capacity will allow for additional services which should result in increased revenues.

For direct broadcast by satellite, compressed digital video is the enabling technology which will allow that industry to compete with cable services. Assigning multiple channels to the bandwidth previously required for one both reduces the cost and permits a sufficiently large number of channels to compete with cable services. Two operations planned in the U.S. are Hughes DirecTV and the PRIMESTAR service.

An emerging contender in the market for consumer home video consumption is the telephone companies. The combination of compressed digital video and emerging ADSL (asynchronous digital subscriber line) technology will allow the telephone companies to offer "video dial tone" over twisted pair copper cabling.

Combined with a "juke box" of movies, the telephone companies' switched services would allow them to offer true video on demand. Recent regulatory changes have cleared the legal barriers to the telephone companies offering these services.

An emerging market in the U.S. is for subscription-based cable radio, which allows subscribers to receive commercial-free near CD-quality audio-only programming. MPEG audio compression will allow the industry to transmit more channels of higher-quality music through traditional cable lines and use fewer satellite transponders. MPEG refers to the Motion Picture Experts Group which has developed draft standards for audiovisual compression/decompression routines.

Direct audio broadcast (DAB) may be a significant advance in the broadcast industry by transmitting CD-quality music to home and car receivers. Europe and Canada are ahead of the U.S. in the development and implementation of such technology, primarily because of the long approval cycle the FCC requires to approve new transmission bands. Outside of the area of broadcast, several other consumer-oriented applications are emerging that are enabled by compressed digital video, such as compact disc interactive (CD-I) from Philips and similar products from Commodore and Tandy, which are intended to be upgradable to offer full motion video using MPEG compression. CD ROM based technology is also finding its way into video games. The combination of compressed digital video and CD ROM will allow games to feature full motion video.

The combination of compact data streams such as MPEG digital video and audio with networking technology will open up new and useful applications which have not heretofore been practical.

SUMMARY OF THE INVENTION

A high speed method for determining a port in a packet network switching system that a packet should be associated with includes the step of retrieving packet address information for a packet that is to be transmitted. A predetermined number of bits from the packet address information is selected to use as a hash key. The hash key is used to compute a table address. The contents of the table at that address are compared with the packet address information. If it matches, the packet is transmitted over the port associated with that particular destination address. If it does not match, the table address is incremented by one, and the contents of the new table location identified by the incremented address are compared with the packet address information.

The present method may be employed in connection with a digital video network apparatus which is preferably implemented on a single integrated circuit chip, and includes in combination network protocol processing system interconnection circuits and compression/decompression encoder/decoder circuits.

The network protocol processing system interconnection comprises packet conversion logic for conversion between a network protocol, such as asynchronous transfer mode (ATM) packets, and the data protocol used to handle large data streams, such as Motion Picture Experts Group (MPEG) packets. The network protocol processing system interconnection further comprises a physical-layer medium dependent (PMD) circuit, an ATM transmission convergence (TC) and synchronous optical network/synchronous digital hierarchy (SONET/SDH) framing circuit, and an ATM segmentation and reassembly (SAR). In a preferred embodiment, the network protocol processing system interconnection includes a virtual channel memory (VCR) for storing ATM cells for segmentation and reassembly, a direct memory access (DMA) controller for interconnecting the VCR to the data protocol compression/decompression circuits, a parallel cell interface (PCI) for interconnecting the VCR to an ATM network, a pacing rate unit (PRU) for automatically reducing the maximum transmission rate in response to a sensed congestion condition in the network, and a reduced instruction set computer (RISC) microprocessor for controlling the DMA controller and transfers between the memory, the host and the ATM network, for performing segmentation and reassembly of conversion sublayer payload data units (CS-PDU's), and for performing conversion between the ATM protocol and the MPEG protocol.

The operating program for the RISC microprocessor is stored in a volatile Instruction Random Access Memory (IRAM) in the form of firmware which may be downloaded at initialization.

In a preferred embodiment, the compression/decompression decoder/encoder circuits may be MPEG audio and video compression and decompression circuits for compressing the huge amount of data in digitized images and motion video into compact data streams that can be moved across networks with bandwidths otherwise too narrow to handle them.

BRIEF DESCRIPTION OF THE DRAWINGS

FIG. 1 is a block diagram of a digital video network apparatus connected to a network.

FIG. 23A, FIG. 23B, FIG. 23C and FIG. 23D are diagrams illustrating sample VCR software structure for cell holding and channel support for segmentation.

FIG. 38 is a block diagram of an Ethernet adapter.

FIG. 39 is an ATM adapter.

DETAILED DESCRIPTION OF A PREFERRED EMBODIMENT OF THE INVENTION

Figure 2:
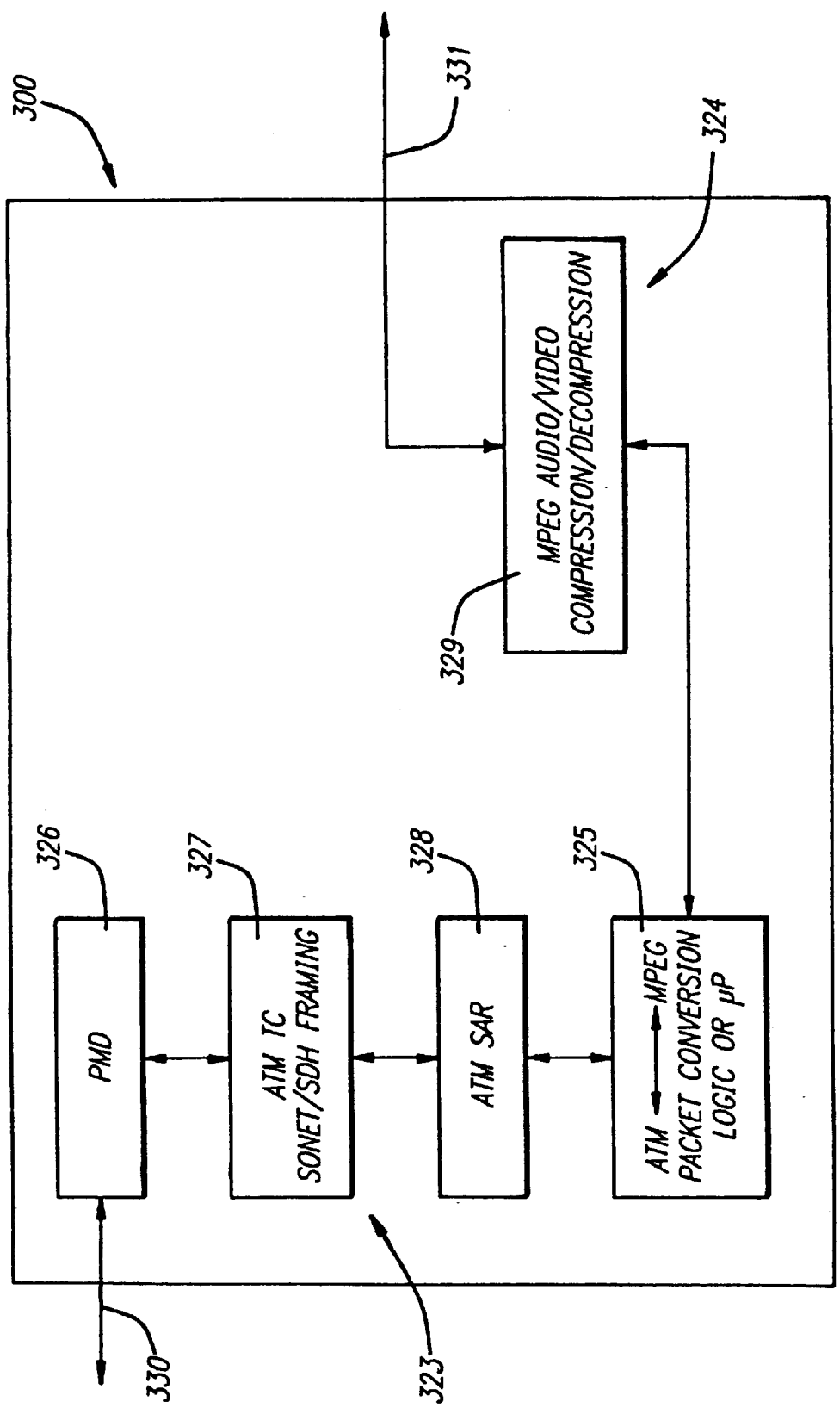
FIG. 2 is a block diagram showing additional details of the digital video network apparatus.

The present invention may be understood in connection with a description of a high speed digital video network apparatus 300, an example of which is illustrated in FIG. 1. The digital video network apparatus 300 is shown connected in this example to a network 301. The digital video network apparatus 300 is also shown connected in this example to a host computer 302.

The computer 302 has a video camera 303, which is a source of full motion video. The computer 302 also has a digitizer 304, which is a source of digitized images. A microphone 305 is connected to the computer 302, and is a source of digitized audio. In this example, the computer 302 includes a CD-ROM drive 306, which can input multimedia program material including full motion video, digitized images, and digitized audio. The digital video network apparatus 300 compresses data streams, such as the huge amount of data in digitized images and full motion video, into compact data streams that can be moved across the network 301, which would otherwise have a bandwidth that is too narrow to handle such huge amounts of data.

The digital video network apparatus 300 may be used to transfer data streams representing compressed video and audio over the network 301 to a remote computer 309. For example, full motion video from the camera 303 may be sent in a realtime fashion across the network 301 by the digital video network apparatus 300 to be displayed on a display screen 319 on the remote computer 309. Simultaneously, digital audio from the microphone 305 may be sent across the network 301 by the digital video network apparatus 300 to be heard on audio speakers 320 connected to the remote computer 309.

In addition, the digital video network apparatus 300 may receive data streams from the network 301 which comprise compressed video data, decode and decompress the data, and then output such received images and full motion video on a video display 307. For example, the remote computer 309 may send compressed video data over the network 301 to the digital video network apparatus 300, which can decode and decompress the data to produce images and full motion video to be displayed on the display screen 307 of the computer 302. Simultaneously, data representing compressed digital audio may be sent across the network 301 by the remote computer 309 to the digital video network apparatus 300 to be heard on the audio speakers 308 connected to the computer 302.

A significant feature of the present invention is the speed at which data may be exchanged over the network 301 and switched between a wiring hub 311 connecting computers 309, 317 to a remote node server 314 and a router 312 providing long distance LAN-to-LAN connections over telephone lines 313.

More specifically, the network 301 shown in FIG. 1 includes a wiring hub 311 connecting computer 309, computer 317, and database server 310 to the network 301. A router 312 is shown connected to the network. The router 312 may provide long distance LAN-to-LAN connections over telephone lines 313. Leased telephone lines 313 may provide a dedicated circuit at speeds ranging from 0.56 Mbits/sec to 1.544 Mbits/sec, and in some cases even 45 Mbits/sec. integrated services digital network (ISDN) lines provide connections at 128 Kbits/sec, but are not widely available. The illustrated network 301 has a remote node server 314 connected to the network 301. The remote node server 314 may be used to facilitate remote connections to the network 301 over telephone lines 315. A remote laptop computer could access the network 301 over the telephone lines 315 using a modem to connect to the remote node server 314. Remote node connections typically exchange packets of data in Novell IPX, Microsoft NetBEUI, or Internet IP format.

The present invention may be advantageously employed in transferring data over the network 301 and transferring data across the network through the router 312 to and from a remote LAN connected over the telephone lines 313. The present invention may be advantageously employed where bandwidth limited telephone line links 313 are used, as well as a local network 301.

The present invention achieves speeds which allow for the realtime transfer of full motion video and simultaneous audio. In the above described example, the computer 302 and the remote computer 309 may effectively function as video telephones, permitting users at the respective computers 302 and 309 to talk to each other and see live video images of each other in realtime. Uninterrupted voice and video can be provided between two networked computers 302 and 309.

Using a digital video network apparatus 300, a user at computer 302 could access video and/or audio data streams from a remote CD-ROM 321 on a database server 310 connected to the network 301. Moreover, many efforts to allow remote access and control of computers (examples of commercially available software for this purpose include pcANYWHERE™, marketed by Symantec, Closeup™, and Carbon Copy™) have been less than satisfactory in some instances, especially when running Windows™ or other graphical programs remotely. Graphical images may be transferred at speeds which allow Windows™ and other graphical programs to be run remotely without serious performance degradation. For example, a user at computer 317, remotely accessing computer 302, could run a program on computer 302 and see a realtime display on the screen 322 of a mouse cursor movement similar to what he or she would see if running the same program on the computer 317.

A fiber-optic cable, microwave link, satellite link, wireless radio frequency link, etc. could alternatively be substituted for the telephone lines 313 or 315. The invention may have particularly advantageous application in connection with the transfer of data streams over a wireless radio link, such as a cellular telephone link. The present invention is also applicable to wireless networks. An interface for GSM, time division multiplex access (TDMA), frequency division multiplex access (FDMA), code division multiplex access (CDMA), or GSM1800 could be added to permit wireless communication. Additional disclosure pertaining to an embodiment using a wireless link for the network 301 is contained in U.S. Pat. No. 5,340,978, the entire disclosure of which is incorporated herein by reference.

The server 310 has a universal power supply (UPS) 318 supplying power to it. A printer 316 is also shown. Images could be sent over the network 301 from the computer 302 to be printed on the printer 316.

The network 301 shown in the illustrated example shown in FIG. 1 is a packet switched network. The asynchronous transfer mode (ATM) protocol for the network 301 is preferred. The ATM protocol provides fast signaling with little delay, which is especially advantageous in video and voice transmissions. Alternatively, the network could use other protocols, such as Ethernet (with 10Base5, 10Base2, or 10BaseT connections), fiber distributed data interface (FDDI), token ring, cable distributed data interface (CDDI), etc.

I. Network Protocol Circuits

Figure 16:
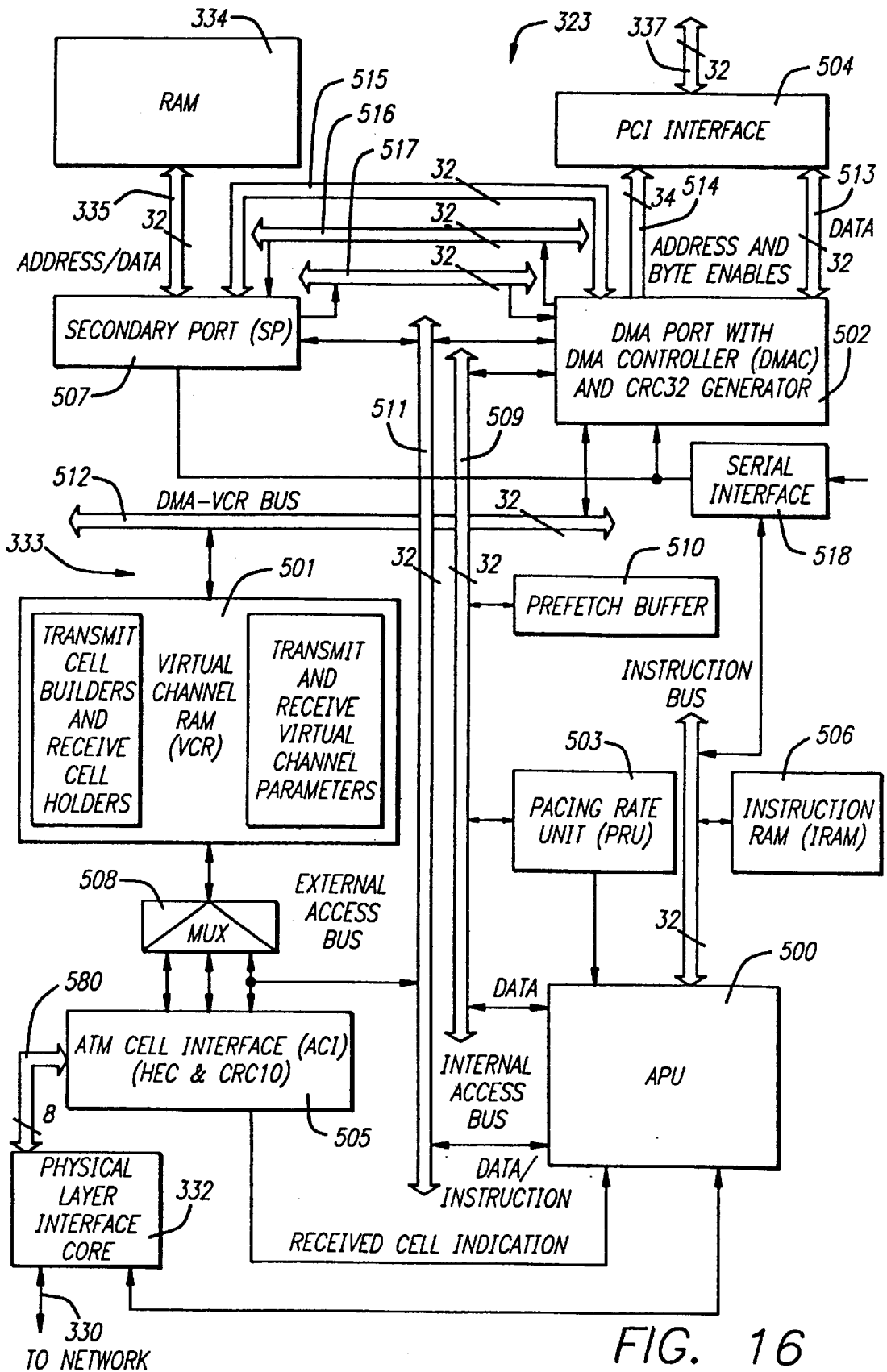
FIG. 16 depicts network protocol processing system interconnection circuits in detail.

Network protocol processing system interconnection circuits 323 are shown in more detail in FIG. 16.

In a preferred embodiment, the network protocol processing system interconnection circuits 323 comprise a virtual channel memory (VCR) 501 for storing ATM cells for processing, segmentation and reassembly, a direct memory access (DMA) controller 502 for interconnecting to a PCI bus interface 504 and shared memory 341, an ATM cell interface (ACI) 505 for interconnecting to an ATM network 301, a pacing rate unit (PRU) 503 for automatically reducing the maximum transmission rate in response to a sensed congestion condition in the network 301, and an ATM processor unit (APU) 500 for controlling the DMA controller 502 and transfers between the VCR 501, the PCI bus 337 and the ATM network 301, and for performing segmentation and reassembly of conversion sublayer payload data units (CS-PDU's). The APU 500 may also be used for performing conversion between the ATM protocol and the Motion Picture Experts Group (MPEG) protocol.

The network protocol processing unit 333 is fabricated as a single integrated circuit chip on a single substrate as illustrated in FIG. 16, (along with the MPEG compression and decompression circuits). The function of the network protocol processing unit 333 may be programmed by downloading software into an instruction RAM (IRAN) 506.

The network protocol processing unit 333 comprises a number of functional blocks which are illustrated in FIG. 16.

The ATM Processing Unit (APU) 500 is the "brain" of the network protocol processing unit 333. In this example, it is implemented as an on board 32-bit million instructions per second (MIPS), reduced instruction set computer (RISC) based central processing unit (CPU) 500 that may be used to control operation of the network protocol processing unit 333. The APU 500 processes incoming cells and generates outgoing cells. The APU 500 may translate incoming ATM packets to a different protocol, such as Ethernet, and generate outgoing packets in a different protocol. Conversely, the APU 500 may translate incoming packets in any protocol, such as Ethernet, to the ATM protocol and generate outgoing ATM cells or alternatively outgoing packets in any different protocol. The APU 500 also provides operational control to support functions such as interleaved circuit termination (S&R) and cell switching of multiple ATM adaptation layer type cells, scatter-gather memory management operations, intelligent congestion control algorithms, traffic statistics gathering, and messaging between the network protocol processing unit 333 and a host CPU 338.

The APU 500 runs software from the IRAM 506. The IRAM 506 may be an on-board 1024×32 single cycle static RAM (SRAM). The IRAM 506 is preferably loaded at system reset, and the code preferably remains static in the IRAM 506 throughout system operation. However, if system failures occur, a diagnostic control routine may be downloaded to the IRAM 506 so that the APU 500 can assist in the troubleshooting process.

A Virtual Circuit RAM (VCR) 501 is a significant configurable aspect of the network protocol processing unit 333. The VCR 501 may be implemented as a 1024×32 two Read/Write port SRAM 501. Software partitioning of the VCR 501 may be used to vary tradeoffs in configuration such as the number of channels supported and the size, structure and speed of the RAM memory 334.

Cells received from the ATM port side are preferably written into the VCR 501 to await either reassembly or switching operations initiated by the APU 500. When using the ATM protocol, ATM adaptation layer (AAL) 1, 2, 3/4 and 5 cells may be "built" in the VCR 501 by a combination of DMA operations and APU operations before being passed to the ATM transmitter 505.

The VCR 501 may also be used to store channel parameter entries, available buffer lists and other data structures which may be required for system operation. In some applications, all channel parameters entries will be stored in the VCR 501 while in other applications channel parameter entries may be stored in a main or shared memory 341 (combination systems are also possible).

A Pacing Rate Unit (PRU) 503 contains eight peak rate pacing counters (PRPC) that are used to control the rate of CS-PDU segmentation in an ATM protocol. Whenever one or more PRPCs times out, the PRU 503 asserts the APU's CpCond2 input allowing the APU 500 to poll for this time out condition. If the APU 500 finds CpCond2 set, it branches to a segmentation routine.

The PRU 503 also contains a channel group credit register (CGCR), which in this example is an eight bit, APU readable/writable register containing one bit for each PRPC. A PRPC that has timed out but has not yet been serviced by the APU 500 has its bit set in the CGCR. Software running on the APU 500 can implement channel priority by selectively servicing channel groups that have timed-out. In the illustrated example, four of the eight 12-bit PRPCs can be configured into two general purpose 24-bit timer/counters for general purpose usage. These timer/counters provide certain features including APU interrupt on time-out capabilities.

The PRU 503 further includes a global rate pacing register (GRPR) which is further described below.

A DMA controller (DMAC) 502 may be used by the APU 500 as a slave resource (as seen by the APU 500) to accomplish data transfers between the on-chip VCR 501 and memory mapped devices. While the APU 500 may be thought of as the "brains" behind DMA operations, the DMA controller 502 may be thought of as the "muscle" behind such operations. Because the APU 500 preferably initializes the DMA controller 502 at the beginning of each operation, the DMA controller 502 may effectively support an unlimited number of channels.

The DMA controller 502 is extremely powerful, supporting any combination of local and memory byte alignments on transfers. This powerful support of aligned and misaligned operations gives the network protocol processing unit 333 an ability to participate in scatter-gather operations. The DMA controller 502 is also responsible for generating cyclic redundancy check (CRC32) results for AAL 5 segmentation and reassembly (SAR) CS-PDUs. The DMA controller 502 preferably operates in 32-bit address and 32-bit data transfer mode.

An ATM Cell Interface (ACI) 505 is the network protocol processing unit's 333 interface to the ATM port side circuitry, and includes an ACI Transmitter and a PCI Receiver. The illustrated ACI 505 is 8 bits wide in both the transmit and receive directions and connects directly to the actual transmission convergence sublayer framing circuitry. In the receive direction, the ACI 505 is responsible for reconstructing ATM cells in the VCR 501 from data received from the framing logic 327. In the transmit direction, the ACI 505 is responsible for transferring cells from the VCR 501 to the framing logic 327.

The ACI 505 also contains data buffers and frequency decoupling logic to allow for a direct connection between the network protocol processing unit 333's ATM ports and the ATM line transceivers. In the illustrated embodiment, all metastability issues are addressed and solved by the network protocol processing unit 333.

A secondary port 507 is an eight bit port that can be accessed by the APU 500 directly through load and store commands. The secondary port 507 may be used to pass information between the network protocol processing unit 333 and the RAM 334, or directly to the DMA controller 502 over a dedicated 32-bit bus. The secondary port 507 may be used to transfer data directly from the RAM 334 to the PCI interface 504, and if desired, such data could be transferred to a host CPU 338. The secondary port 507 can also be used to access the RAM 334 while the DMA controller 502 is busy and to read information from or store information in the RAM 334.

The APU 500 is a 32 bit RISC CPU based on the MIPS R3000 architecture. The inclusion of this powerful, user programmable CPU gives the network protocol processing unit 333 significant capabilities. Using software stored in the IRAM 506, the APU may be programmed to perform a range of functions such as cell building, including SAR header and trailer generation, ATM header retrieval from the channel parameter entry for the virtual channel (VC), ATM header manipulation and insertion, and DMA operation initialization for SAR SDU retrieval. The APU 500 may also be used for channel servicing sequencing.

The APU 500 may be used for generating SAR headers (AAL 1, 2 and 3/4) and trailers (AAL 2 and 3/4) during segmentation and reassembly (the CRC10 field is preferably generated and inserted by the ACI 505). SAR header generation may include sequence number generation and checking as well as message type insertion and extraction (BOM, COM, EOM, SSM).

The APU 500 initiates appropriate DMA operations to accomplish SAR SDU retrieval from memory based real time data buffers (AAL 1) or CS-PDUs. The APU 500 is also responsible for ATM header retrieval and manipulation, including PTI and CLP field modification. For cells that are to be switched, the APU 500 makes the initial switching decision based on information contained in the channel parameter entry for the VC as well as for accomplishing VCI/VPI translation if such an operation is specified in the channel parameter entry.

Figure 19:
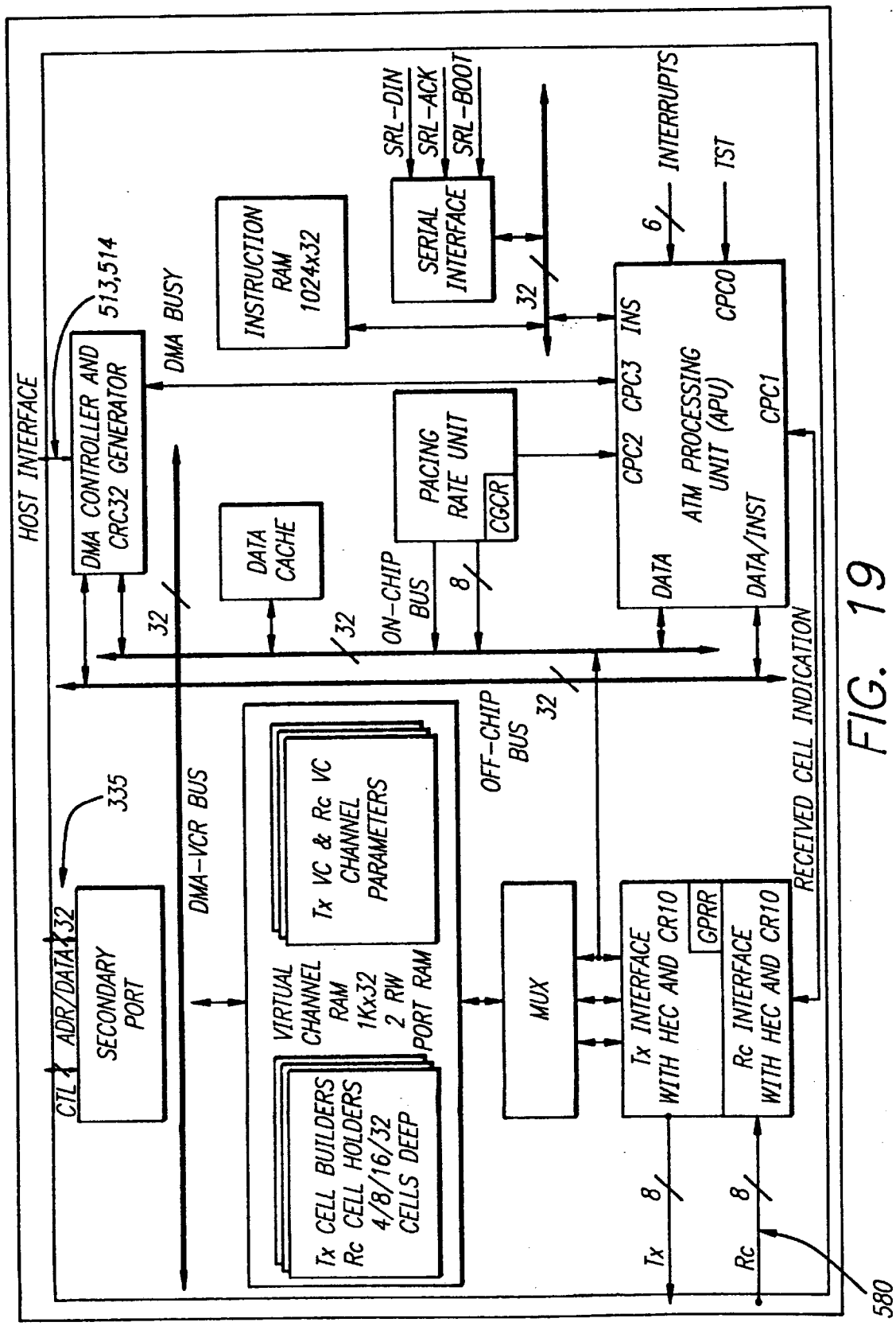
FIG. 19 is a block diagram of an LSI ATMizer circuit which maybe used as an alternative embodiment of the network protocol processing unit.

A network protocol processing unit 333 that may be used in an ATM network is commercially available from LSI Logic Corporation of Milpitas, Calif. (hereinafter "LSI Logic") as the L64360 ATMizer™. FIG. 19 illustrates the ATMizer™ embodiment. Additional disclosure appears in the description contained in the manual entitled "L64360 and ATMizer™ Architecture Technical Manual available from LSI Logic.

To initiate a DMA operation the APU 500 sets the main memory start address (byte offset), the local address and local byte offset, the number of bytes to be transferred and the transfer direction (read vs. write) in the DMA engine. Once these parameters have been written into the DMA engine, the DMA controller operates autonomously to accomplish the entire transfer.

The APU 500 initiates DMA operations to retrieve SAR SDUs during segmentation operations, to restore SAR SDUs to their respective CS-PDUs during reassembly operation, to switch entire cells, headers and trailers intact, to other memory mapped ATM ports during switching operations, to retrieve and restore channel parameter entries in applications utilizing additional memory to support an extended number of VCs or to retrieve a channel parameter entry to be appended to the end of a VCR based channel group in applications supporting on-chip caching of channel parameter entries in the VCR 501, and to transfer SAR SDUs to and from real time data stream buffers in applications supporting AAL1 circuit interfaces (such as T1 lines).

The APU 500 has write access to the eight peak rate pacing counters and their initialization registers (not shown). The APU 500 sets the initial count values by writing a 12 bit value into one of the eight peak rate pacing registers. The APU 500 can also read a channel group credit register to determine which PRPCs have expired.

The pacing rate unit 503 informs the APU 500 that a PRPC has timed-out by asserting the APU 500's CpCond2 input. The APU 500 polls this condition by periodically executing a "Branch on CpCond2 True" instruction. If the APU 500 evaluates this condition as True it branches to a segmentation routine and begins segmenting the CS-PDUs specified in the individual channel parameter entries for the channel group whose PRPC 58a has timed-out (forcing the assertion of CpCond2).

The APU 500 will generate a number of cells per CS-PDU channel parameter entry, as indicated in the channel parameter entry, prior to proceeding to the next channel parameter entry in the channel group. The APU 500 implements channel priority by being selective (and creative) in the order in which it handles segmentation when multiple PRPCs have timed out simultaneously and are awaiting service.

In between cell generation procedures the APU 500 will check for received cells, and will interleave the generation of cells with the reception (termination or switching) of cells as well as with any other network protocol processing unit actions that may be required.

The APU 500 will queue cells for transmission by writing the VCR 501 start address of a cell into the cell address FIFO in the ACI transmitter. If no cell address is present in the first in, first out (FIFO) when an end of cell boundary is reached, the transmitter will automatically send an IDLE cell.

For received cells, the APU 500 will decide between cell switching and circuit termination on a per VC basis. The APU 500 accomplishes internal cell switching by passing the VCR 501 addresses of a received cell targeted for internal switching to the cell address FIFO in the transmitter. A cell targeted for external switching (switching over DMA_Data(31:0)) has its VCR 501 addresses passed to the DMA controller 502.

The APU 500 also is responsible for setting the global pacing rate register in order to shape the assigned cell content of the outgoing cell stream. For cells that are to be terminated (i.e. reassembled into CS-PDUs) the APU 500 retrieves the channel parameter entry for the VC over which the cell arrived to obtain information required to reassemble the SAR SDU into its corresponding CS-PDU.

This information includes the memory address of the tail end of the CS-PDU under reconstruction. The APU 500 then initiates a DMA operation to transfer the SAR SDU from the VCR 501 to memory by passing the DMAC the local (VCR 501) address of the SAR SDU, the memory address of the CS-PDU and the number of bytes of SAR SDU to be transferred. The DMA controller 502 then executes the transfer, leaving the APU 500 free to do other things.

During the reassembly process the APU 500 is responsible for memory buffer management. If memory is to be allocated to incoming CS-PDUs in "fragments", the APU 500 will track fragment boundaries, issue additional fragments to CS-PDUs as needed, and generate link lists of the fragments allocated to a given CS-PDU. The APU 500 may also generate messages directed to a host CPU 338 to inform the host of CS-PDU complete situations, error or congestion problems.

In the transmit direction, the APU 500 recognizes and deals with the difference between end-of-fragment boundaries and end-of-CS-PDU boundaries.

The network protocol processing unit 333 does not require a particular messaging system between the APU 500 and the host CPU 338.

In one possible embodiment, a messaging system may be implemented by polling an ATMizer_Int input (connected directly to CpCond0 and tested with the "Branch on CpCond0 True" instruction) for an indication that the host wishes to communicate with the network protocol processing unit 333 and by setting the network protocol processing unit's Host_Int output to indicate to the host that the network protocol processing unit 333 wishes to or has already passed a message to the host system. GP_Int1 or GP_Int2 could also be used in addition to or in place of ATMizer_Int as part of the messaging system.

The APU 500 can also read and/or write any DMA memory mapped or parallel port memory mapped location as part of a messaging mailbox system.

A global pacing rate register allows the APU 500 to set the percentage of IDLE cells to be sent over the ATM cell interface 505. This provides for aggregate traffic shaping and is a quick way of reducing data speeds upon congestion notification. The system may gradually return to full speed operation under the control of the APU 500.

Congestion control algorithms may provide for immediate reaction to congestion notification. Fast response (within one cell time) results in fewer cells sent into a congested network, minimizing cell loss and CS-PDU retransmissions resulting in higher overall throughput. Congestion control routines are implemented through software stored in the IRAM 506 and can be modified to optimize them for any particular ATM network conditions.

The network protocol processing unit 333 is capable of executing or facilitating a wide variety of congestion control algorithms. The APU 500 looks at the appropriate ATM header fields of each incoming cell for notification of congestion. If congestion notification is found to exist, the APU 500 can take immediate action. Such actions may include one or more of the following:

1. Notify the CPU 338 of the detection of congestion to adjust the MPEG encoding, decoding or transmission operations.
2. Lower one or more peak rate pacing counter initialization values.
3. Reduce the overall assigned cell throughput rate by setting a "lesser" value in the global pacing rate register.
4. Set the CLP fields of outgoing cells to 0 in lieu of lowering the overall information rate.

In the illustrated embodiment, the instruction RAM 506 may contain 4096 bytes of user written software to power the APU 500. The IRAM 506 code may be downloaded during system reset (Resetx asserted) through a series of memory write operations executed by the host processor 338 with the network protocol processing unit 333 serving as the target device. The network protocol processing unit 333 may act as a slave device for the purpose of this download process. The CPU 338 may accomplish such a data transfer to the network protocol processing unit 333 by issuing 1024 (or less) write operations to 1024 (or less) consecutive memory addresses. These memory address have common MSBs that result in external logic selecting the network protocol processing unit 333 as the targeted resource of the write operations.

As a result of each write operation, external logic asserts the network protocol processing unit's 333 DMA_RdWrAck input. The network protocol processing unit 333 responds to the assertion of DMA_RdWrAck while Resetx is low by writing the data sourced by the host on DMA_Data(31:0) into the on-board IRAM 506 on the rising edge of clock. The network protocol processing unit 333 generates the IRAM 506 index (i.e. the IRAM 506 write address) internally, starting at location zero and incrementing the address by one word each time DMA_RdWrAck is asserted.

The IRAM 506 code should be written consecutively until the entire software has been written into the IRAM 506. Once the entire software has been written into the IRAM 506, the system can release the network protocol processing unit's 333 Resetx input and the APU 500 will begin software execution at the R3000 reset vector. DMA_DataOEx and DMA_AdrOEx should be deasserted during slave write operations.

The network protocol processing unit 333 will generate consecutive DMA memory addresses to IRAM 506 code downloading, beginning at memory address zero and incrementing by one word each time DMA_RdWrAck is asserted. If the address sourcing capability of the DMA is used to boot from a ROM or some other device, DMA_AdrOEx should be asserted during initialization. If programmed I/O is relied upon to configure the IRAM 506, DMA_AdrOEx should most likely be deasserted to insure that the network protocol processing unit 333 does not drive the DMA_-Address(31:2) bus.

The virtual channel RAM 501 may be a 1024 word×32 dual ported RAM that provides the network protocol processing unit 333 with significant capabilities. A number of network protocol processing unit 333 operations involve the transfer of data to and from the VCR 501. The VCR 501 can be read and written by the DMA controller 502, the ATM cell interface 505 and the APU 500.

Incoming cells from the ACI 505 (cells arriving over the receiver in the parallel cell interface) are preferably written into the VCR 501 prior to processing. The APU 500 will decide how to process a cell. It can chose to terminate a cell (reassemble it into a CS-PDU or a data buffer) or to switch a cell (internally or externally). Outgoing cells are preferably either constructed in the VCR 501 (segmentation) or transferred to the VCR 501 (external switching) prior to transmission. In addition, channel parameter entries, memory buffer lists, messages and other parameters can all be stored within the VCR 501.

Once one CS-PDU has been completely segmented the APU 500 can swap out its channel parameter entry for the next in line. Channel parameter entries for channels that are active in the receive direction are stored in local memory 334. This allows a router to support an unlimited number of simultaneously active receive channels.

Without an intelligent memory fragment allocation plan, support for a large number of VCs would swamp most memory systems. The network protocol processing unit 333 combines support for external channel parameter entries with a capability to do link list based CS-PDU scattering during reassembly (allocate memory in small "fragments" as needed). As a result, a router is able to support an unlimited number of open transmit and receive channels from a single unified DRAM based memory system with a single restriction on the number of transmit channels that can be actively undergoing segmentation at one time.

In high end applications, it is possible to support an unlimited number of simultaneously active transmit and receive channels by storing all channel parameter entries in the memory 334 or the shared memory 341. This puts certain demands on the speed of memory that may force the usage of SRAM for channel parameter entry storage.

The receiver in the ACI 505 reconstructs cells received from the transmission convergence framing logic 327 in the VCR 501. In the illustrated example, the ACI 505 allocates 64 bytes of VCR 501 memory to each incoming cell. The actual size of a cell is selectable (up to 64 bytes) and can be programmed in a system control register as part of the APU 500's system initialization routine.

The receiver reconstructs cells beginning at VCR address 0000. The first 128 bytes (2 cells), 256 bytes (4 cells), 512 bytes (8 cells) or 1024 bytes (16 cells) of the VCR 501 are set aside for received cell holders. Cells are written into the VCR 501 in a modulo 2, 4, 8 or modulo 16 fashion. Therefore, it is important that cells be processed before they are overwritten.

Cell buffering in the VCR 501 helps to decouple the incoming cell stream from memory interface latency and is especially helpful in situations where the APU 500 is temporarily unable to process incoming cells due to execution of an extended routine.

Cells written into the VCR 501 are processed in the order of their arrival by the APU 500 and are either:

1. Switched over the internal transmitter;
2. Switched over the main memory interface; or
3. Reassembled into memory based real time data stream buffers or CS-PDUs. The decision to switch or terminate a cell is made by the APU 500 after examining the information stored in the channel parameter entry for the VC over which the cell arrived.

All cells should be either moved to (external switching) or constructed in (segmentation) the VCR 501 prior to transmission. An area in the VCR 501 can be set aside to act as the staging area for cell switching and generation. Outgoing cells are transferred from the VCR 501 to the transmission convergence framing logic 327 by the transmitter in the ACI 505. The transmitter works off of VCR 501 memory pointers.

Whenever the APU 500 wishes to have a VCR 501 resident cell transferred to the transmission convergence framing logic 327, it writes a VCR 501 pointer to the cell into the transmitter's cell address FIFO. The transmitter then handles the transfer automatically.

A benefit to this pointer method is that it enforces no restrictions on the internal location of cells slated for transmission except that they be VCR 501 resident. As a result, the network protocol processing unit 333 can switch received cell holder resident cells out over the transmitter by simply passing a pointer to the cell address FIFO (internal switching).

To switch a cell from an external device (i.e. to source a pre-existing memory based cell out over the transmitter of the ACI 505) the APU 500 first initiates a DMA operation to bring the cell into the VCR 501 from a temporary memory buffer. Then the APU 500 passes the VCR 501 pointer for the cell to the cell address FIFO in the same fashion as for internal switching.

Segmentation requires ATM and SAR (AAL 1, 2 and 3/4) headers and trailers (AAL 2 and 3/4) to be appended to the SAR SDUs by the APU 500. Once a cell is constructed in the VCR 501, the APU 500 again passes a pointer to the cell to the cell address FIFO and the transmitter sends the cell to the transmission convergence framing logic, one byte at a time.

For the APU 500 to generate a cell it must know certain information about the virtual circuit over which the cell will pass and information about the CS-PDU from which the cell will be generated. Such information includes:

1. The main memory address of the CS-PDU or data buffer from which the SAR SDU will be retrieved.
2. The number of bytes remaining in the CS-PDU or CS-PDU fragment (in scatter-gather applications).
3. In scatter-gather applications, whether or not the current CS-PDU fragment is the last fragment of a multi-fragment CS-PDU.
4. The base ATM header that is to be appended to each cell.
5. The ATM adaptation layer type that is to be used to segment or reassemble cells originating or terminating on a given VC.
6. The previous SAR header/sequence number (for AAL 1, 2 and AAL 3/4 circuits).
7. The CRC32 partial result for the CS-PDU (for AAL 5 circuits).

Collectively, these parameters provide the APU 500 with the information needed to process an incoming cell or to segment a CS-PDU into a stream of cells. A RAM based data structure that contains all of the pertinent information about a single VC is referred to as a channel parameter entry for the VC.

The network protocol processing unit 333 does not enforce any channel parameter entry data structure. The channel parameter entry data structure is software programmable, as well as how VCs are grouped together and how the segmentation process will be conducted on a grouping. The APU 500 software should be written to work with the channel parameter entry data structure architecture of a given system. For example, a system that supports AAL5 CS-PDU segmentation and reassembly will require less information in a channel parameter entry than a system that supports AAL5 CS-PDU segmentation and reassembly and cell switching. Furthermore, a system that supports simultaneous segmentation and reassembly of AAL 1, 2, 3/4 and 5 CS-PDUs will require a more detailed channel parameter entry for each VC.

Referring to FIG. 16, the ACI 505 is coupled through a multiplexer 508 to the VCR 501. An internal access bus 509 is used to pass data between the APU 500, the PRU 503, the DMA controller 502, the VCR 501, the ACI 505, and a prefetch buffer 510. A second bus 511 is used to pass data and instructions from the APU 500 to the DMA controller 502 or the secondary port 507. In this embodiment, the APU 500 can access information in the RAM 334 through the secondary port 507 in the same cycle that data from the ACI 505 is being transferred to the DMA controller 502. A DMA-VCR bus 512 is used to transfer data between the VCR 501 and the DMA controller 502. A data bus 513 is used to transfer data between the DMA controller 502 and the PCI interface 504. At the same time, a separate address and byte enable bus 514 is preferably provided between the DMA controller 502 and the PCI interface 504.

To facilitate direct access of the RAM 334 through the PCI interface 504, a data bus 515 is provided for transfers in one direction, a data bus 516 is provided for transfers in the other directions, and an address bus 517 is provided for addressing the RAM 334. A separate address bus maybe provided between the secondary port 507 and the RAM 334 to speed access to the RAM 334.

A serial interface 518 is also shown in FIG. 16, which can be used for downloading software into the IRAM 506, or for transferring serial data through the DMA controller 504 or the secondary port 507.

Figure 17:
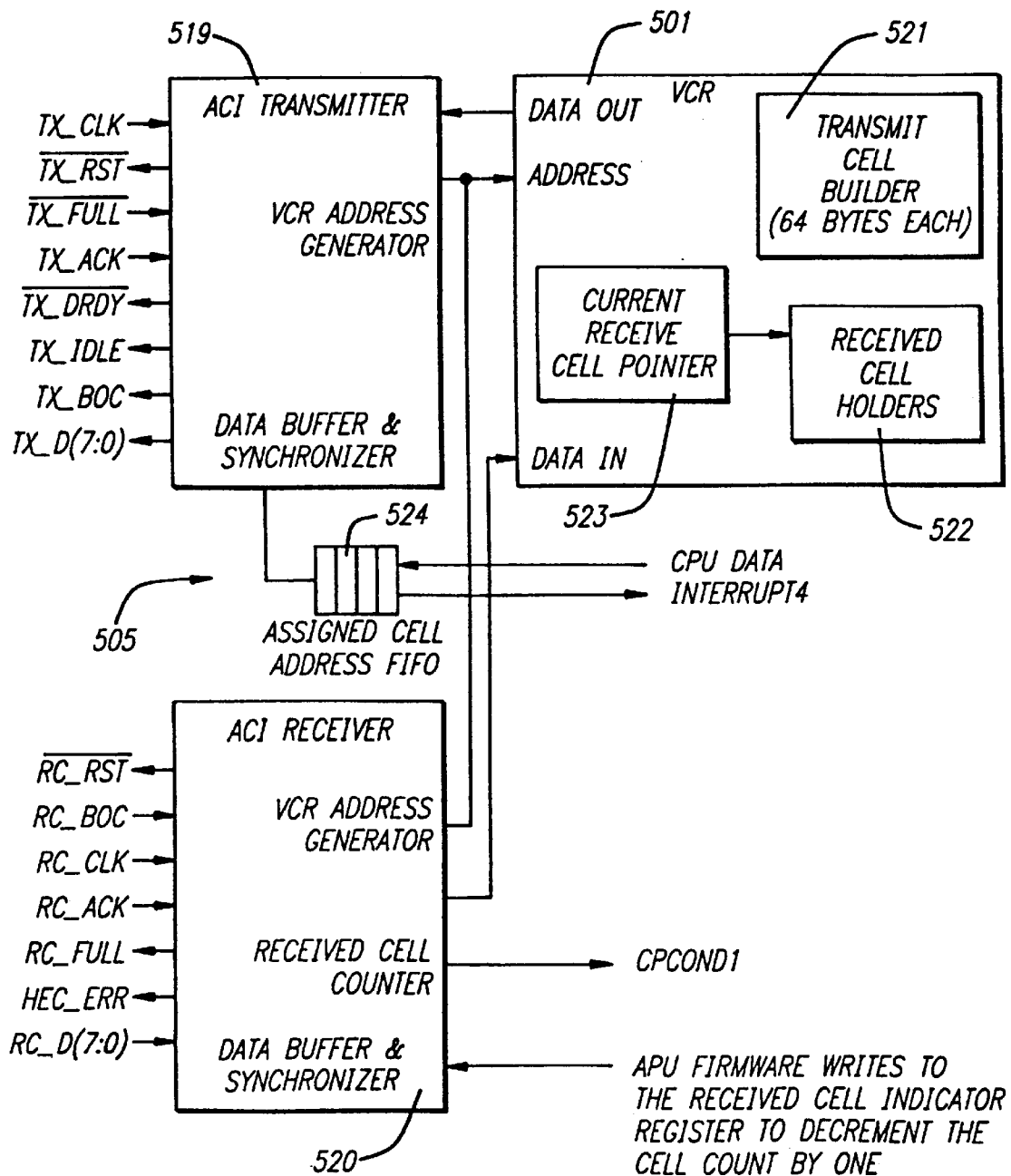
FIG. 17 is a diagram showing details of an ACI transmitter and receiver.

FIG. 17 illustrates additional details of the ACI 505. The ACI transmitter 519 and the ACI receiver 520 are shown in FIG. 17. Both are coupled to the VCR 501. The VCR 501 may be partitioned into a transmit cell builder areas 521, received cell holders 522, and current receive cell pointer areas 523. The operation of these elements is further described in "L64360 and ATMizer™ Architecture Technical Manual" mentioned above. An assigned cell address FIFO 524 shown in FIG. 17 is used for temporary storage of cell addresses.

Figure 3:
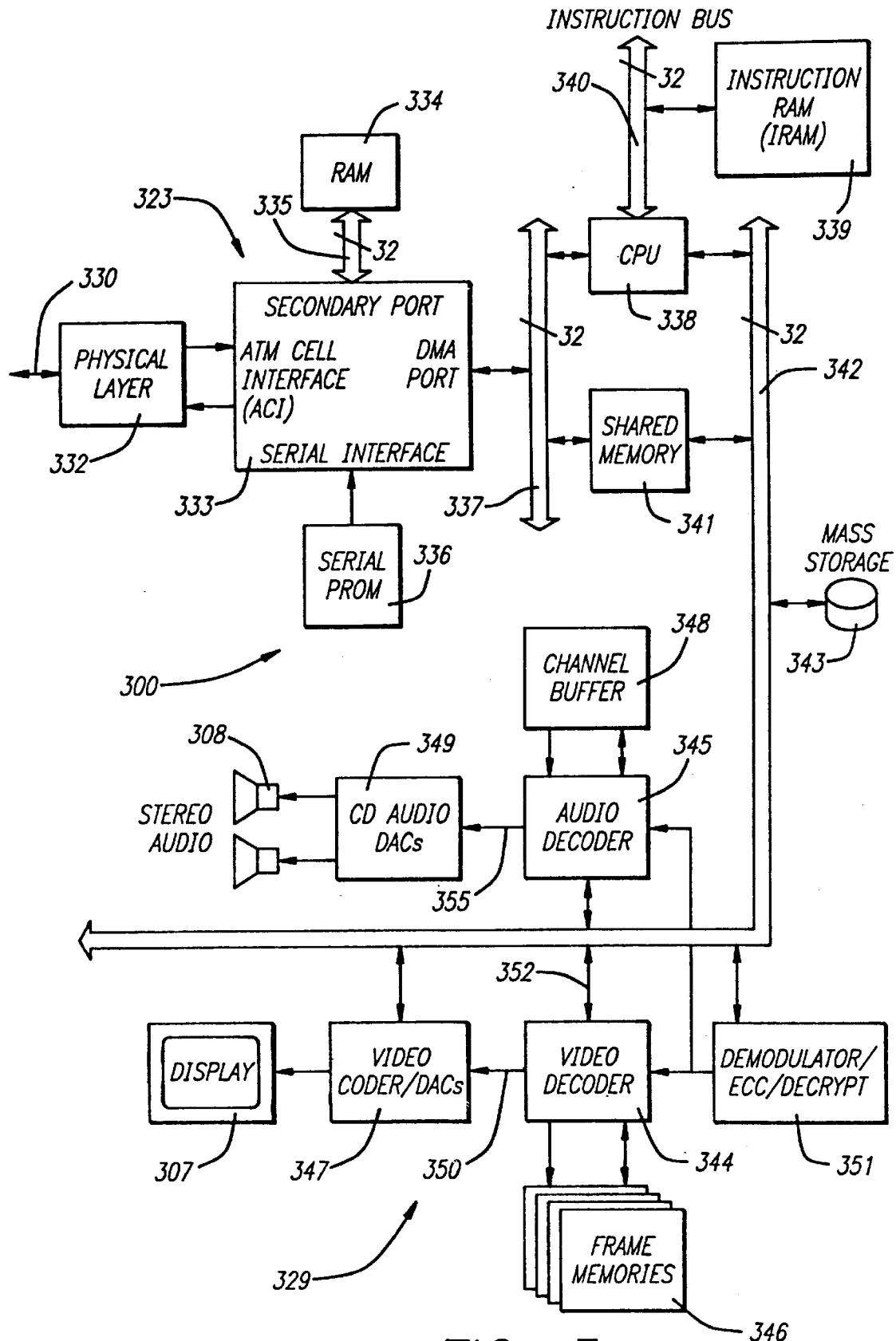
FIG. 3 illustrates in more detail one embodiment of the digital video network apparatus.
Figure 18A:
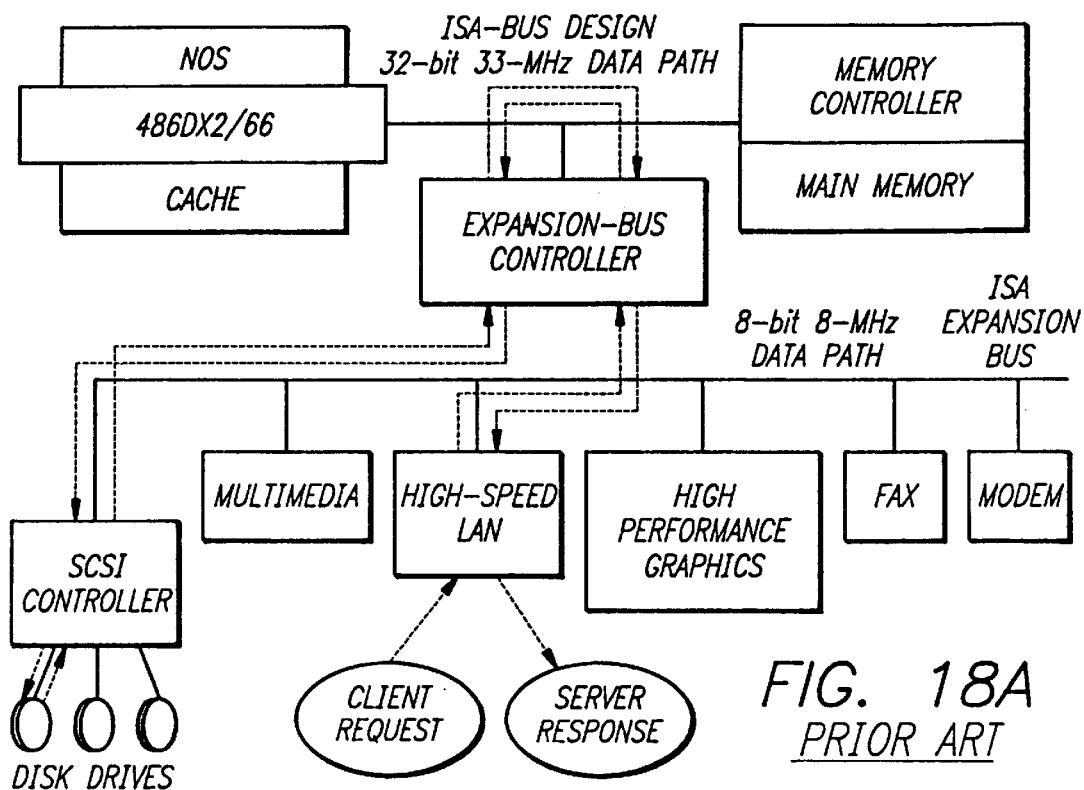
FIG. 18A is a schematic diagram depicting a conventional ISA bus design.
Figure 18B:
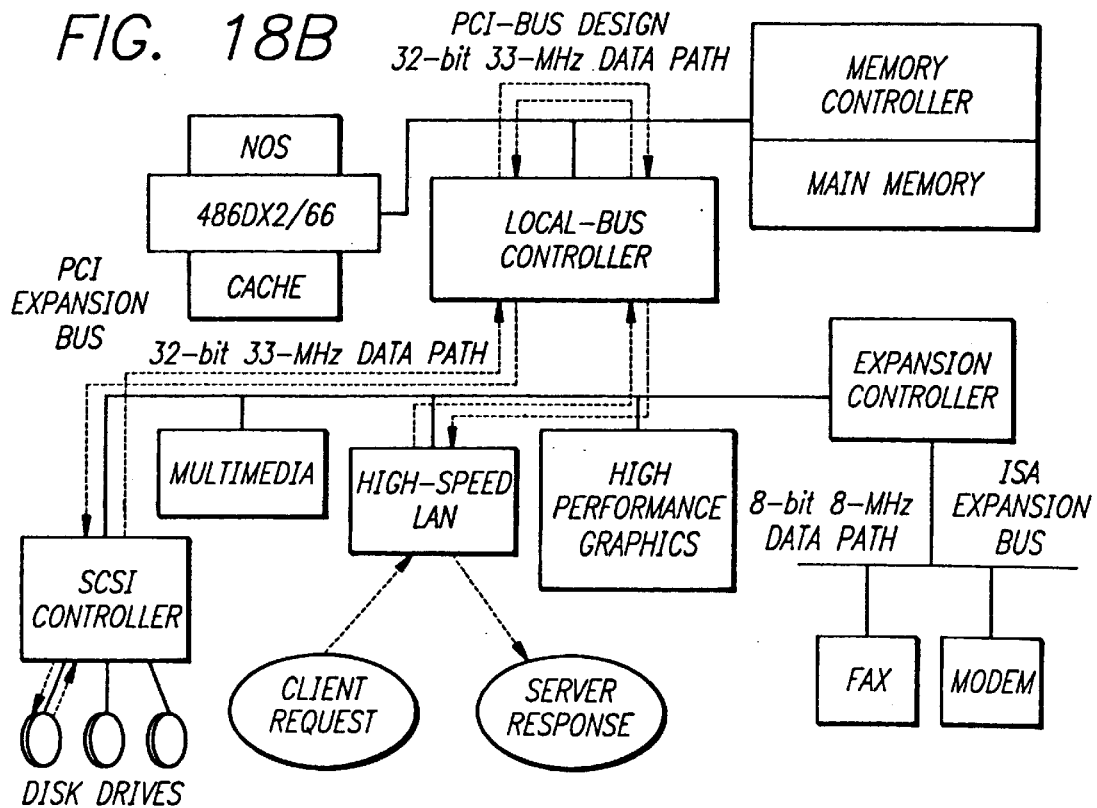
FIG. 18B is a schematic diagram depicting a PCI bus design.

Referring to FIG. 3, the bus 337 is preferably a PCI bus. An illustration of PCI bus design is shown in FIG. 18B. A PCI bus typically provides a 32 bit 33 MHz data path. An alternative bus design is shown in FIG. 18A. This depicts an ISA bus. An ISA expansion bus provides an 8 bit 8 MHz data path. In the present invention, a PCI bus is preferred.

Figure 20:
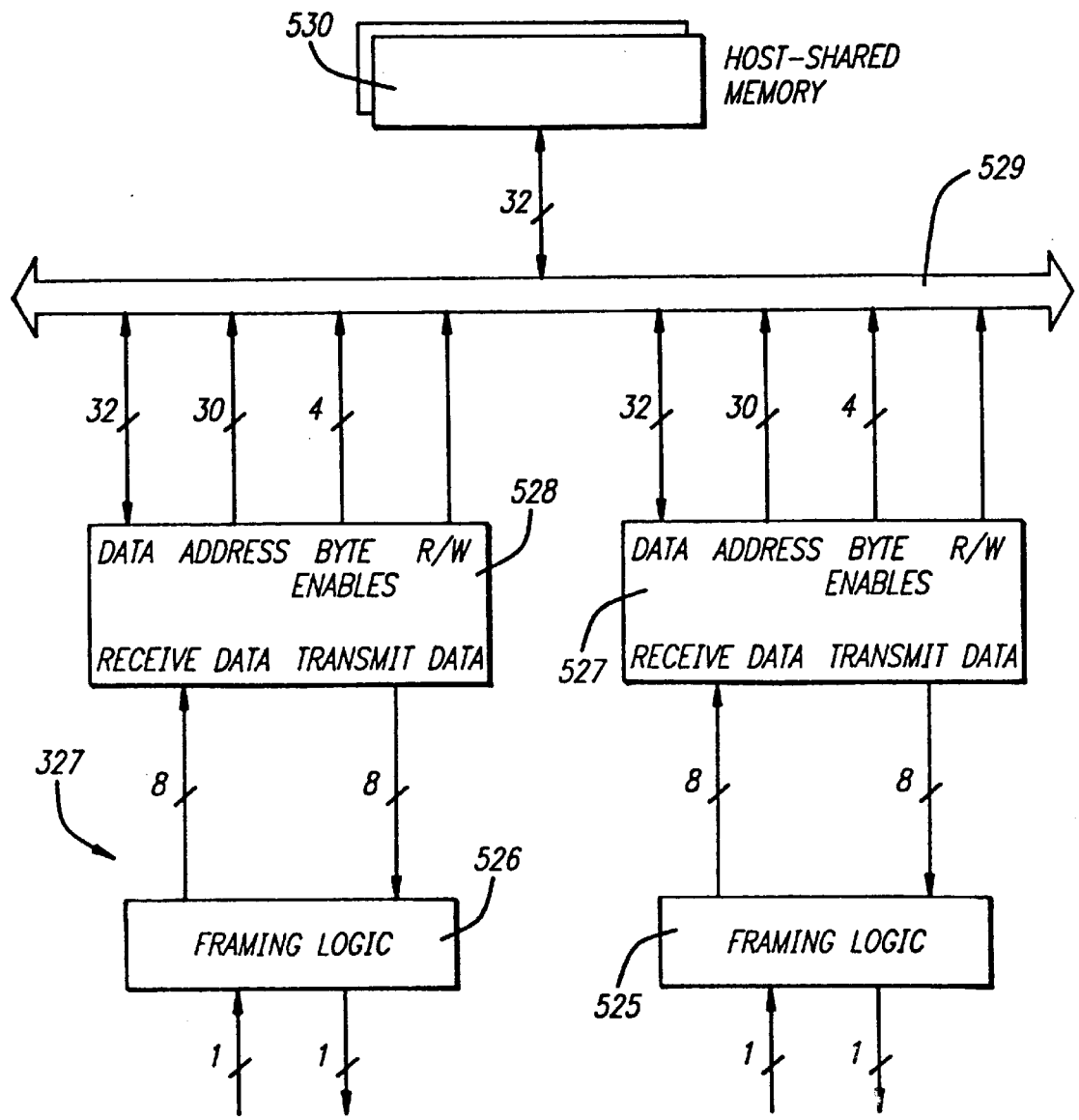
FIG. 20 is a block diagram of a multi-port network connection.

Referring to FIG. 20, an embodiment having more than one network port is shown. Framing logic 525, 526 is provided for each port. A transceiver 527 is provided for the first port, and is interfaced to a host bus 529. Data may be transferred to and from a host shared memory 530. Similarly, a transceiver 528 performs a similar function for the second network port. It should be understood that a plurality of network ports may be utilized.

Figure 21:
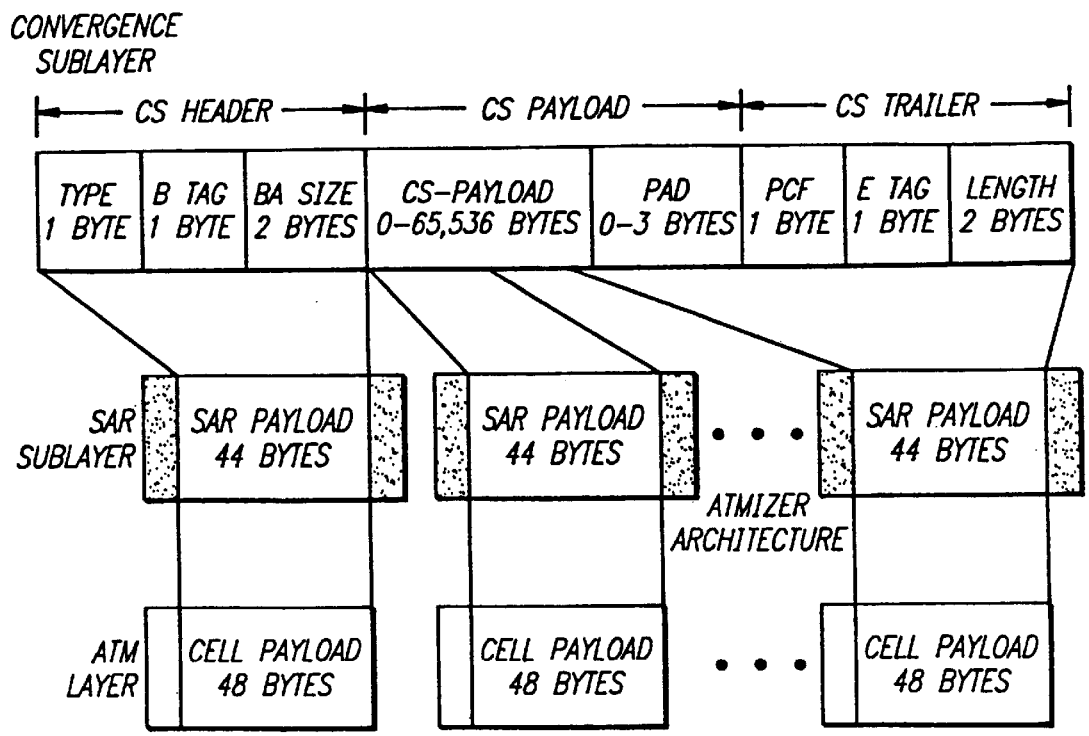
FIG. 21 depicts an ATM packet structure.
Figure 22:
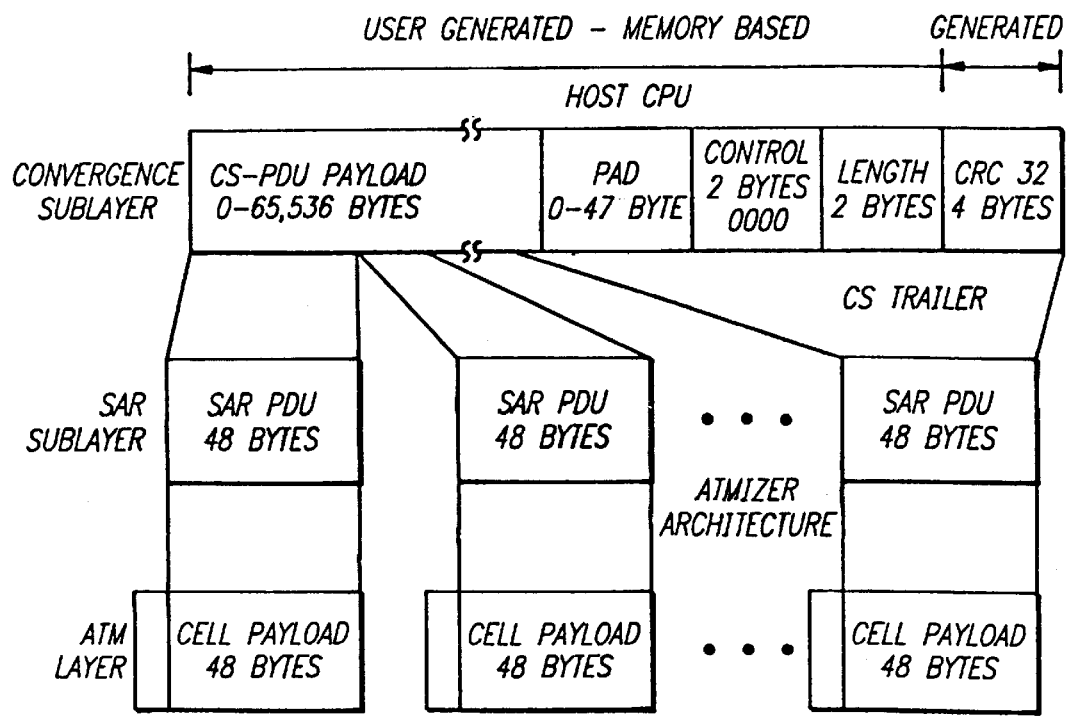
FIG. 22 depicts certain ATM protocol sublayers.

FIG. 21 and FIG. 22 illustrate formatting for ATM cells. FIG. 23A shows a map for ATM cells stored in the VCR 501. FIG. 23B shows an example of an AAL5 receive cell holder and transmit cell builder. FIG. 23C depicts an AAL5 transmit channel parameter entry table. FIG. 23D depicts an AAL5 receive channel parameter entry.

Figure 24:
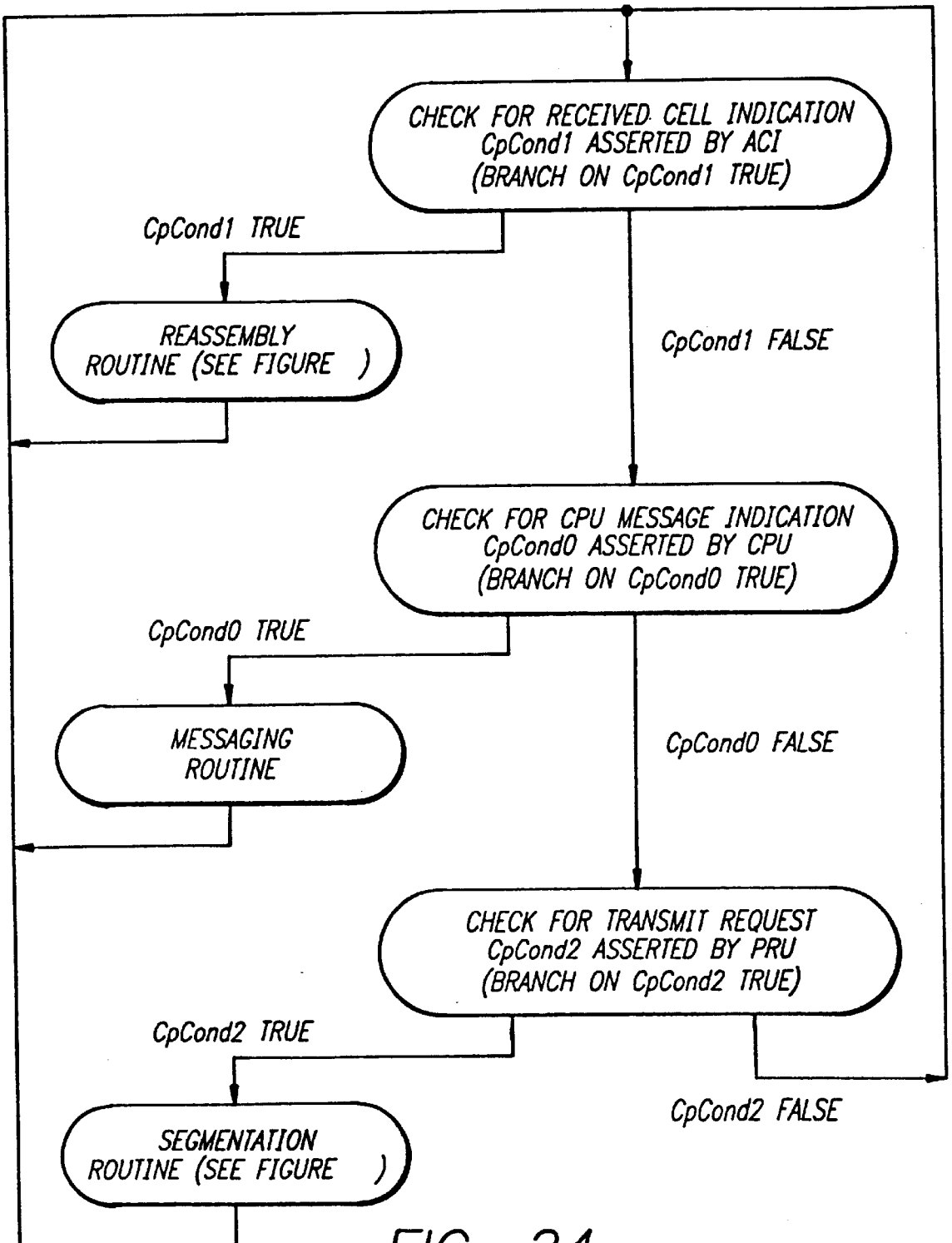
FIG. 24 is a flow chart showing processing steps executed by the network protocol processing unit.
Figure 25:
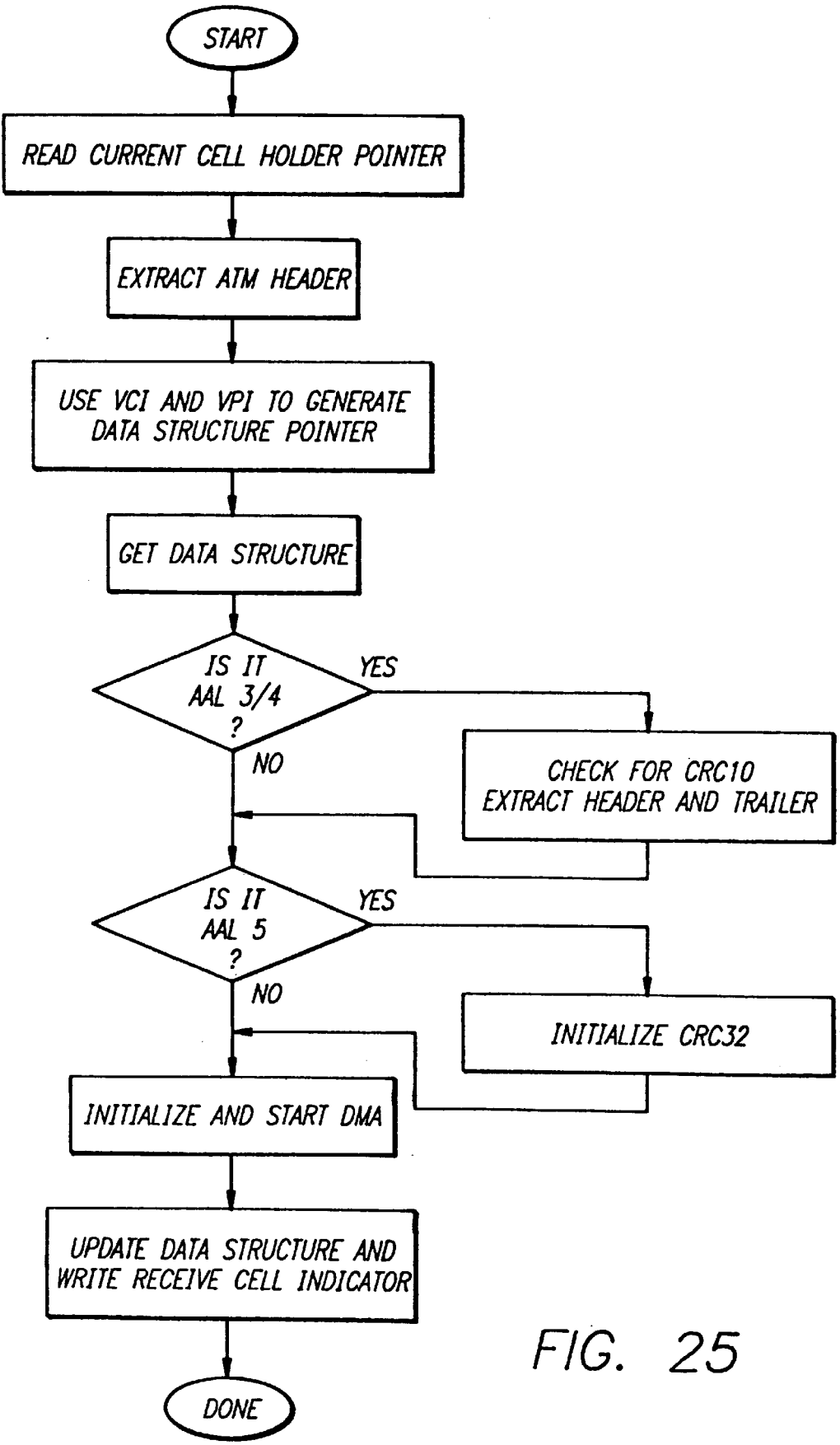
FIG. 25 is a flow chart depicting steps executed by the network protocol processing unit in processing an ATM cell that has been received.
Figure 26:
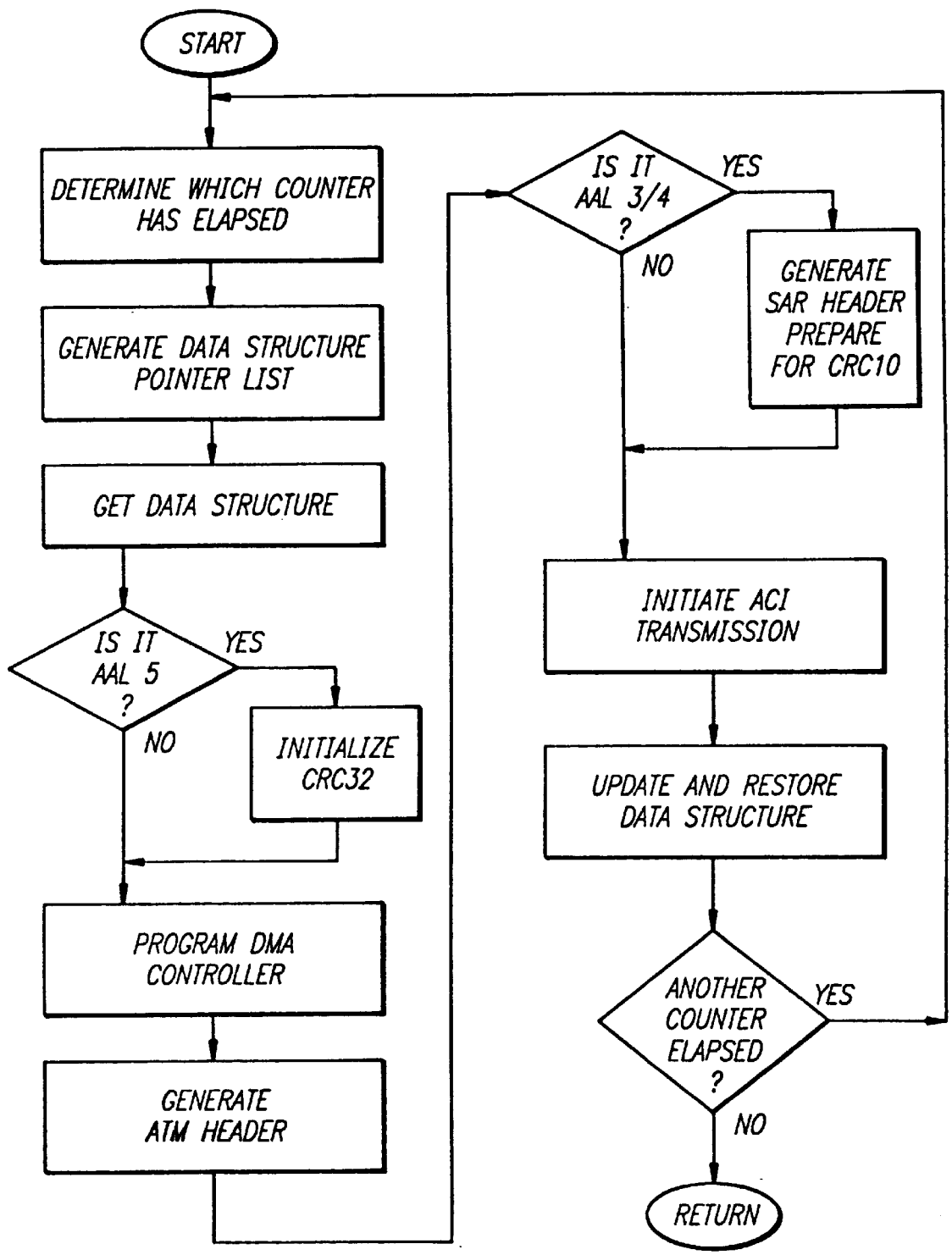
FIG. 26 is a flow chart depicting steps executed by the network protocol processing unit in processing an ATM cell that is to be transmitted.

FIG. 24 is a flow chart depicting processing by the network protocol processing unit of ATM cells. FIG. 25 depicts in more detail the processing of a received ATM cell. FIG. 26 depicts a flowchart showing in more detail the processing of an ATM cell for transmission.

Figure 27:
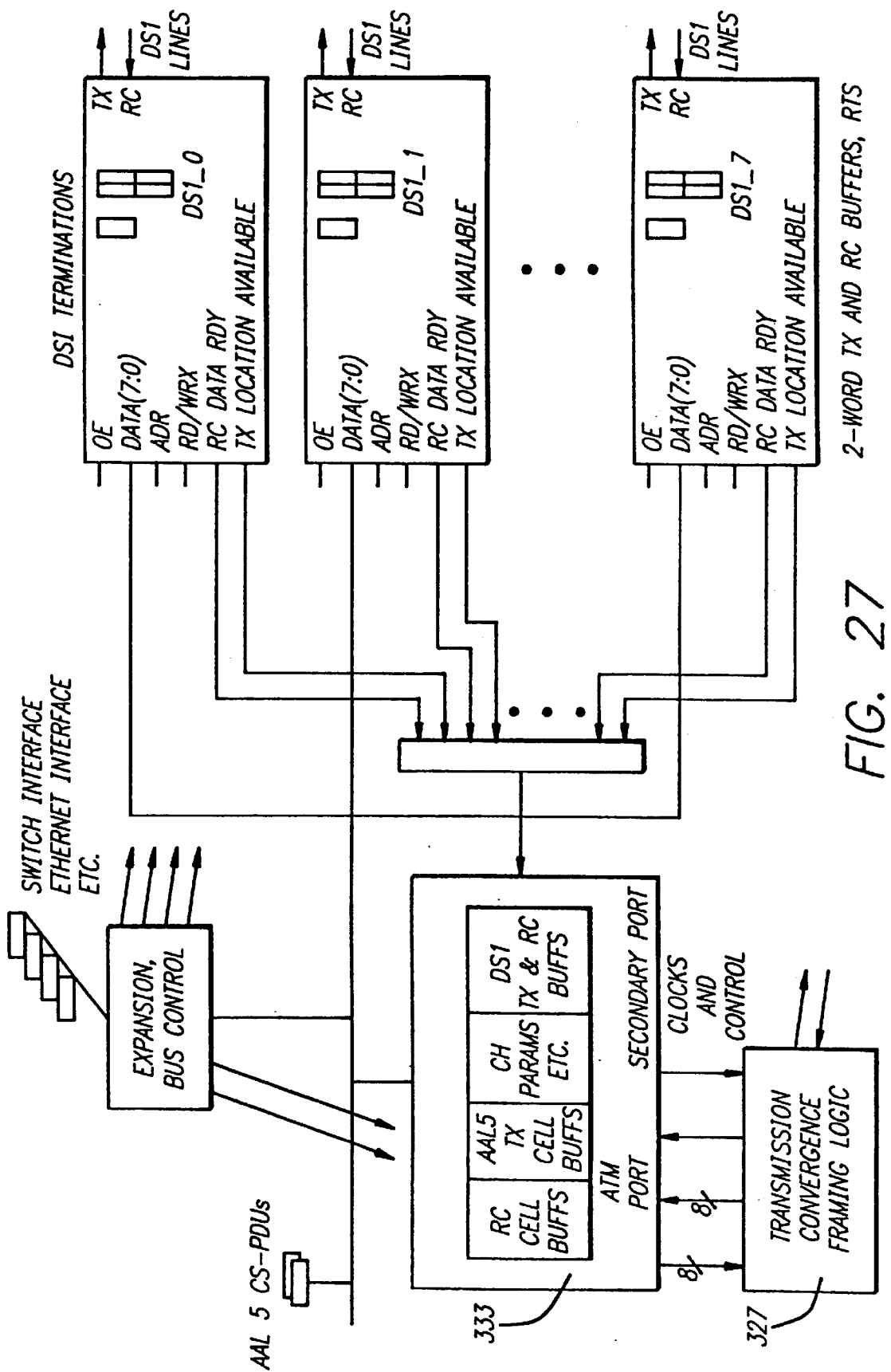
FIG. 27 depicts a circuit for multiple connections to DS-1 terminations.

The present invention contemplates multiport connections to various networks 301 which may employ different protocols. For example one network may use an ATM protocol, while another network may use an Ethernet protocol. FIG. 27 depicts an interface useful for multiple DS one terminations in an embodiment also having an ATM port and an interface to a network employing Ethernet protocol.

Figure 28:
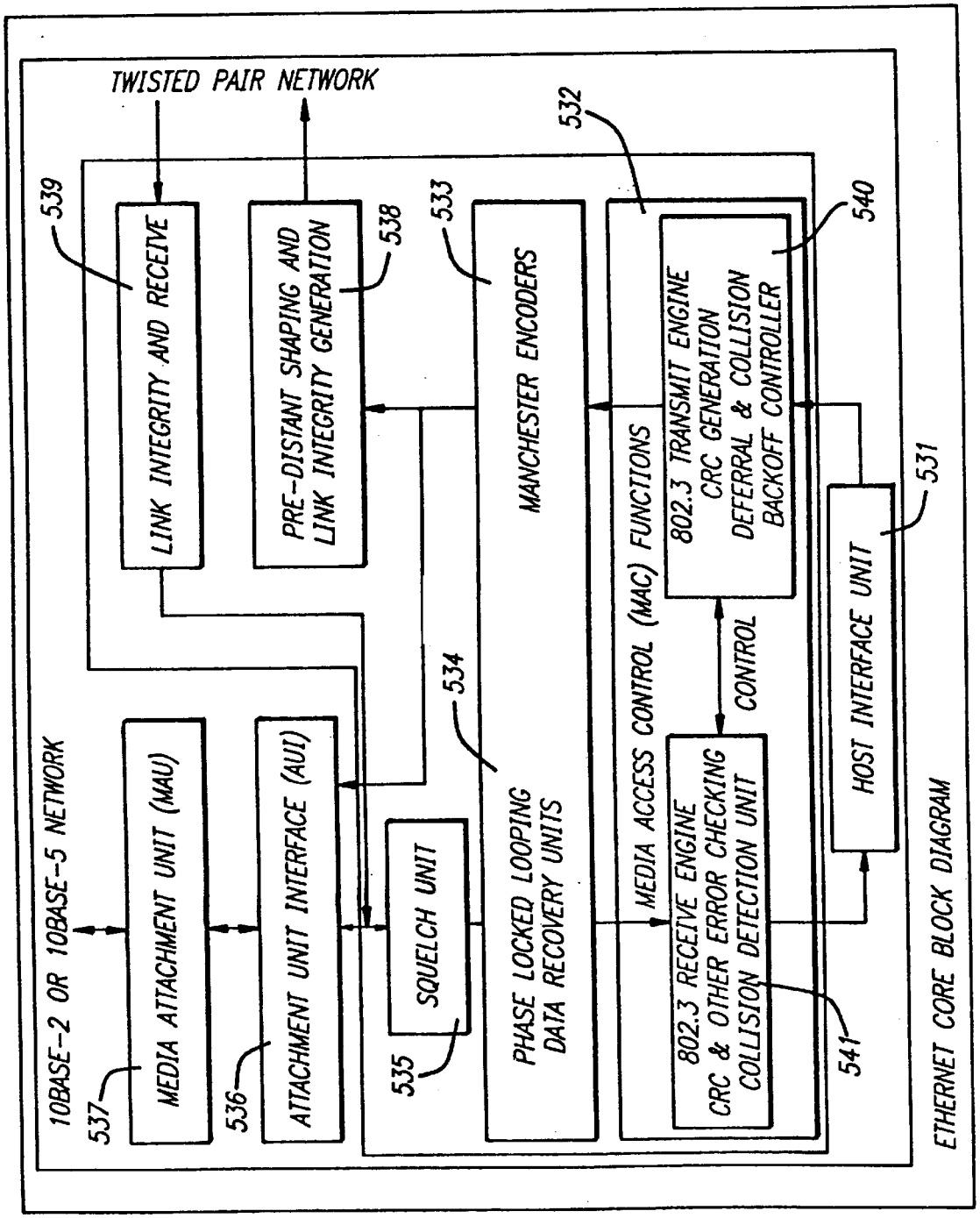
FIG. 28 depicts a block diagram of an Ethernet core interface.

FIG. 28 illustrates an embodiment of a suitable Ethernet core. A network, in this example using Ethernet 10 base-2 or 10 base-5, may be connected to a media attachment unit 537. The media attachment unit 537 is coupled to an attachment unit interface 536. The attachment unit interface 536 is coupled to a squelch unit 535. A twisted pair network connection may be achieved using a link integrity and receive circuit 539 which is coupled to the squelch unit 535. A pre-distort shaping and link integrity generation circuit 538 may also be used. For reception, a phase locked loop and data recovery unit 534 is connected to the squelch unit 535. For transmission, a Manchester encoder 533 is coupled to the pre-distort shaping and link integrity generation circuits 538, and to the attachment unit interface 536. The phase lock loop and data recovery unit 534 is coupled to a media access control (MAC) circuit 532. The Manchester encoder 533 is also coupled to the MAC unit 532. The MAC unit 532 includes a receive engine 541 and a transmit engine 540. These are coupled to a host interface unit 531.

In one embodiment of the present invention, a multiport network adapter is provided. A multiport switch on a chip provides significant advantages in miniaturization, increased performance, transparent and rapid protocol to protocol conversion, and eliminates the need for any external address resolution logic.

Figure 29:
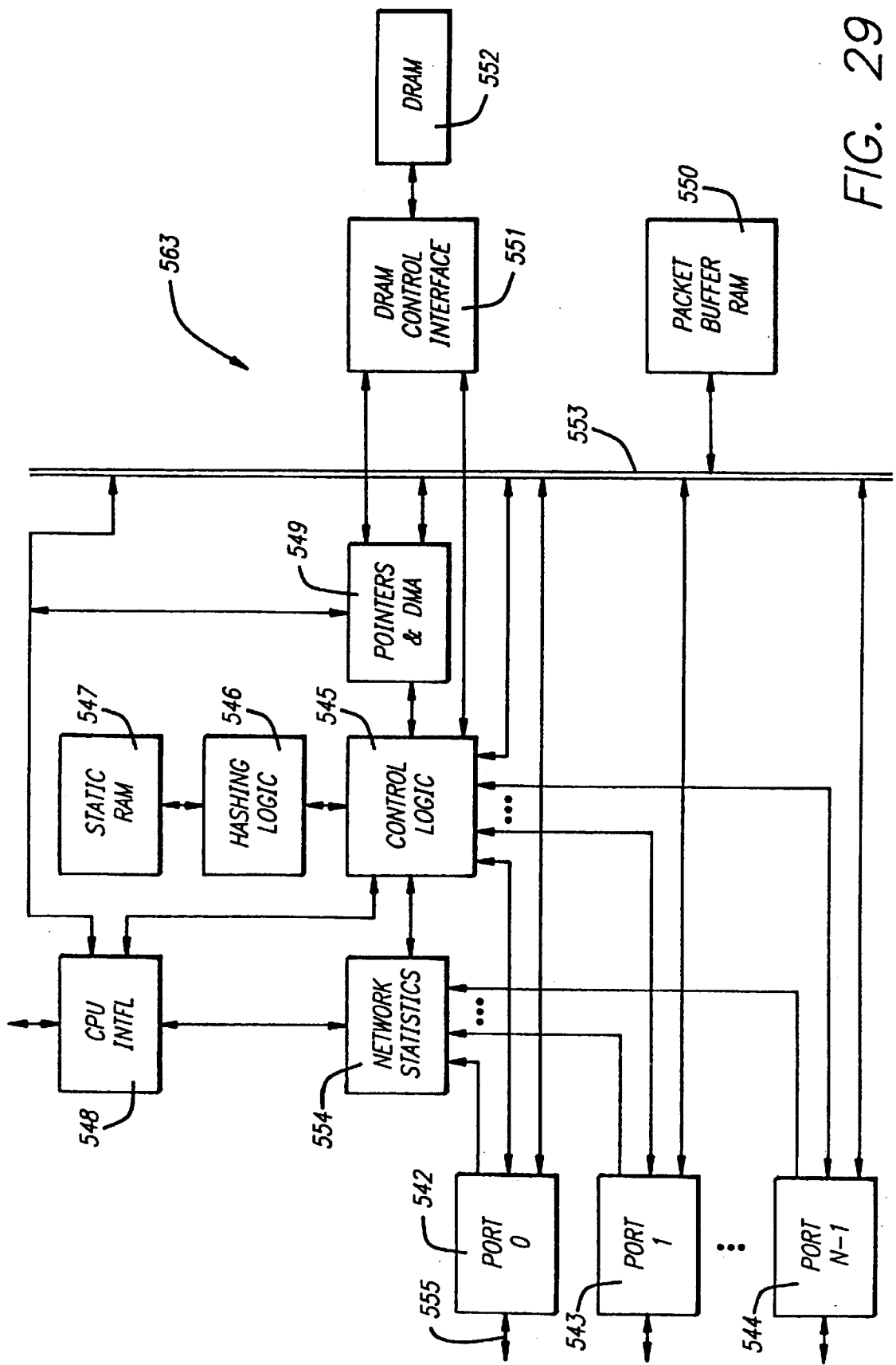
FIG. 29 depicts a block diagram of a network switch which may be used in connection with the present invention.

The multiport network switching circuitry shown in FIG. 29 is provided on a single chip or semiconductor substrate. Network lines 555 are connected to a first network port 542. The first network port 542 is coupled to a bus 553. The bus 553 is preferably a high speed bus, such as a PCI bus. The operation of the first network port 542 is controlled by control logic 545. Hashing logic 546 is used for filtering address and header information. Information used by the control logic 545 in switching packets among various ports is stored in a static RAM 547. A second port 543 is shown in FIG. 29, and is connected to second network. As shown in FIG. 29, a plurality of ports may be provided, and port 544 is intended to indicate that.

A packet buffer RAM 550 is coupled to the bus 553. A memory 549 is used for storing pointers and DMA information. A DRAM control interface 551 is provided, which controls a DRAM memory 552.

II. Hashing Logic

Figure 30:
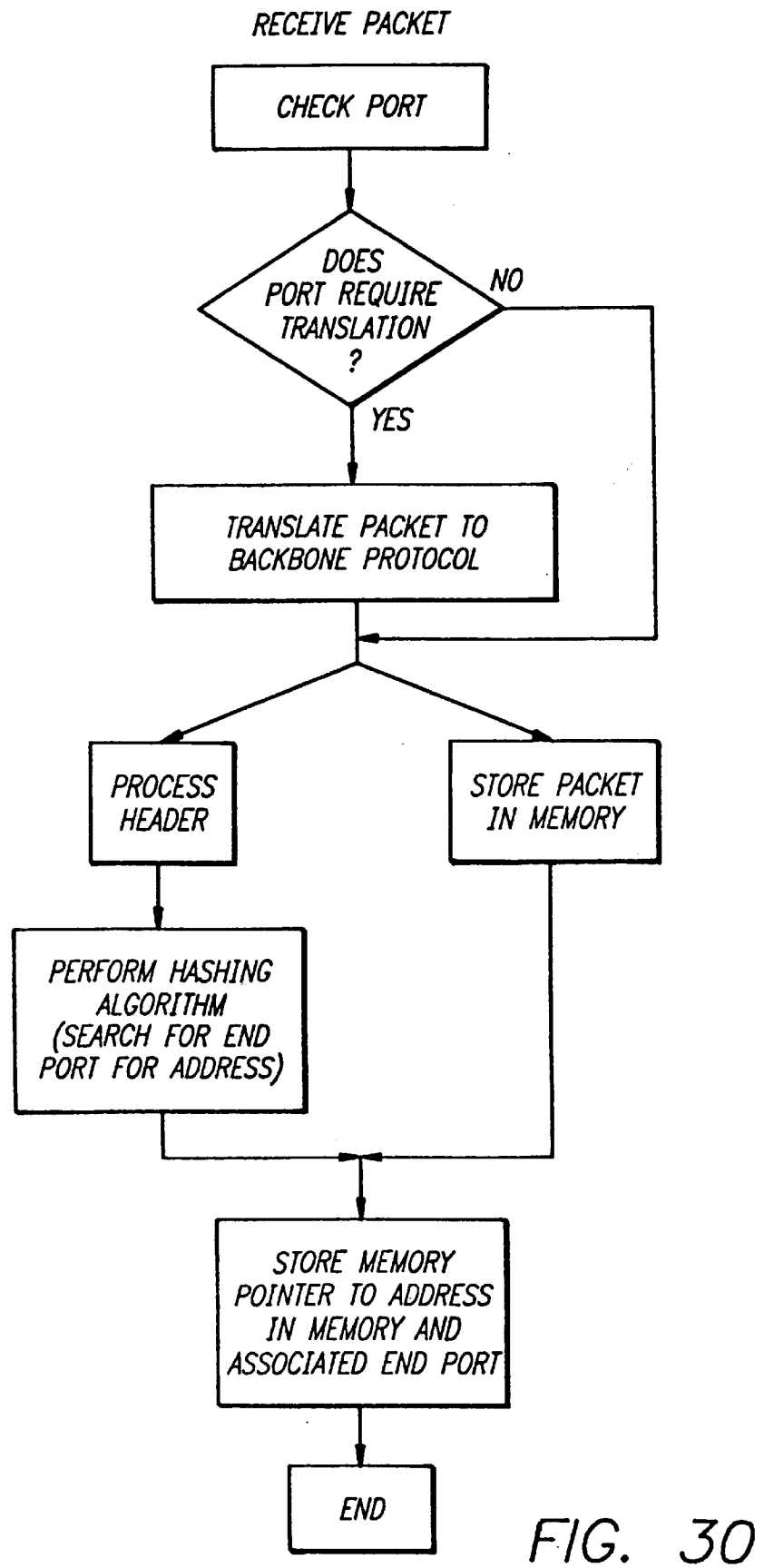
FIG. 30 is a flow chart showing steps executed by the switch in processing a received packet.

A flowchart depicting the processing of a received packet is shown in FIG. 30. The control logic 545, which may be a CPU, checks the ports 542, 543 and 544. Depending upon the protocol employed internally, the data received over a particular port 543 may require translation from one protocol to another. The control logic 545 first checks to determine whether the port 543 in which is being received is one which requires translation. If so, the control logic 545 translates the received packet to the backbone protocol employed internally. For example, an ATM protocol may be employed as the backbone protocol.

Figure 31:
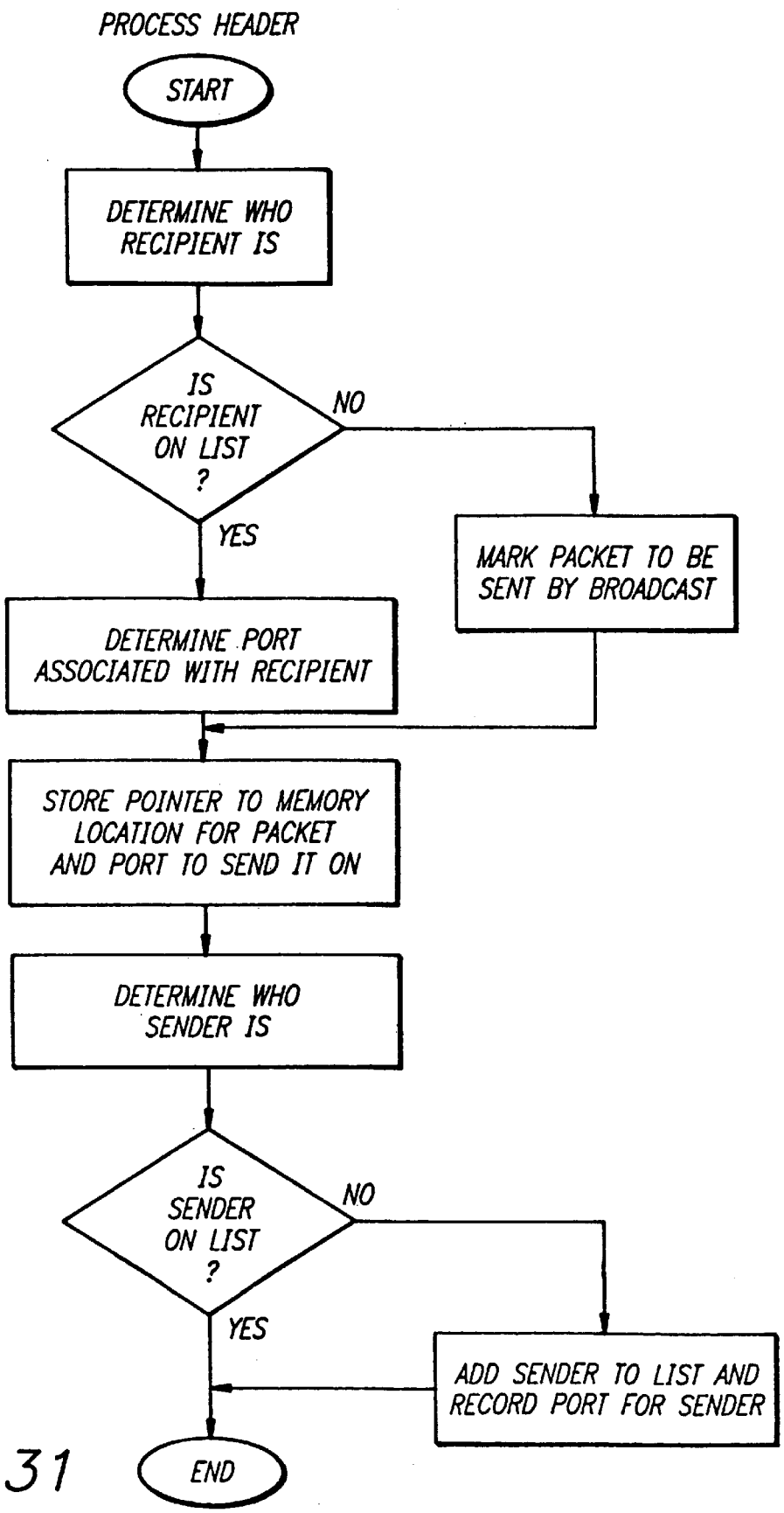
FIG. 31 is a flow chart showing steps executed by a switch in processing the header of a received packet.

The multiport switch then processes the header of the packet in parallel with storing the packet in memory. Details concerning the procedure for processing the header are shown in FIG. 31.

The control logic 545 processes the packet header information. The hashing logic 546 searches for the correct port that a receive packet should be switched to when it is transmitted. Addresses of in systems and associative ports are stored in the static RAM 547, and used by the hashing logic 546 to identify the correct switching information for a received packet. In parallel with these steps, the received packet data is transferred from the port 543 to the packet buffer RAM 550. The control logic 545 stores memory pointers in memory pointer memory 549 which indicates where the packet is stored in the packet buffer RAM 550. Alternatively, packets may be stored in dynamic RAM (DRAM) 552, and the pointer memory 549 would contain a pointer indicating that the information was stored in DRAM 552. The DRAM control interface 551 would use the pointer information to retrieve the actual data from DRAM 552 when the control logic 545 requested retrieval of a particular packet. The packet data information and the packet header are both stored in the DRAM 552. The speed of the DRAM 552 is imported. In some embodiments, the performance of the bus 553 will be limited by the speed of the DRAM 552.

A CPU interface 548 is provided. A direct memory access controller could be provided coupled to an external bus. This could provide a means for cascading multiple switches together. Network statistics are maintained and stored in the network statistics circuit 554.

When a packet is received over a port 542 (for example), the control logic 545 processes the packet header to first determine who the intended recipient of the packet is. The control logic 545 checks the list of known recipients maintained in the static RAM 547 to determine if the intended recipient is on the list. If the recipient is not on the list, the packet must be marked to be sent by broadcasting it over all of the remaining ports 543 and 544. Such a packet will be sent by a technique sometimes as referred to as flooding.

If the receive packet contains the address of a recipient who is on the list maintained in the static RAM 547, the control logic 545 using the hashing logic 546 determines the port 543 which is associated with that recipient. The control logic 545 stores a pointer to the memory location in the DRAM 552 for the packet information and the port 543 that the packet is to be transmitted on, and this information is stored in the pointer memory 549. The control logic 545 then attempts to update or build its lists maintained in the static RAM 547. The control logic 545 will then examine the packet header to determine who the sender is. The control logic 545, using the hashing logic 546, will determine whether the sender is on the list maintained in the static RAM 547. If the sender is not on the list, the control logic will add the sender to the list and record the port 542 that the sender is connected to.

Figure 32:
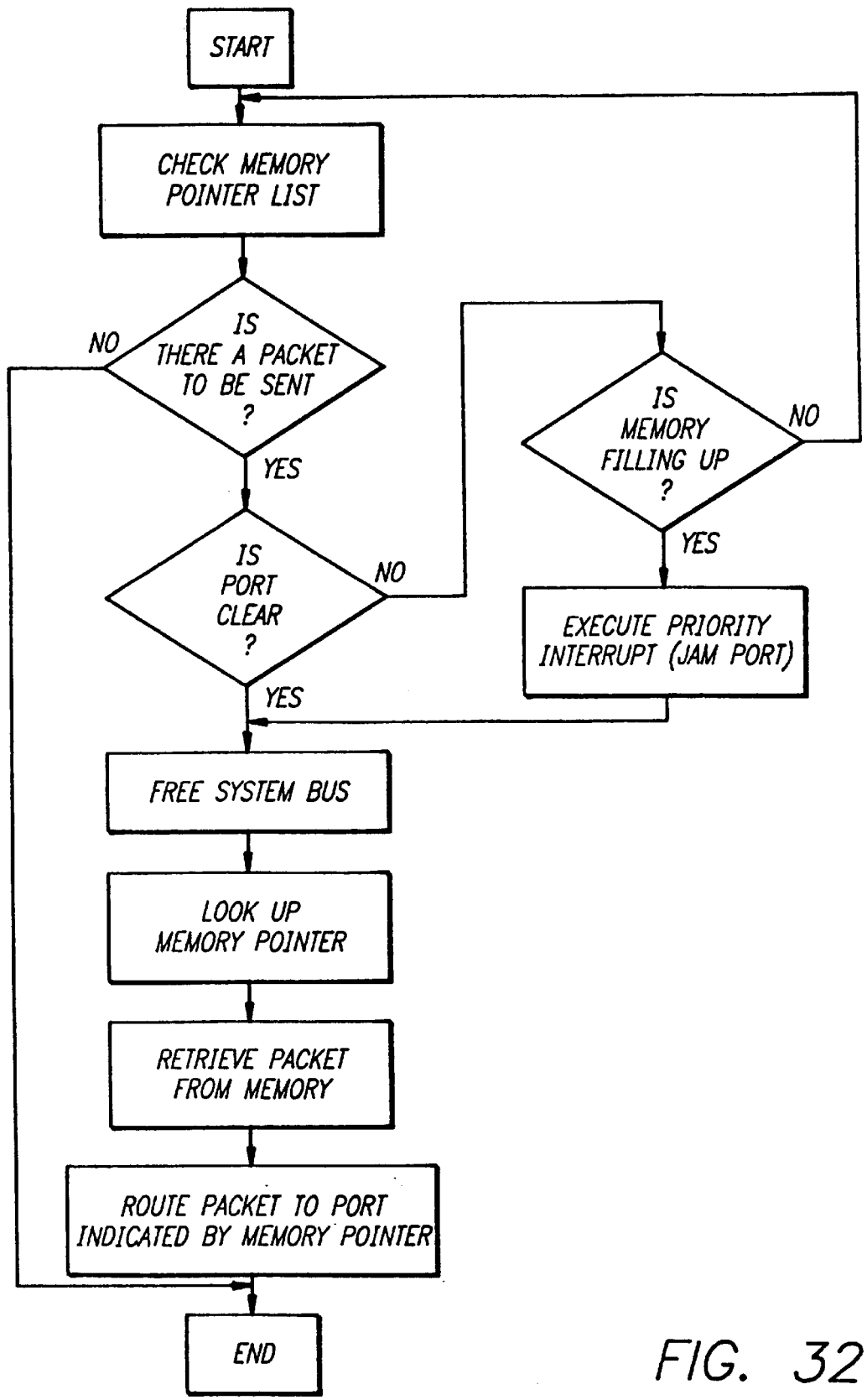
FIG. 32 is a flow chart depicting steps executed by the switch in retrieving and transmitting a packet.

The flowchart for retrieving the packet and sending it is shown in FIG. 32. The control logic 545 will check the memory pointer list 549 for indications of packets. It will determine whether there is a packet to be sent. If there is, it will check the port 544 to determine if the port is clear. If the port is not clear, the control logic 545 will check to determine whether the memory is filling up. If available memory for additional packets is still available, control logic will proceed to check for another packet to be sent. However, if the memory is filling up, and in danger of becoming full, the control logic 545 will need to take action to insure that it does not run out of memory. In that event, the control logic 545 will execute a priority interrupt. One example of such an interrupt routine would be to jam the port 544. According to a typical network protocol employed in the network connected to port 544, jamming the port 544 will cause collisions with packets being transported over the port 544. Those collisions will be detected by users connected to the network, and the network protocol will require such users to wait a random period of time before attempting to retransmit the packets. During this waiting period, the control logic 545 can seize the network and transmit the desired packet over the port 544 before memory fills up.

When a packet is to be retrieved and transmitted, control logic 545 will free the system bus 553. The control logic 545 will then look up the memory pointer in memory 549, and use the information in the memory pointer to retrieve the packet from memory 552. The control logic 545 will then route the packet to the port 544 indicated by the information stored in the memory 549. The packet will then be transmitted over the port 544 to the network connected to that port.

When packets of data are typically received by a hub 311 or a router 312, address information contained in the packet header must be used to determine where the packet is to be switched. Packet address information may typically comprise 48 bits, and simple algorithms for comparing such information with all known destination addresses would be impractical, because speed is critical in such applications. Hashing logic 546 may implement suitable hashing algorithms, which are used in network switching systems such as routers 312 and hubs 311 to quickly search a table of address/port combinations to determine the correct port for a specific destination address. This enables the packet to be switched to the port containing the end user to whom the packet is addressed, eliminating the need to broadcast the message across all ports in a shotgun approach. Flooding the network with broadcast packets increases traffic on the network, and slows throughput. Hashing logic 546 is used to implement fast methods for determining the correct port for a given destination address, and by avoiding the need to broadcast packets, such arraingements effectively increase the bandwidth of the network 301.

In token ring, Ethernet, FDDI and CDDI network protocols, the address of the end user is contained in 48 bits in the header of the packet. The hashing logic 546 implements a suitable hashing algorithm which in a preferred embodiment can be performed on a variable number of bits from one to all 48. A variable window can be applied to the address so that, for instance, bits three through seven may be chosen as the bits to hash. The hash does not always have to start with bit zero. Utilizing a microprocessor, a hash key size can be selected by software programming. Similarly, a "window" location, i.e., the bits selected from the 48 bits of address information which will be hashed, can be selected under software control using a microprocessor implementation.

Figure 46:
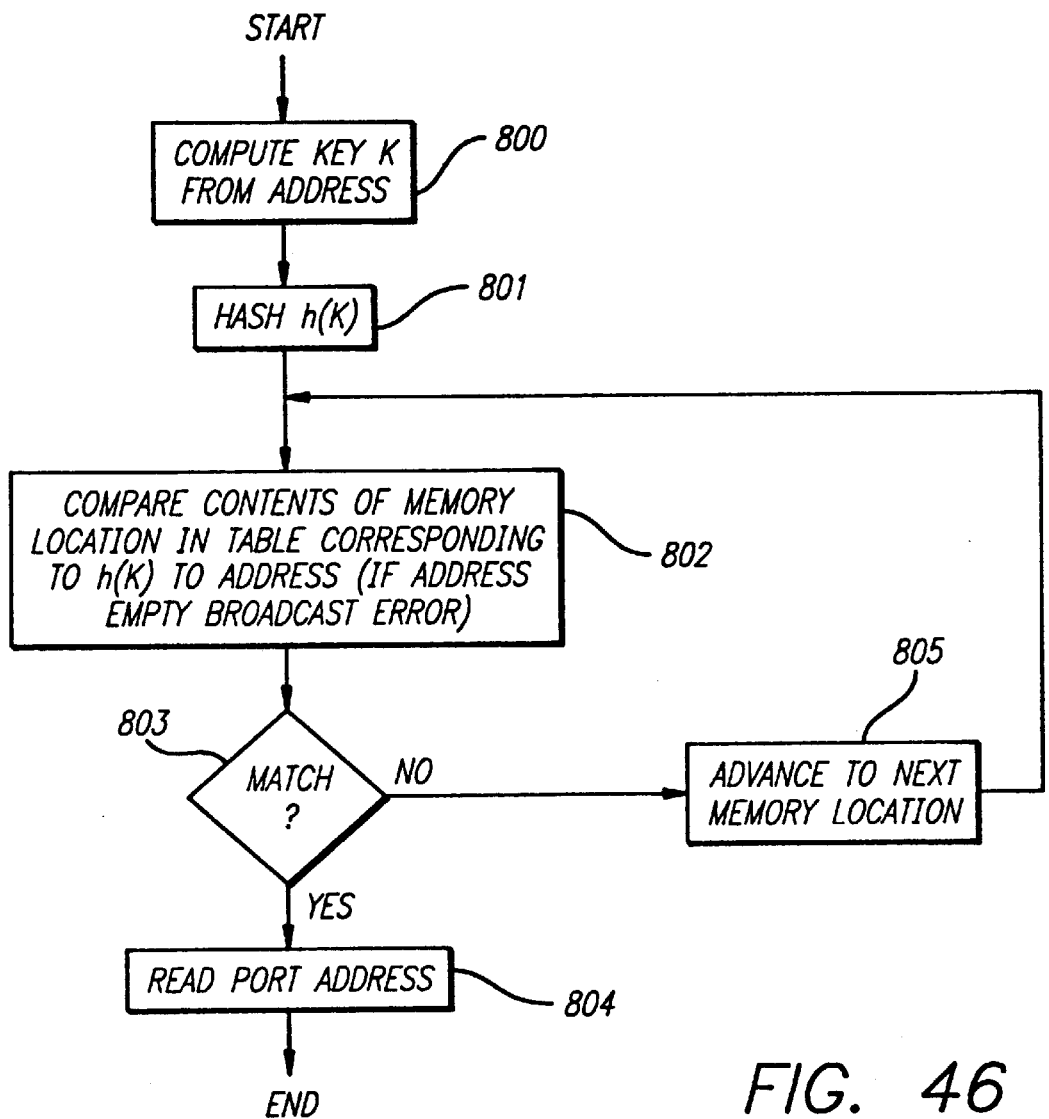
FIG. 46 is a flow chart illustrating steps in a hashing method in accordance with the present invention.

FIG. 46 depicts a flow chart of certain steps performed during hashing. In a hash method, a key is selected from a subset of the total address bits contained in the packet header in step 800. Hash logic 546 computes an address in a table in step 801. In step 803, the computed address contents are compared to the entire destination address to identify whether there is a match. As shown in step 804, if there is a match, then the corresponding port address stored in the table has been located and the search is successful. If the contents do not match, a collision has occurred, and the hash address is incremented by one in step 805, and the comparison is performed again as described above in step 803. In this fashion collisions are allowed by having a linked list approach for overflow which allocates extra memory slots to each possible hash. If the table location corresponding to the hash is empty, then the system will have to either (1) broadcast an error and not forward the packet since it cannot identify the port to route the packet, or (2) broadcast the packet to all of the ports.

Figure 47:
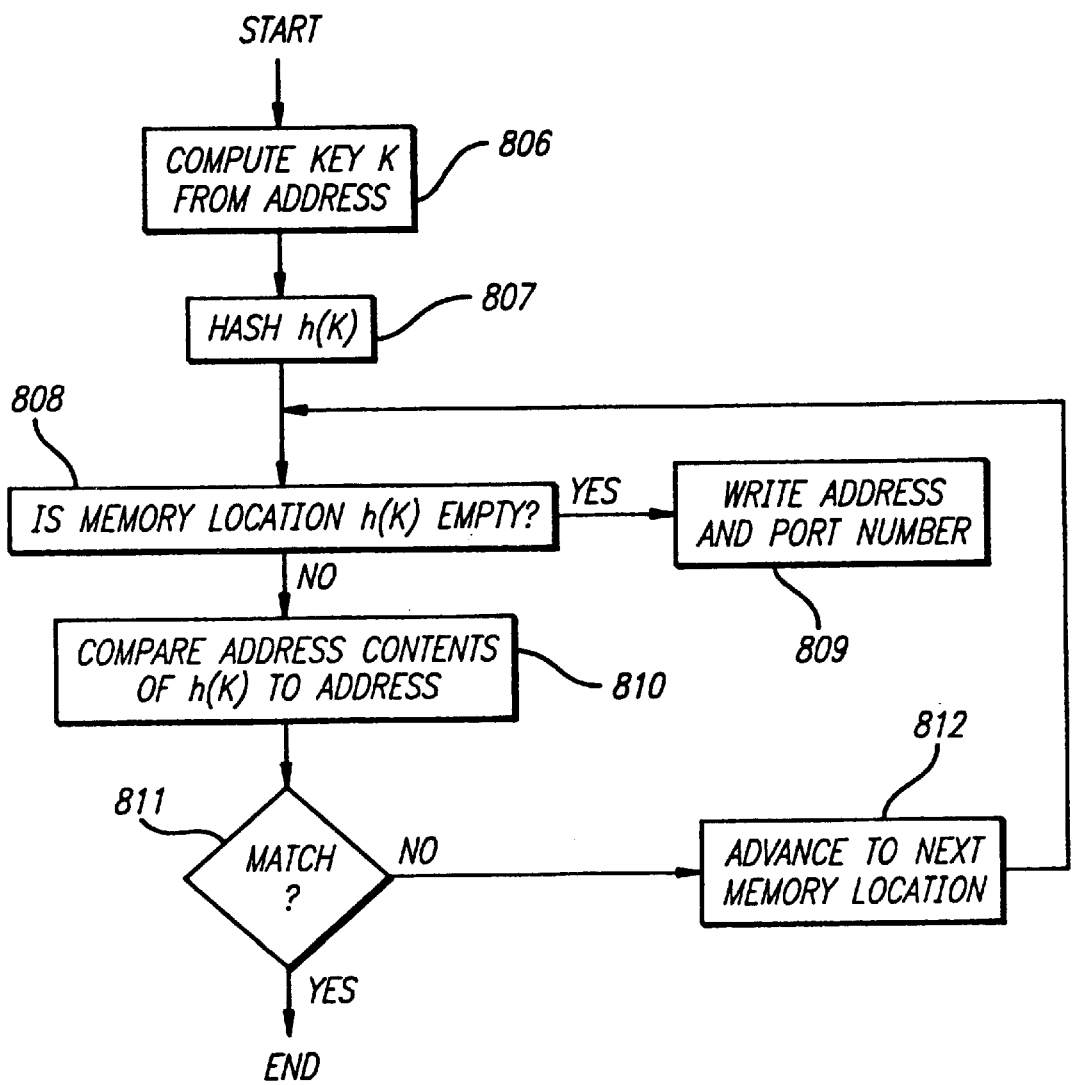
FIG. 47 is a flow chart further illustrating steps in a hashing method in accordance with the present invention.

Referring now to the flow chart shown in FIG. 47, the system learns the end user addresses and corresponding port from the originator of a packet. The system records the port address from the incoming message, hashes the address within the packet corresponding to the originator in step 807, looks up in the table for that particular hash address value in step 808, and compares the contents in step 811. If there is a match, the system does nothing since the end user address and port location are already stored in the table and therefore known by the system. This is shown by the step "end" in FIG. 47 associated with step 811. If the hash address is empty the system writes to that location the end user address and the port number in step 809. If the address is full but the contents are different, the system increments the hash address by one value in step 812, and proceeds to step 811 to compare the contents of that location as described above. Collisions are thus handled by allowing for overflow in the memory.

If the overflow is full and the address has not been found, the system can be programmed to write over the contents of one of the memory locations for that hash key. Extra table memory can be used to record the number of messages sent to a particular address from the hashing exercise performed on every packet. In that way, the most popular address locations could be saved in the table and the less popular addresses dropped so that the overflow memory locations for each hash address can be minimized.

In the above example, the memory size, the number of ports, the hashing algorithm, the size of the overflow list for collisions, the key size and the key window on the address are all programmable.

An example of a suitable hashing algorithm is h(K)=K modulo M where h is the hash function address result, K is the key and M is a value such that O<h(K)<M. Since the scheme described above enables variable key sizes and key windows, the user may select the appropriate values for the key "K" and the value "M". The user may therefore wish to hash on three bits of the end user address corresponding to bits five, six and seven (note variable window). Since three bits in a digital system correspond to eight specific values, and since h(K)<M, M must be greater than eight. Since the best values for M to minimize collisions are odd, not multiples of three, and are a prime number, the number 11 works well. The corresponding h(K) can then be multiplied by the size of the memory table to compute the address.

Figure 33:
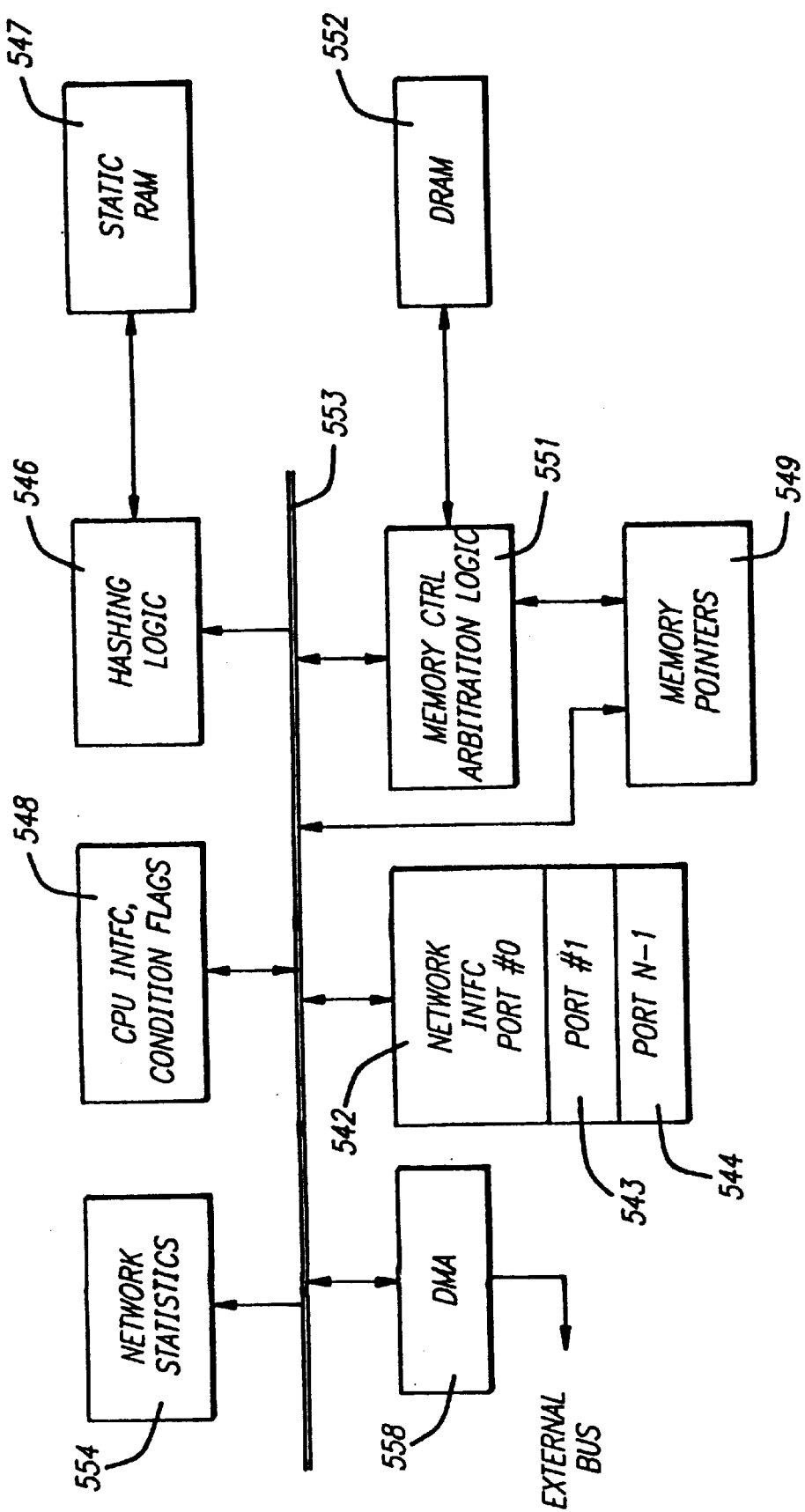
FIG. 33 is a block diagram of an alternative embodiment of a network switch which may be used in connection with the present invention.
Figure 34:
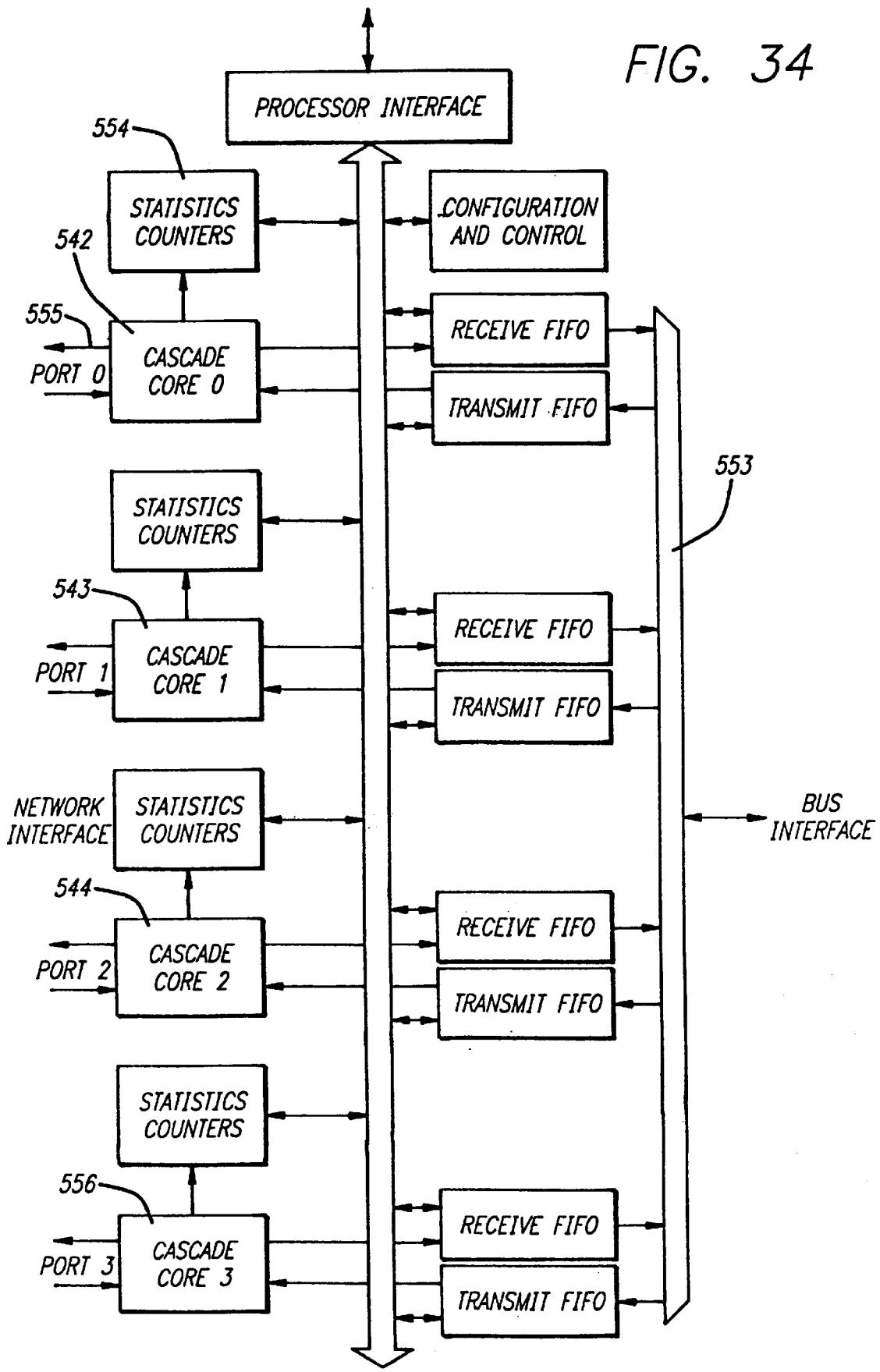
FIG. 34 is a block diagram of a Quad CASCADE circuit.
Figure 35:
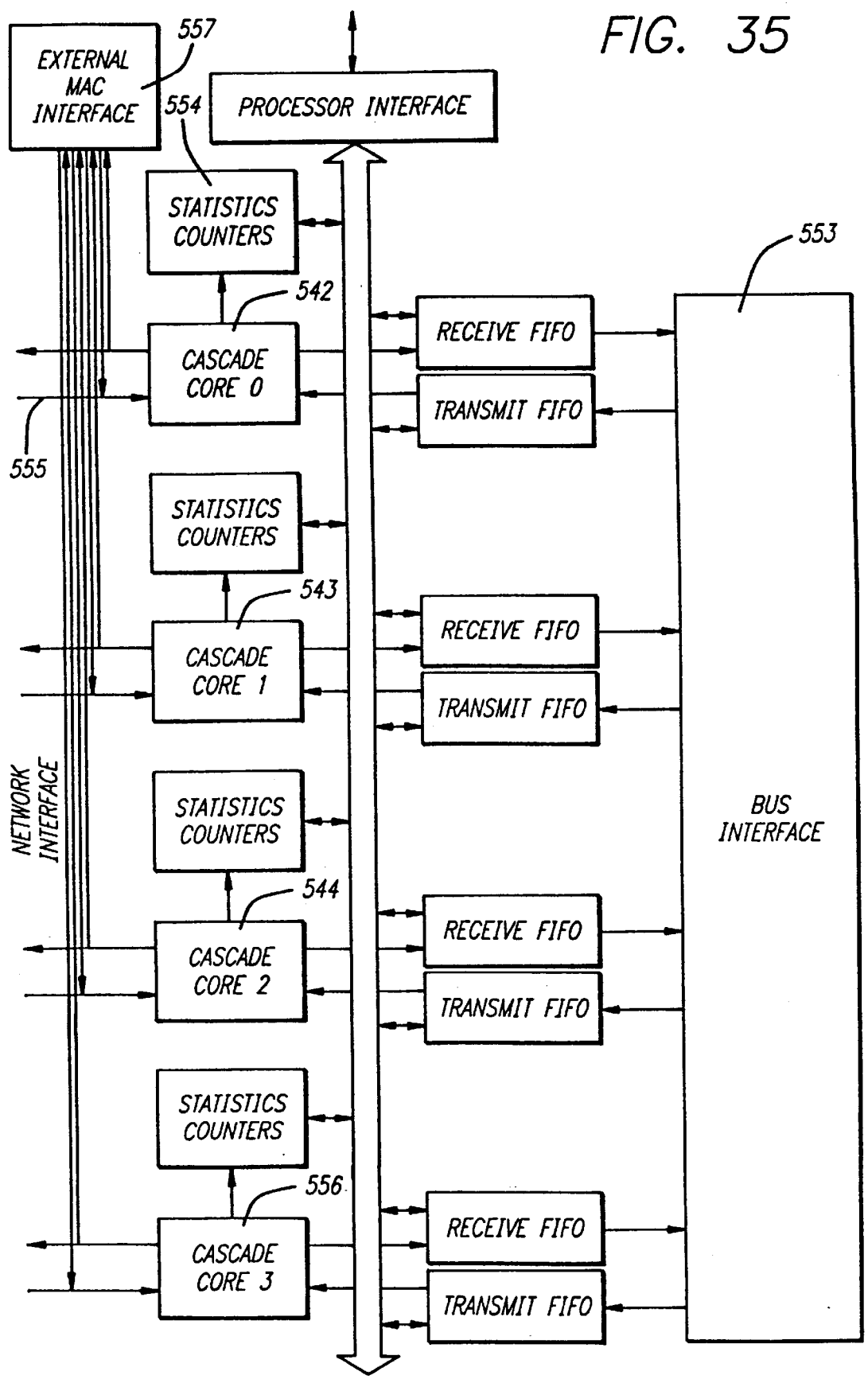
FIG. 35 is an alternative embodiment of a Quad CASCADE circuit including an external MAC interface.

The ports 542, 543, and 544 may employ circuits disclosed in "L64380 Quad CASCADE Technical Manual" (Dec. 2, 1994), available from LSI Logic. Considerable circuits are shown in more detail in FIG. 34 and FIG. 35. FIG. 35 shows an external MAC interface 557. FIG. 33 shows an alternative embodiment of the multiport switch shown in FIG. 29, including a DMA controller 558.

Figure 36:
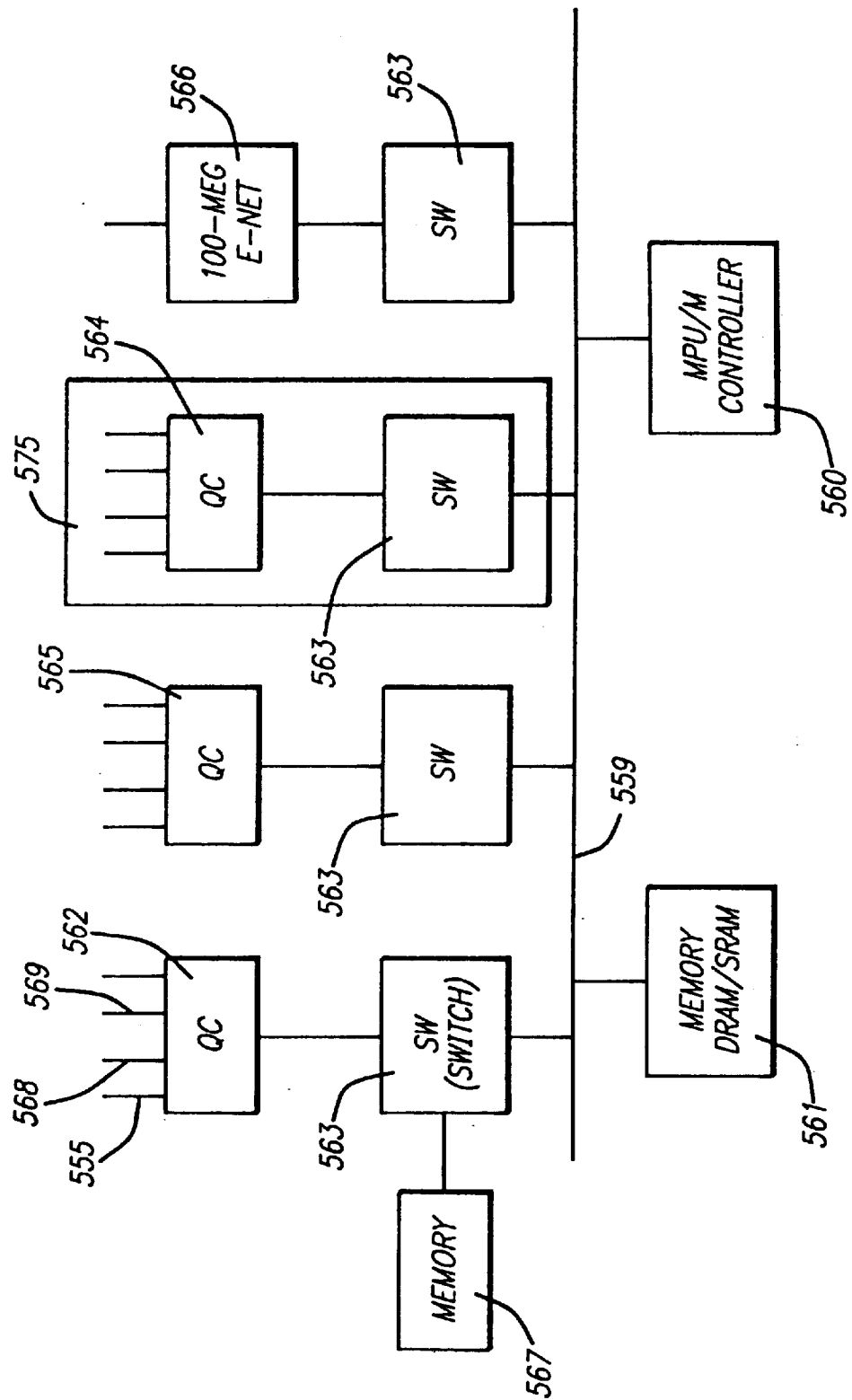
FIG. 36 is a block diagram of a network architecture which may be used in connection with the present invention.

A network architecture employing a plurality of network switches, which each comprise the structure shown in FIG. 29 and FIG. 33, would have significant advantages. FIG. 36 depicts a network architecture incorporating switches 563 which may be constructed in accordance with FIG. 29, or alternatively, the circuit illustrated in FIG. 33. Each switch 563 may be connected to network interfacing circuitry 562, 565, 564, or 566. For example, one of the network switches 563 is coupled to a Quad CASCADE circuit 562. In this example, the Quad CASCADE circuit 562 provides connection to four network ports. One of the network connections has been identified by reference numeral 555. Lines 568 are connected to a different network. Similarly, lines 569 are connected to yet another network. The details concerning a suitable Quad CASCADE circuit 562 are shown in "L64380 Quad CASCADE Technical Manual" (Dec. 2, 1994), available from LSI Logic.

FIG. 36 illustrates an interconnection 566 to a 100 Mbs Ethernet network. Details of a suitable compacted and scalable dedicated Ethernet core, also referred to as a CASCADE core, are disclosed in "Compacted and Scalable Dedicated Ethernet (CASCADE™) Core Technical Manual" available from LSI Logic.

The network architecture illustrated in FIG. 36 utilizes a uniform backbone protocol on an internal bus 559. A CPU or controller 560 may be used to control arbitration and switching of packets among the various switch circuits 563. Packets may be stored in memory 561. An optional memory 567 may be provided address storage. Preferably, a CPU or control logic 545 is provided in each switch 563. Packets can be converted to the backbone protocol by the switch 563 before they are placed on the bus 559. Alternatively, the controller 560 (which may also be a CPU) may handle conversion of packets to the backbone protocol. This network architecture provides for transparent communication among networks having different protocols. The network architecture shown in FIG. 36 can simultaneously switch graphic between a plurality of different networks employing different protocols, such as Ethernet, ATM, FDDI, Token Ring, etc. The networks can be LANs, WANs, or a mixture of both.

In operation, the controller 560 may strip off packet headers and store addresses of the port that the received is to be switched to. The controller 560 in one embodiment may employ the procedures shown in FIG. 30, FIG. 31, and FIG. 32 for processing and switching packets. In one embodiment, pointers and packet data may both be stored in the same memory 561, which may be partitioned as desired.

Referring to FIG. 36, an embodiment of the network architecture may provide that the backbone controller 560 need not process packet headers to determine the port to which the packet should be switched. If the architecture of FIG. 29 is used for each switch 563, each switch 563 may form its own hashing algorithm to determine the address and port for each packet that is to be transferred over the bus 559. In such a system, a switch 563 would notify the controller 560 of the port that a packet is to be switched to. The controller 560 may check the destination switch 563 associated with that port to determine if the port is busy. If not, the controller 560 may then free the backbone bus 559 to permit transfer of the packet from the sending switch 563 to the destination switch 563. Alternatively, the sending switch 563 may store the packet temporarily in backbone memory 561 and notify the controller 560 of the destination port to which the packet is to be switched. When the port is available, the controller 560 may notify destination switch 563. The destination switch 563 may then retrieve the packet from backbone memory 561 and transmit it out over the destination port.

Figure 37:
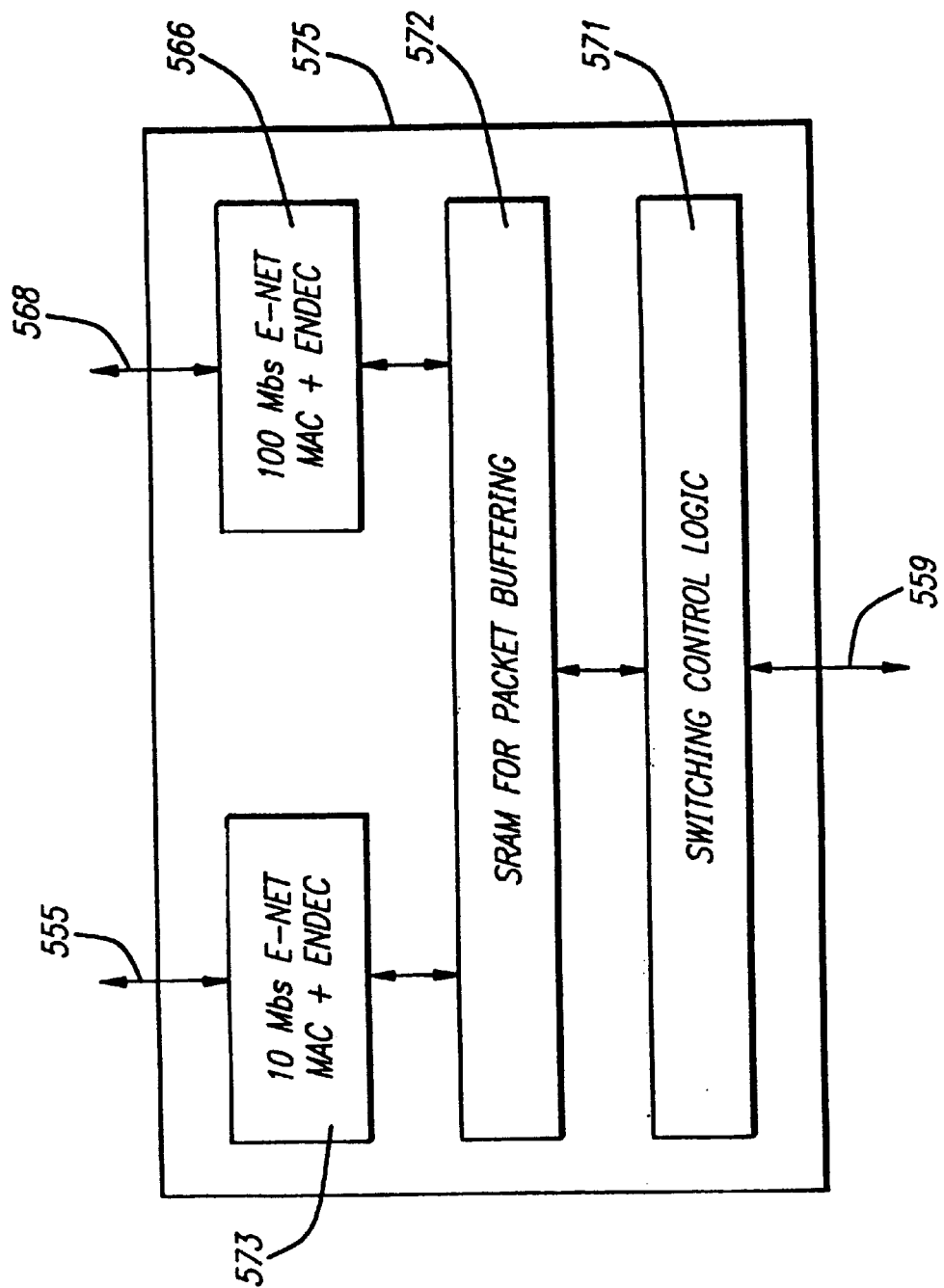
FIG. 37 is a block diagram of a switch and interface unit suitable for using the network architecture done in FIG. 36.

FIG. 37 illustrates an alternative embodiment for a switching interface unit 575. In this example, connection is made to a 10 Mbs Ethernet through network connection 555 and connections made to a 100 Mbs Ethernet through network connection 568. The network connection 568 is facilitated by a 100 Mbs Ethernet MAC and encoder/decoder circuits 566. The network connection 555 is made through a 10 Mbs Ethernet MAC and encoder/decoder 573. Circuits such as those shown in FIG. 28 may be employed. SRAM memory 572 is provided for packet buffering. The buffer 572 is coupled to switching control logic 571. The switching control logic 571 is coupled to the backbone bus 559. Referring to FIG. 36, the controller 560 may perform hashing of packets to determine the port to which they should be switched utilizing switching interface units 575 such as that shown in FIG. 37. If connection to a network employing ATM protocol is desired, the Ethernet MAC 566 may be replaced with SONET/SDH framers and ATMTC circuits 327, and ATMSAR circuits 328, such as those shown in FIG. 2. Additional disclosure of a SONET/SDH physical layer interface is disclosed in "SONET/SDH Physical Layer Interface (PLI) Technical User's Manual" (April 1994), available from LSI Logic Additional disclosure is shown in "51/155 Mbps SONET ATM UNI Processor" data sheet (1994), available from LSI Logic Optionally, interface architecture such as is shown in FIG. 38 and FIG. 39 may be employed. These interfaces are described in more detail later.

Referring to FIG. 36, in a preferred embodiment each switch 563 and network interface 564 should be fabricated on a single chip or substrate. Similarly, switch 563 and Quad CASCADE circuit 562 should be fabricated on a single chip or substrate.

Figure 40:
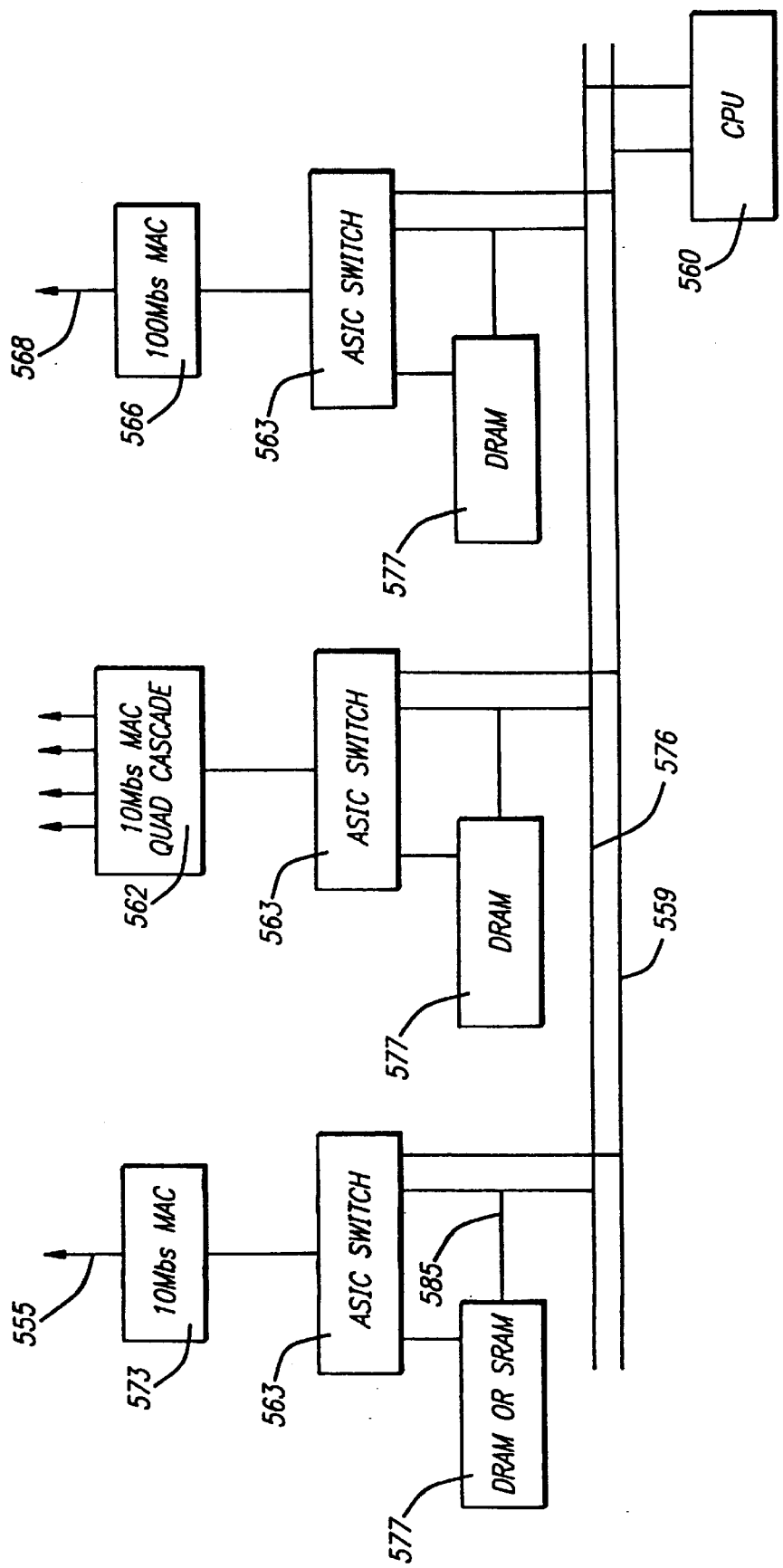
FIG. 40 is a block diagram of an alternative network architecture embodiment.

FIG. 40 illustrates an alternative embodiment of a network architecture.

The network architecture illustrated in FIG. 40 utilizes a CPU 560. The switches 563 are each connected to a first backbone bus 559. Each application specific integrated circuit (ASIC) switch 563 is also connected to a second backbone bus 576. Of course it should be understood that more than three ASIC switches 563 may be connected together in the configuration in FIG. 40. The additional backbone bus 576 may be used to increase performance of the network architecture. Data may be exchanged between two switches 563 simultaneously while data is being exchanged between two other switches 563, or between the CPU 560 and DRAM 577. In this configuration, each ASIC switch may have its own associated DRAM 577. Packets may be temporarily stored in DRAM 577 until the switch 563 is ready to process the packet, or while the switch 563 is processing a packet header. If a packet being transferred from one switch 563 to another switch 563 is destined for a port which is busy, the destination switch 563 may temporarily store the packet in DRAM 577 associated with that switch 563. Although the embodiment illustrated in FIG. 40 only illustrates connections to Ethernet networks, it should be understood that a variety of different network protocols may be employed. One advantage of the network architecture of FIG. 40 is that switching between different network protocols may be easily facilitated. The CPU 560 may be a RISC processor, an i960 controller, a MIPS controller, or an x86 CPU such as a 286, 386, or 486, or it may be a Pentium processor. The interface 573 could be a MAC Singleton, or could be a Quad CASCADE circuit 562.

Referring to FIG. 36, packets to be switched between the switches 563 may be stored in a central DRAM 561. The address information is stored in a memory 567 connected to each switch 563.

In the architecture shown in FIG. 40 each DRAM 577 may have a direct connection 585 to a backbone bus 576. Both the address information and the packet are forwarded to the DRAM 577 associated with each switch 563. Each switch 563 determines the port address that contains the end user that a received packet is intended for. Thus, a switch 563 will signal to the host bus 576 or 559 controlled by the microprocessor 560 that it wants to forward the packet to the switch 563 containing the address port. The microprocessor 560 will check to see if the end port is busy and, if not, allow packet to be forwarded from the DRAM 577 to the switch 563 that controls the port connected to the end user that the packet is intended for. If the port is busy, the microprocessor 560 may maintain a table of pending packet transfers and, when the port is free, access the DRAM 577 directly to transfer the packet to the destination switch 563 when the port is available. Alternatively, the microprocessor 560 may transfer packets from one DRAM 577 to another, and simply notify the associated switch 563 each time that a packet is placed in the DRAM 577 associated with that switch 563.

Figure 41:
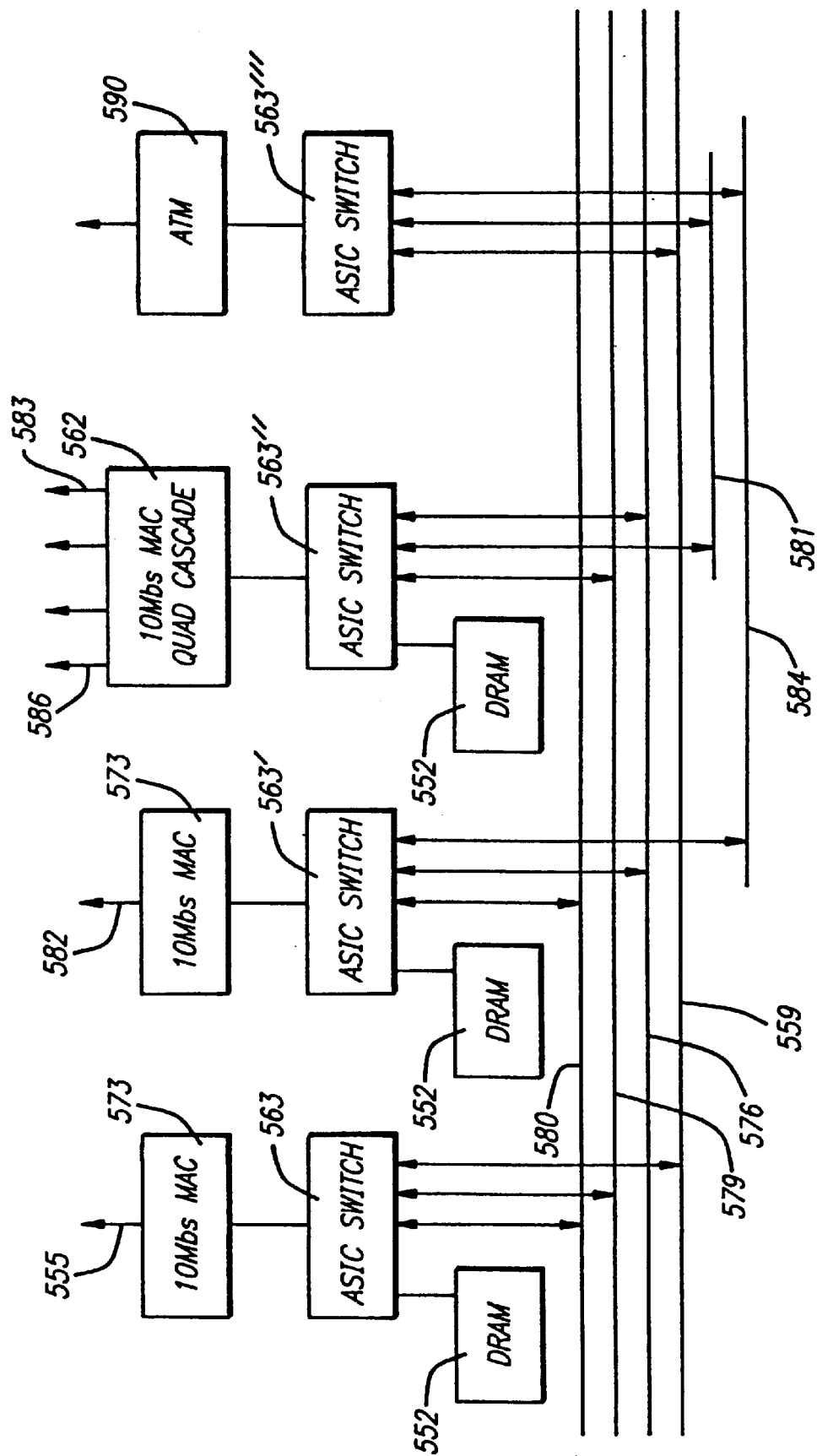
FIG. 41 is a block diagram of an alternative network architecture embodiment using a plurality of dedicated backbone buses.

FIG. 41 illustrates an alternative embodiment of a network architecture. This embodiment has particular advantages in speed and throughput by employing multiple dedicated backbone buses. Each ASIC switch 563 may comprise the circuit configuration shown in FIG. 29. Alternatively, the structure depicted in FIG. 33 may be used. Each switch 563 incorporates its own hashing logic 546 and maintains its own list or table of recipient addresses and associated ports in a memory 547. Control logic 545 determines the port associated with a recipient address, and determines which switch 563 is the destination switch.

If, for example, a first switch 563 determines that the recipient of a packet to be switched is connected to a network 582 that is connected through a port associated with a second switch 563'. The control logic 545 will route the packet to a dedicated backbone bus 580 which connects only the first switch 563 and the second switch 563'.

Another example may involve a packet received over an ATM network connected to ATM interface 590. The fourth switch 563''' will in this example, convert the ATM packet to the backbone protocol. In this example, the recipient of the packet is connected to a network 583. The third switch 563'' is connected to the network 583 through a 10 Mbs Ethernet Quad CASCADE interface 562. The fourth switch 563''' transfers the packet to the third switch 563'' over a dedicated backbone bus 581. The third switch 563'' may then transmit the packet to the intended recipient over the port associated with the network connection 583. It should be appreciated that packets may be switched between the third switch 563'' and the fourth switch 563''' over dedicated backbone bus 581 simultaneously while packets are being transferred from the first switch 563 to the second switch 563' over the dedicated backbone bus 580.

As shown in FIG. 41, a bus 559 connects the first switch 563 with the fourth switch 563'''. A second backbone bus 576 connects the second switch 563' with a third switch 563''. A third backbone bus 579 connects the first switch 563 with the third switch 563''. A fourth backbone bus 580 connects the first switch 563 with the second switch 563'. A fifth backbone bus 581 connects the third switch 563'' with the fourth switch 563'''. A sixth backbone bus 584 connects the second switch 563' with the fourth switch 563'''. In a preferred network architecture each switch 563 has a dedicated backbone bus connecting it to each of the remaining switches.

Each switch 563 may maintain a table indicating the protocol employed by the networks connected to the other switches. In the network architecture illustrated in FIG. 41, a uniform backbone protocol need not be utilized. If the first switch 563 is switching a packet over bus 580 to the second switch 563, and both are connected to only networks employing the identical protocol, the packet can be switched unmodified. Modification of packets need occur only when switching between two switches connected to networks employing different protocols. For example, if the first switch 563 is switching a packet from over the first backbone bus 559 to the fourth switch 563''' shown in FIG. 41, the packet must be converted between protocols because the fourth switch 563''' is connected to an ATM network. In one embodiment, the packet may be switched to the fourth switch 563''' and converted by the fourth switch 563''' before it is transmitted over the ATM network. A particular protocol may be employed over each backbone bus 559, 576, 579, 580, 581, and 584 which is optimized for transfer between the two particular switches 563 that are connected by each respective bus. In this embodiment, a single clear channel is provided between each switch 563 to improve performance. It should be appreciated that a packet received over network connection 583 which is intended for a recipient connected to the network associated with network connection 586 may be processed without accessing any backbone bus 579, 576 or 581. The third switch 563'' may switch the packet directly between network 583 and network 586 without accessing a backbone bus.

Figure 44:
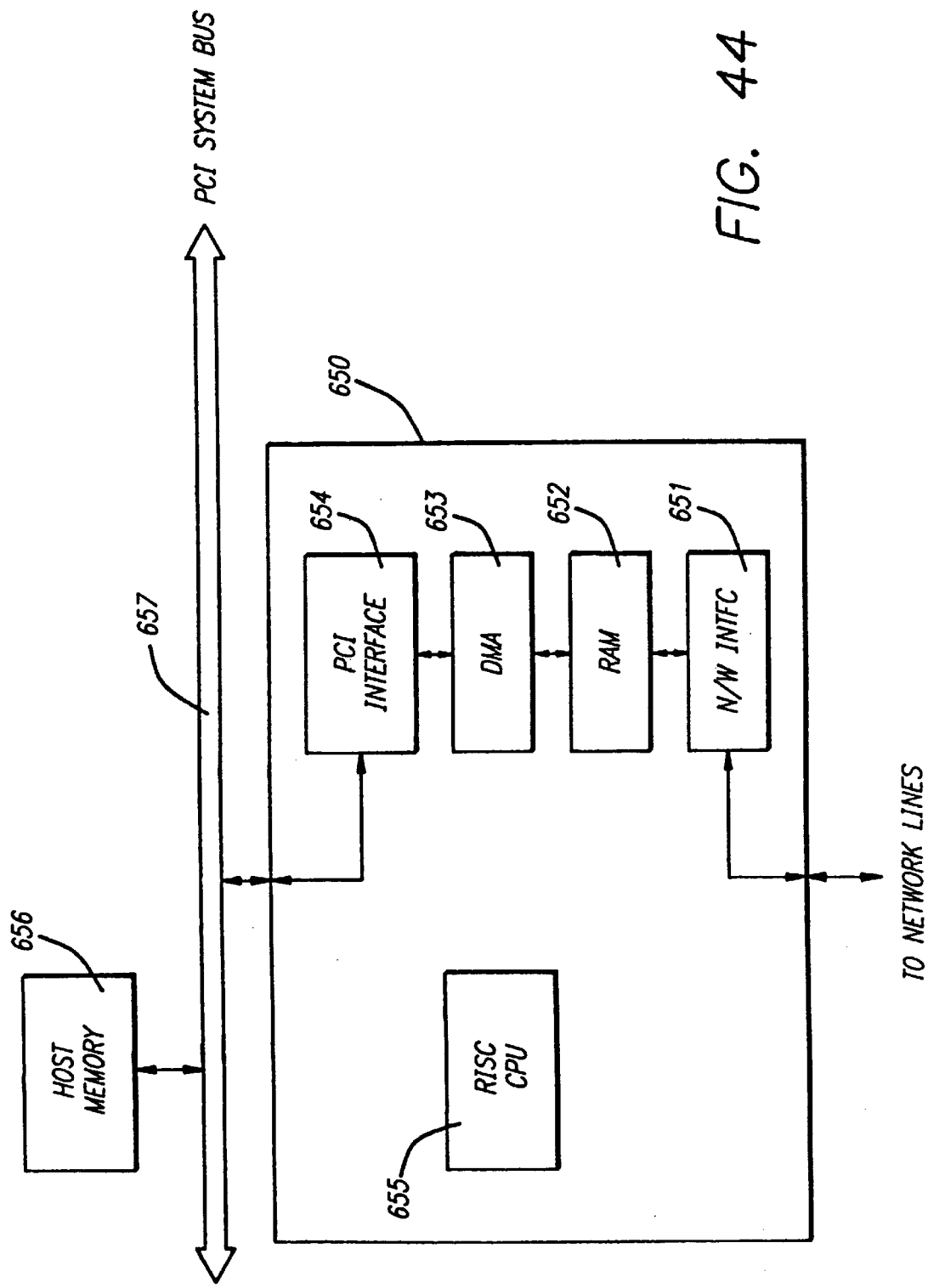
FIG. 44 is a block diagram of a network adapter.

FIG. 44 illustrates a network adapter incorporating a direct memory access controller function. The advantage of the illustrated adapter is that the direct memory access controller function relieves the host system CPU from having to do data transfers across the system bus. This improves system efficiency because the host system CPU can use the time that would otherwise be involved in supervising data transfers to perform other tasks. The adapter 650 includes a network interface unit 651 coupled to a RAM 652. A direct memory access controller 653 accesses information stored in the RAM 652. The direct memory access controller 653 is coupled to a PCI interface 654 which provides an interface to the PCI system bus 657 of the host CPU. The direct memory access controller 653 may directly supervise and control transfers of data from the RAM 652 to the host memory 656 of the host CPU over the PCI system bus, thus freeing the host CPU to perform other tasks. The adapter 650 is controlled by a high speed RISC CPU 655.

Figure 42:
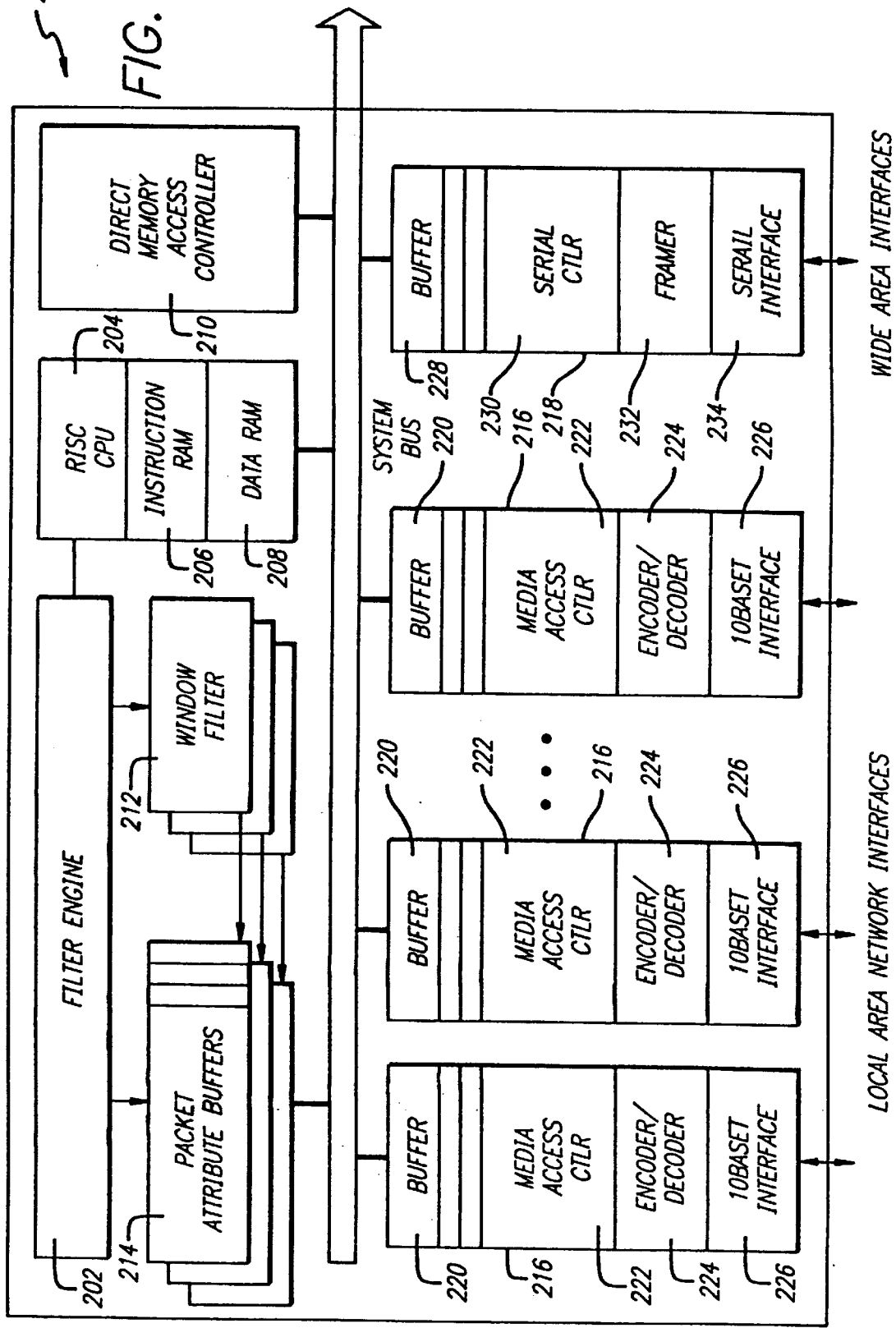
FIG. 42 is a diagram illustrating a multi-protocol or uniprotocol single chip router.

FIG. 42 is a diagram illustrating a multiprotocol or uniprotocol single chip router. This configuration has been described in one or more of the patent applications cross-referenced and incorporated herein by reference. A description will not be repeated. The architecture illustrated in FIG. 42 may be improved by incorporating an expanded system on a single chip which combines integration of the framing technology, transmission convergence functions, and external back end bus. A single chip carries and does all of the ATM traffic for adapter cards or switches. This single chip is coupled to the PCI bus of a host computer, and connects the host computer to an ATM network, and performs all functions necessary to transfer data between the PCI bus and the direct connections to the network. Alternatively, the single chip could provide connection to a network employing Ethernet protocol FDDI, CDDI, Token Ring, etc. A version of this adapter is shown as PCI to Ethernet adapter 605 in FIG. 43. An alternative version PCI to ATM adapter 606 is also shown.

Figure 43:
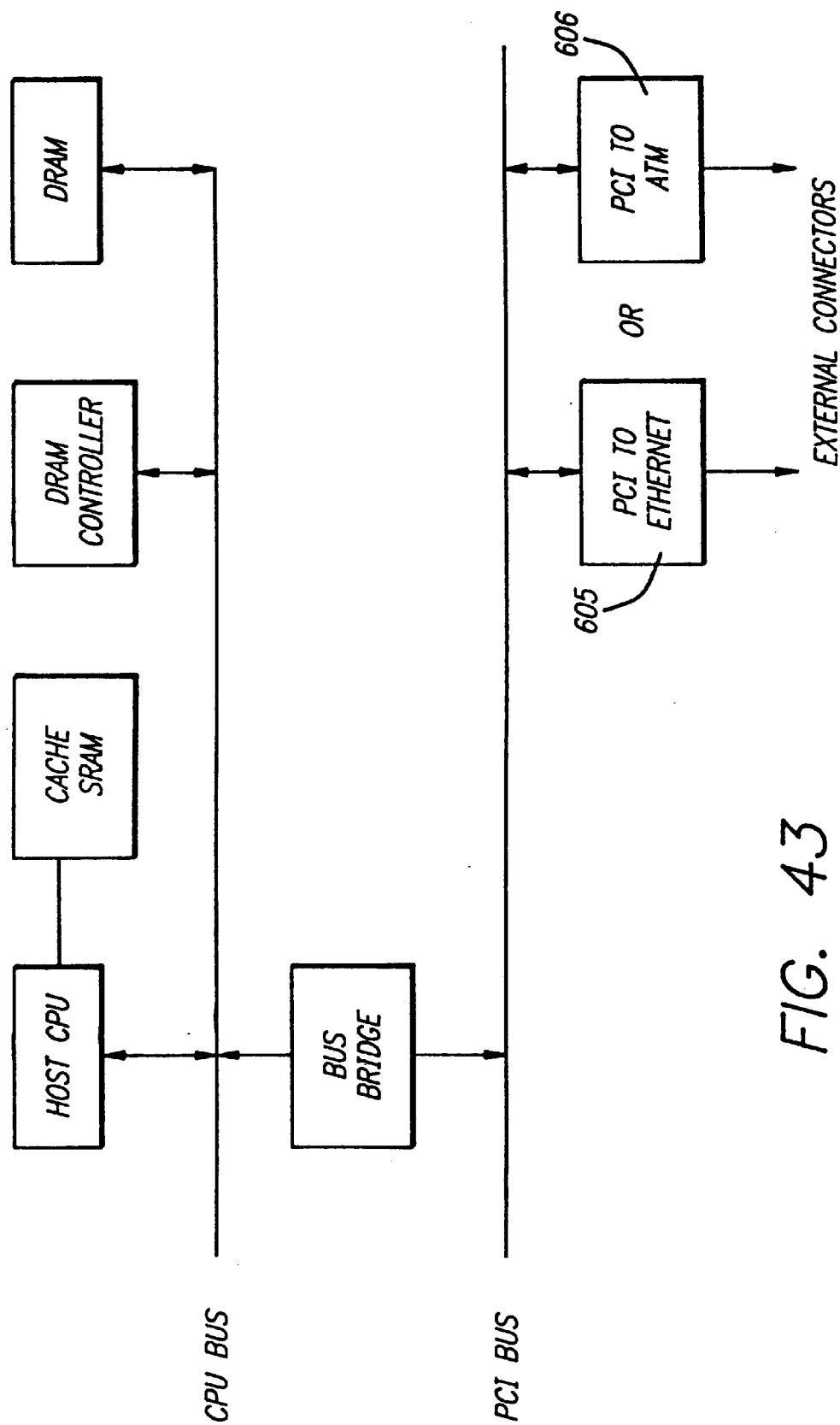
FIG. 43 is a block diagram of an adapter for use in a PC system.

The adapter 606 may be configured as the ATM adapter circuit 590 shown in FIG. 39. A SONET/SDH framer unit 591 is connected directly to the ATM network. The SONET/SDH framer unit 591 is coupled to an ATM transmission convergence unit 592. The ATM transmission convergence unit 592 is coupled to an ATM segmentation and assembly unit 593. The ATM segmentation and assembly unit 593 is coupled to memory 594 for cell buffering. The memory 594 is coupled to a PCI controller 595 which preferably includes FIFOs. The PCI controller 595 is coupled to a PCI bus. An optional microprocessor 596 may be included. Referring to FIG. 43, a suitable PCI to Ethernet adapter 605 may be configured in FIG. 38. An AUI or MII unit 597 is connected directly to the Ethernet network. The AUI 597 is coupled to a Manchester encoder/decoder unit 598 which may alternatively be a 4b/5b encoder/decoder. The Manchester unit 598 is coupled to an Ethernet MAC 599. The MAC 599 is coupled to a memory 600 for packet buffering. The memory 600 may be similar to the buffer 594. The memory 600 is coupled to a PCI controller 601, which may be similar to the PCI controller 595. An optional microprocessor 602 may be provided.

The circuits shown in FIG. 38 are all manufactured on a single chip or substrate. Similarly, circuits shown in FIG. 39 are all manufactured on a single chip or substrate. The single chip preferably includes physical-layered medium dependent (PMD) functions including transceiver and clock recovery. The microprocessor 602 and 596 may be used to handle conversion from network format to a format that is directly useable by the host CPU. The on board microprocessor 602 and 596 frees up the host CPU to perform other functions. In addition, as shown in FIG. 42, multiple ports may be combined on a single chip providing connections to different network protocols (ATM, Ethernet, FDDI, Token Ring, etc.) to provide multiple external communication port connections transparent to the host CPU.

III. Digital Video Network Apparatus

Referring to FIG. 2, a digital video network apparatus 300 includes, in combination, network protocol processing system interconnection circuits 323 and compression/decompression encoder/decoder circuits 324.

The network protocol processing system interconnection 323 comprises packet conversion logic or a suitable microprocessor 325 for conversion between a network protocol, such as asynchronous transfer mode (ATM) packets, and the data protocol used to handle large data streams, such as MPEG packets. The illustrated example will be described herein in connection with the preferred ATM network protocol and the MPEG format. However, it should be understood that the invention is not necessarily limited to the particular protocols and standards used in the illustrated embodiment. The network protocol processing system interconnection 323 shown in FIG. 2 further comprises a PMD circuit or unit 326, an ATM TC and SONET/SDH framing circuit or unit 327, and an ATM SAR circuit or unit 328. The illustrated compression/decompression encoder/decoder circuits 324 preferably comprise MPEG audio and video compression and decompression circuits 329. The PMD unit 326 functions as a line transceiver and performs clock recovery functions. The TC/Framer unit 327 handles error checking, framing, line coding, serial-to-parallel conversion, etc. Examples of different framer types which may be employed include T1, T3, E1, E3, STS3, STS12, STM, and STM4. The SAR 328 handles ATM segmentation and reassembly. The conversion logic or microprocessor 325 handles conversion between ATM packets and the MPEG format.

In an embodiment using a network protocol other than ATM, specific ATM functions would be replaced by appropriate PMDs, encoders/decoders, and media access controllers (MACs), for Ethernet, FDDI, CDDI, token ring, etc. If the conversion unit 325 comprises a microprocessor, packet conversion to alternative formats such as Ethernet may only involve a software change. In wireless applications, the PMD unit 326 may be replaced by appropriate interface circuits for CDPD, PCS, TDMA, CDMA, or GSM. Such interface circuits may include a microcontroller, DSP circuits, DAC/ADC, error correction, equalization circuits, etc. In a wireless application, the SONET/SDH Framing unit 327 would be optional.

In a CATV application, modem circuits should be added between the PMD unit 326 and the Framing circuits 327. Suitable modem circuits include QAM, QPSK, VSB, and forward error correction such as Reed Solomon or Viterbi. In a CATV application, the PMD unit 326 would be optional. If the ATM format is not used in a CATV application, then the TC/Framer circuits 327 and the SAR circuits would be optional. The SONET/SDH format would be optional.

In the illustrated example, the input/output lines 330 may be connected to the network 301. The input/output lines 331 may be connected to the computer 302; however, the digital video network apparatus 300 is preferably integrated into the computer 302. This may be better understood in connection with FIG. 3.

FIG. 3 illustrates in more detail one embodiment of the digital video network apparatus 300.

The digital video network apparatus 300 is connected to the network 301 through a physical layer interface circuit 332. The physical layer unit 332 is coupled to a network protocol processing unit 333. The network protocol processing unit 333 includes an ATM cell interface (ACI) for connecting to the physical layer 332. The network protocol processing unit 333 also includes a DMA port, a secondary port, and a serial interface. The secondary port is connected to a RAM 334 through a 32-bit bus 335. The network protocol processing unit 333 is connected to a serial programmable ROM (PROM) 336 through the serial interface. The DMA port of the network protocol processing unit 333 is connected to a 32-bit data bus 337.

A CPU 338 is also coupled to the data bus 337. The data bus 337 is preferably a PCI bus providing a 32-bit 33 Mhz data path. The CPU 338 has an associated instruction RAM (IRAM) coupled to the CPU 338 through an instruction bus 340. The CPU 338 executes a program stored in instruction RAM 339. The CPU 338 also accesses a shared memory 341. In this example, the shared memory 341 is used to store data. The PCI bus 337 may also be referred to as the host bus 337.

In the embodiment illustrated in FIG. 3, the CPU 338 and shared memory 341 are both coupled to a second data bus 342. In this example, mass storage such as a hard disk drive 343 is coupled to the second data bus 342. Alternatively, the disk drive 343 could be coupled to the PCI bus 337. In addition, the second data bus 342 could be a PCI expansion bus. As an alternative embodiment, the digital video network apparatus 300 may be implemented with a single data bus, i.e., the host data bus 337 and the second data bus 342 could be combined as a single bus. However, utilizing a second data bus 342 allows MPEG encoding and decoding operations to be performed independently of the operations of the network protocol processing unit 333. During transmission and reception of packets from the network 301, the network protocol processing unit 333 will from time to time use the PCI bus 337 in order to access the shared memory 341. The network protocol processing unit 333 has its own processor (referred to as an "APU") which offloads certain operations from the host CPU 338. For example, processing associated with segmentation, reassembly, etc. of ATM cells is performed by the APU on the network protocol processing unit 333, which frees the CPU 338 to control the MPEG encoding and decoding operations, and to perform other functions such as error handling routines.

In the embodiment illustrated in FIG. 3, the MPEG compression/decompression encoder/decoder circuits 329 compress the huge amount of data normally present in digitized images and motion video into compact data streams that can be moved across the network 301, even though the network 301 may have a bandwidth which would otherwise be too narrow to handle such huge amounts of data.

The MPEG compression/decompression circuits 329 may be considered as a "black box" that receives coded video data over the bus 342 and produces a decoded video data stream at output 350 for subsequent display on the display screen 307. The block diagram in FIG. 3 shows how an MPEG video decoder 344 may be used in a video decoding system 300.

MPEG coded data placed on the second data bus 342 may be passed to a demodulator/error checking and correction (ECC)/decryption circuit 351, if necessary. If the video has been encrypted (for example, as part of a copy protection scheme), the decryption circuit 351 will descramble the data. In the illustrated example, a decryption circuit 351 normally will not be required. MPEG coded data is then coupled to a video decoder 344, either from the circuit 351 if it is necessary, or the data may come directly from the second bus 342. The video decoder 344 is connected to a video coder and digital-to-analog converter 347. The digital-to-analog converter 347 drives a display 307. The video coder 347 may be used to modulate the video in either a NTSC or a PAL standard format for display on a conventional television set 307.

Legal MPEG coded data in the bitstream should not defeat the decoding functions of the MPEG video decoder 344 due to rate limitations in a practical chip implementation of the decoder 344 (at least up to the maximum supported display resolution and frame rate). Mechanisms exist within the video decoder 344 illustrated in FIG. 3 to prevent the video decoder 344 from falling behind the coded bitstream channel rate or failing to complete the computation or display of a frame within a frame time.

The video decoder 344 is coupled to a RAM 346 which is used to store frames of video during decoding operations. In the example described herein, the video decoder 344 preferably supports direct connection to commercial DRAMs 346 for use as frame stores 346. The video decoder 344 uses frame stores 346 for intermediate frame reconstruction and display. In this example, no external components are required to interface between the video decoder 344 and the DRAMs 346. In a preferred embodiment, the video decoder 344 pinout allows the connection to DRAM 346 to be made on a PCB single layer. During normal operation, the video decoder 344 exclusively controls the DRAM frame stores 346. However, in a preferred embodiment, it is possible to access the DRAMs 346 through a user port 352 on the video decoder 344 for test, verification, and access of data used during the vertical blanking interval of the display 307.

The video decoder 344 provides a digitized video output 350 for subsequent display on the display 307. This data is in a CCIR601 color format having a "Y," "b," and "Cr" component. The digitized video output 350 operates with a luminance sample rate that is usually exactly half of the rate of the system clock 361. This is nominally 13.5 MHz from a 27-MHz clock. The video decoder 344 also provides video synchronization signals for the display 307.

The user port 352 allows a user to program system options and to monitor operation of the decoder 344. Errors flagged by the video decoder 344 and certain user data may be read through the user port 352. However, the video decoder 344 will not maintain unread user data indefinitely. A preferred embodiment has a user data FIFO that is 32 bytes deep and is accessible through a register. The register may be an LSI Logic L64000 MPEG-2 Video Decoder which is described in the "L64000 MPEG-2 Video Decoder Technical Manual" (July 1994), and in the manual entitled "L64000B MPEG2 Video Decoder w/ PP Filters" (Jun. 23, 1994) Additional disclosure concerning suitable registers is contained in the "L64112 Digital TV MPEG Decoder Technical Manual" (November 1993), All three of these manuals are available from LSI Logic.

Once the video decoder 344 FIFO memory is full, no more data is written to the FIFO memory and subsequent data will be lost. The CPU 338 must read data transmitted in the user data records of the MPEG bitstream, even if that data is subsequently used to control some aspect of the video display subsystem 329. The CPU 338 should read this data, then write it to internal state registers in the video decoder 344, if necessary.

The illustrated example of the video decoder 344 operates satisfactorily to produce an NTSC standard display at image sizes of 720×480 pixels, with a frame rate of 30 fps (720×576 at 25 fps for PAL). The coded data channel 342 may have a sustained bit rate up to 15 Mbit/sec. The video decoder 344 supports lower resolution images than 720×480 in dimension multiples of 16 pixels. As the resolution decreases, the amount and bandwidth of DRAM memory 346 required for frame stores 346 also decreases. However, a preferred video decoder 344 continues to use the same memory bus 342 width of 32 bits across its full resolution range.

Included in the block diagram of FIG. 3 is an audio decoder 345. The audio decoder 345 can accept either serial or parallel digital MPEG audio data. The audio decoder 345 includes an internal DRAM controller, which interfaces with an external DRAM 348 to provide memory for a channel buffer 348. The audio decoder produces an output 355 which is coupled to a CD audio digital-to-analog converter 349. The digital-to-analog converter 349 produces a stereo audio output which is fed to speakers 308.

Suitable decompression decoder circuits are commercially available from LSI Logic Corporation of Milpitas, Calif. The L64112 Digital TV MPEG Decoder m ay be used for the video decoder 344. The L64112 is specifically designed for use in digital video decoding systems based on the MPEG1 algorithm. Additional disclosure relating to the L64112 is contained in the "L64112 Digital TV MPEG Decoder Technical Manual" (November 1993) mentioned above. Another LSI product called the L64000 is designed for use in systems that must be MPEG2 compliant. Disclosure relating to the L64000 is contained in the "L64000 MPEG-2 Video Decoder Technical Manual" (July 1994), mentioned above. Additional disclosure relating to the L64000 is contained in the manual entitled "L64000B MPEG2 Video Decoder w/PP Filters" (Jun. 23, 1994) mentioned above. The L64000 is pin-compatible with the L64112.

An LSI product called the L64111 MPEG Audio Decoder may be used for the audio decoder 345. Additional disclosure relating to the L64111 is contained in the "L64111 MPEG Audio Decoder Technical Manual" (September 1993), available from LSI Logic.

"L64002 MPEG-2 Audio/Video Decoder Technical Manual" (Nov. 18, 1994), which is available from LSI Logic, contains disclosure materials describing the LSI L64002 MPEG-2 audio/video decoder, which has both a video decoder 344 and an integrated audio decoder 345. In the L64002, the audio decoder 345 uses the same memory 346 as the video decoder 344 for its channel buffers, thus eliminating the need for separate DRAM 348. The L64002 also integrates an on-screen display controller capable of overlaying an image up to 720×480 pixels (720×576 for PAL) at up to 4 bits/pixel on top of an MPEG video sequence while it is being decoded. Bitmaps for on-screen display may be assembled off-screen then made visible instantaneously. Hardware panning and scrolling of overlay data is supported.

IV. MPEG Compression and Decompression Circuits

Figure 4:
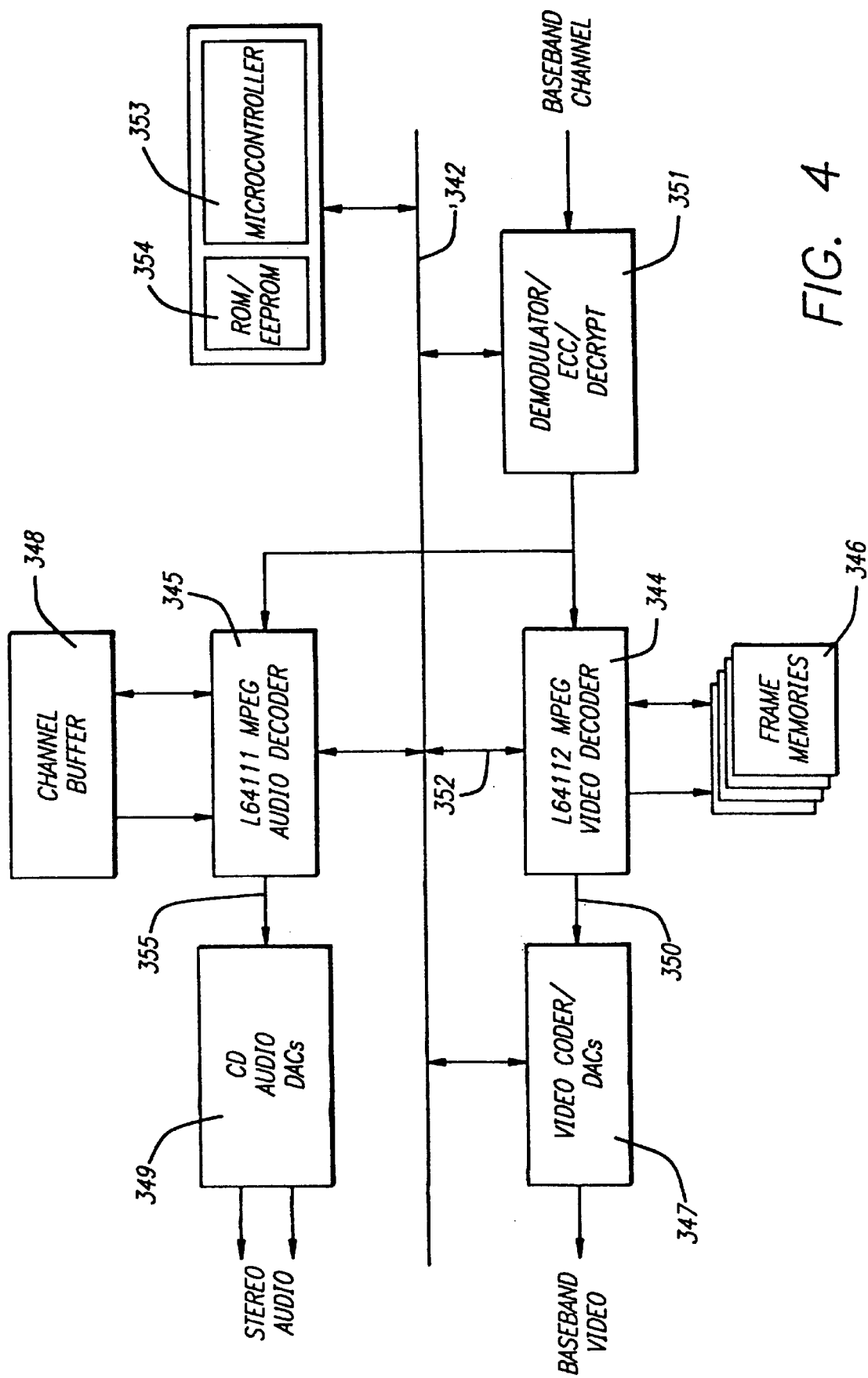
FIG. 4 illustrates an alternative embodiment of MPEG audio/video decompression circuits using an LSI L64112 for the video decoder, and an LSI L64111 for the audio decoder.

FIG. 4 illustrates an alternative embodiment of MPEG audio/video decompression circuits 329 which specifically uses an LSI L64112 for the video decoder 344, and an LSI L64111 for the audio decoder 345. In this example, an inexpensive eight-bit microcontroller 353 and associated ROM or electrically erasable/programmable ROM (EEPROM) 354 are utilized. The EEPROM 354 may also be a flash electrically programmable ROM (EPROM), or a PROM.

The L64112 MPEG video decoder 344 is designed to provide a single-chip solution for a digital TV set top. The L64112 MPEG video decoder 344 accepts serial or parallel coded channel data directly from a demodulator sub-system 351 or from an eight-bit microcontroller 353 at a sustained data rate of up to 15 Mbit/sec. It extracts the MPEG video data stream from the MPEG system stream and performs error detection before fully decompressing the video data. The L64112 MPEG video decoder 344 outputs digitized video data 350 in an interlaced or progressive format together with horizontal and vertical sync signals. This digital YUV output interfaces directly to most off-the-shelf National Television System Committee/Phase Alteration Line (NTSC/PAL) encoders 347. The L64112 MPEG video decoder 344 has complete on-chip channel buffer and display buffer control, and it supports direct connection to commodity DRAMs 346 for frame reconstruction. The only external devices required with the L64112 MPEG video decoder 344 are an inexpensive eight-bit microcontroller 353 for testing, initialization, and monitoring the status of the video decoder 344, and commodity DRAMs 346 for storing channel and display data. This simplifies the system design, testing, and manufacturing process.

The external system controller (microcontroller) 353 is responsible for test, initialization, and real time control of the L64112 MPEG video decoder 344. The interface between the system controller 353 and the L64112 video decoder 344 is eight bits wide and fully asynchronous.

The system controller 353 defines the operational mode of the L64112 video decoder 344. The L64112 video decoder 344 operational modes are controlled through a number of internal state registers, which may be read or written over the interface. These internal state registers are described more fully in the "L64112 Digital TV MPEG Decoder Technical Manual" (November 1993) mentioned above. Device initialization parameters include frame size, sync pulse widths, active image size and position, frame mode, horizontal re-sizing, and channel buffer size. The programmability of these parameters increases the flexibility of the L64112 video decoder 344 for systems with different resolutions and display system characteristics.

The behavior of the L64112 video decoder 344 can be monitored by the system controller 353. Parameters include channel buffer 346 fullness, detected bitstream errors, and status of video sync signals. Access to the frame stores 346 is arbitrated in the L64112 video decoder 344. Frame store 346 accesses from the system controller 353 have a lower priority than any other access in the system.

The L64112 video decoder 344 has multiple interrupt sources, which include detectable errors, channel status, and display status. Interrupts are signalled to the system controller 353 over a single interrupt pin, and are selectively maskable by the controller 353. Pending interrupts may be read from an internal register. Interrupts make the program stored in the EEPROM 354 which is being executed by the system controller 353 more efficient because there is no need to poll the interface.

Frame memories 346 can be tested by randomly reading and writing them through the interface. An internal address indirection register controls the addressing of these accesses. The L64112 video decoder 344 arbitrates between these accesses and other subsystems within the L64112 video decoder 344.

Channel data can be written directly through the system controller interface instead of through the serial channel interface. Direct writing supports parallel interfaces found in computer systems, particularly CD-ROM players. An internal control bit selects the input channel source. It is the user's responsibility to ensure that writes to the parallel channel interface do not exceed the channel rate. A state bit is provided that allows the user to poll the busy status of the channel. An output pin is also provided that reflects this status. This pin is used where a hardware handshake is needed.

Coded bitstream data is typically written serially into the L64112 video decoder 344. On each rising edge of a serial channel clock, a single bit and an associated data-valid signal are read. The peak sustained rate on the serial interface is a function of the device clock. At the nominal frequency of 27 MHz, this rate is 15 Mbit/sec. The instantaneous burst rate on the serial channel is a function of device characterization. A supply/demand characteristic defines the burst/non-burst rate behavior. The burst rate limits the packet length and packet separation in a variable channel rate system.

Synchronization circuitry in the channel interface allows the device clock and the channel clock to run at different rates.

The L64112 operates on MPEG 1 bitstream syntax. The user may select the highest level of the MPEG grammar which the L64112 decoder will see on the channel. The highest level the device is capable of completely decoding is the video sequence layer. If presented with a system layer bitstream, the L64112 video decoder 344 parses out and decodes the packet layer. MPEG-1 is as defined in IS 11172.

User data in the channel is buffered on-chip on the L64112 video decoder 344 and may be read by the system controller 353. The on-chip user data FIFO is intended to buffer data until the system controller 353 can service an interrupt and read the data. If the data is not read, the FIFO overflows and all user data in the FIFO is invalidated until the user data FIFO is reset. It is the responsibility of the system controller to act on user data as appropriate.

If the coded data into the channel is changed to a new program source, the system controller 353 must inform the bitstream parser to stop decoding and search for a new intra-frame resynchronization point. The L64112 video decoder 344 then freezes on the last complete anchor frame until a new sequence is acquired. Program acquisition time is a function of the encoder sequence header length. B frames with a broken link are decoded unless the system controller 353 forces resynchronization. The system controller 353 restarts the L64112 video decoder 344 when the channel buffer reaches an adequate threshold. Suitable circuits for audio and video synchronization of an MPEG-2 Encoded bit stream is disclosed in the manual entitled "MPEG A/V AppNote" (Oct. 17, 1994) available from LSI Logic.

A seamless switch between virtual program channels may be achieved if the different channels within a channel group have a temporally aligned group of frame headers. Virtual channel switch is a function of the channel demultiplexer in the decoder 344. The L64112 video decoder 344 handles virtual channel switching like a regular P-frame to I-frame transition in the bitstream. Note that in a virtual channel scheme there cannot be any B-frames carrying over across the group of frames boundary because these would constitute a broken link in the new group, leading to a discontinuity in the video or depletion of the channel buffer. Constraining B-frames in a virtual channel scheme is a function of the encoder. The system controller 353 can force the display to freeze if the channel becomes depleted due to a channel switch.

The channel buffer has no explicit panic modes because it is generally not known where buffer thresholds should be set. If the channel buffer underflows, the user controller 353 may be optionally interrupted and the L64112 video decoder 344 instigates a freeze frame. If the channel buffer overflows, an interrupt is generated. The typical recovery mechanism is identical to a channel switch; that is, the decoder freezes after the last good frame, the broken frame is discarded, and the decoder is set to resynchronize on a new group of frames. In a system with a properly matched encoder and decoder 344, panic modes should never be needed.

Figure 5:
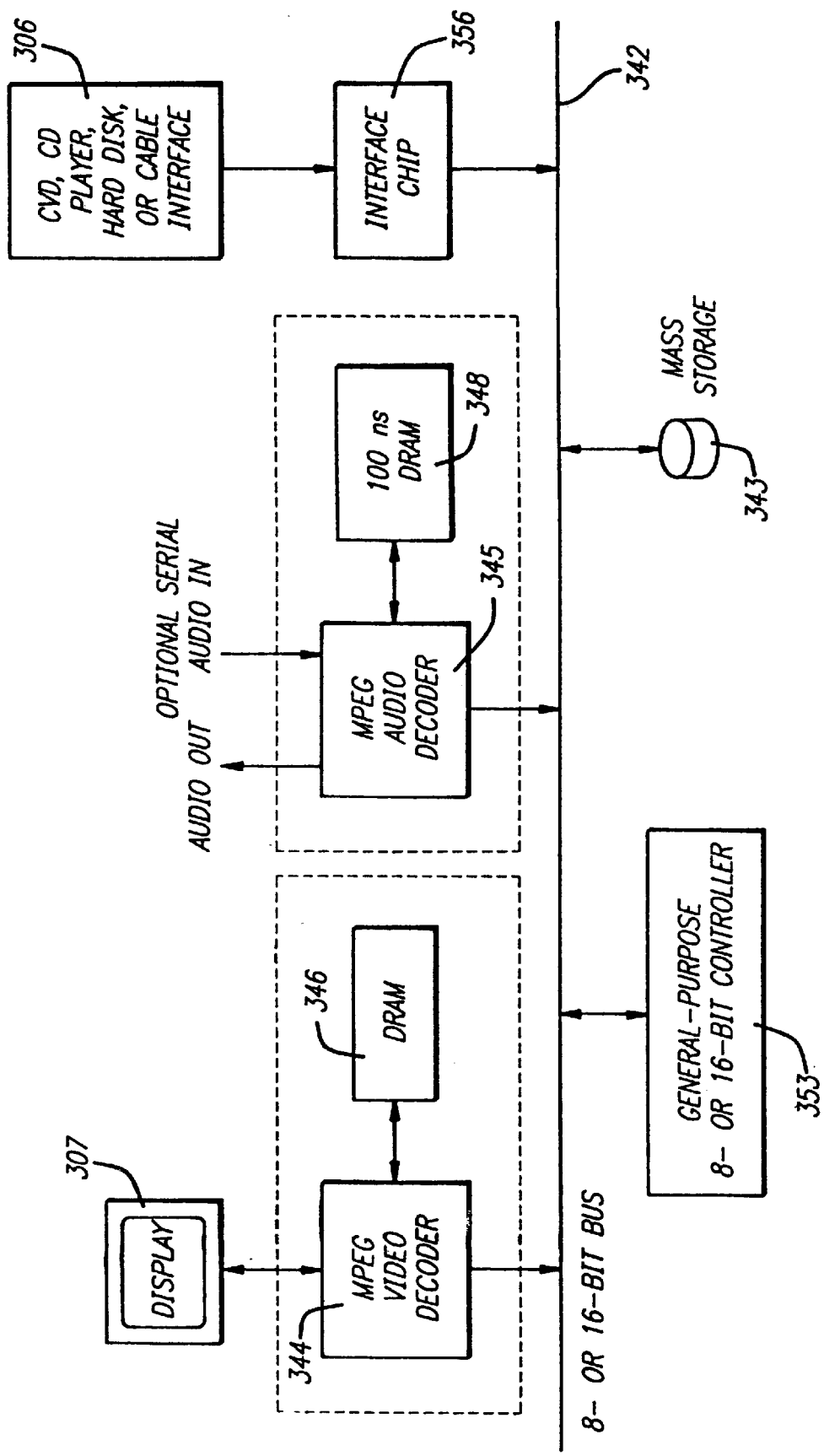
FIG. 5 depicts another alternative embodiment for MPEG audio/video decompression circuits.

FIG. 5 depicts another alternative embodiment for MPEG audio/video decompression circuits 329. The embodiment shown in FIG. 5 uses a source of MPEG data such as a cable interface, CVD, hard disk, or CD-ROM player 306. An interface chip 356 is provided. In this example, the bus 342 may be implemented as an 8-bit or 16-bit bus.

Figure 6:
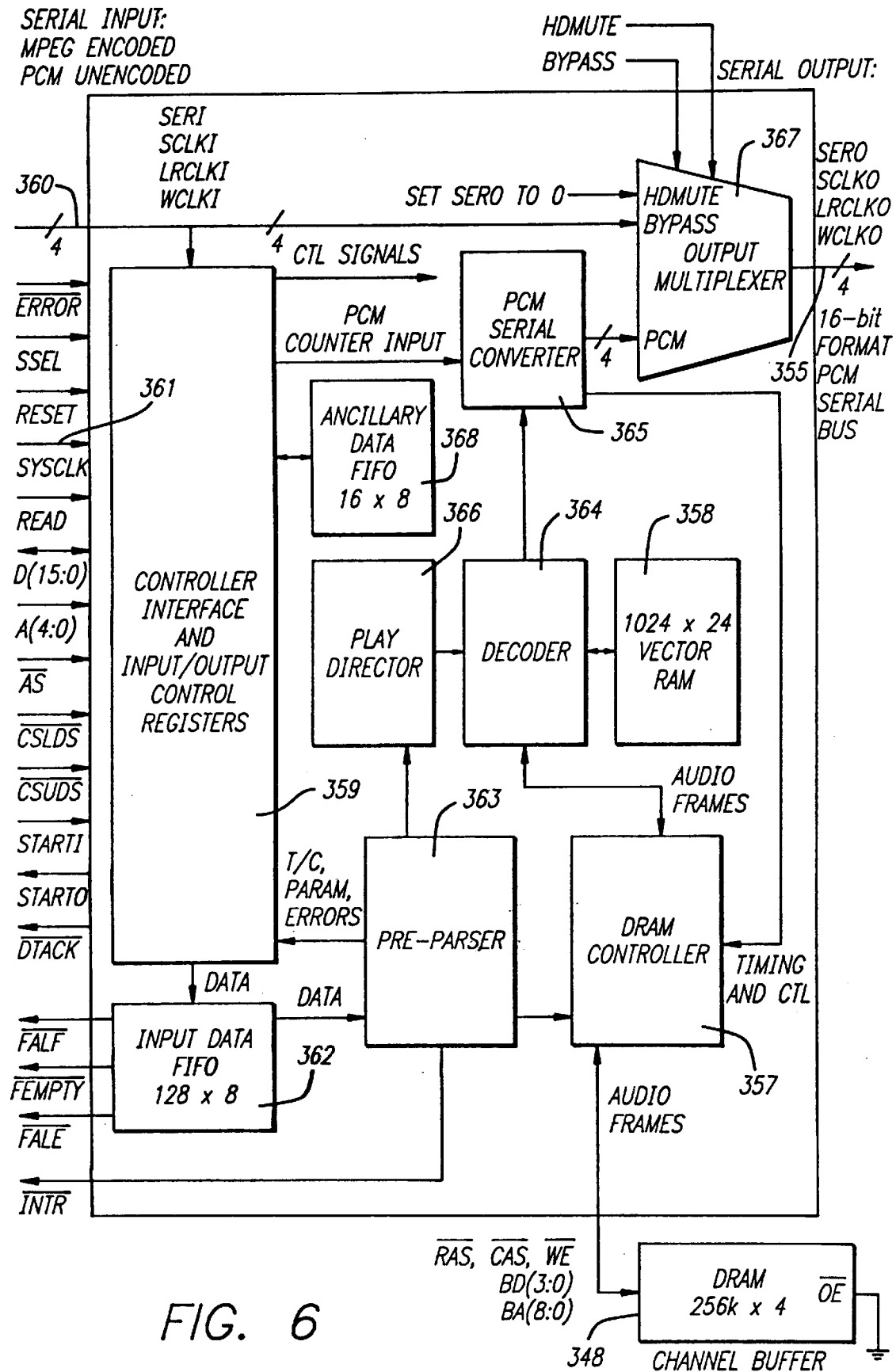
FIG. 6 depicts further details of the audio decoder.

FIG. 6 depicts further details of the audio decoder 345. While the audio decoder 345 uses an external channel buffer 348 for temporary storage of audio frames that have been removed from the stream, an internal DRAM controller 357 in the example described herein uses a 256K×4 fast page mode DRAM 348. The channel buffer 348 can handle at least one second of data, which facilitates audio-video synchronization or other delay compensation.

Synchronization of audio and video streams requires that an external system controller 353 monitor the video and audio presentation time stamps. The audio decoder 345 delays audio frames (stores them in the buffer 348) until the controller 353 determines that the correct presentation time has been reached. At this point the controller 353 commands the audio decoder 345 to start decoding from data in the channel buffer 348. Using the channel buffer 348, the audio decoder 345 can compensate for at least one second of delay between audio and video data.

The audio decoder provides a 16-bit PCM output 355 by means of a multiplexed serial output bus 355 compatible with commodity pulse-code modulation (PCM) serial D-to-A converters (DACs) 349. A bypass command allows four-wire PCM serial audio data to be passed directly from serial input to serial output 355 with only a multiplexer delay.

The audio decoder 345 provides the ability to conceal errors in data. When this function is enabled, two choices of response to error are provided: (1) repeat the last error-free audio frame, or (2) muting.

A multipass synchronization method minimizes frame synchronization errors. With this technique, successive valid syncs must be acquired before synchronization is established.

When initialized, the audio decoder 345 synchronizes itself by monitoring the data stream and locating an audio frame in the data stream. When MPEG data is input, the audio decoder 345 strips away all unneeded information, retaining only the audio and control data. The audio and control data is then partially expanded and stored in the channel buffer 348. When the appropriate control signals are seen, this stored data is played; that is, decompression is performed and the data is output in PCM format.

Figure 14:
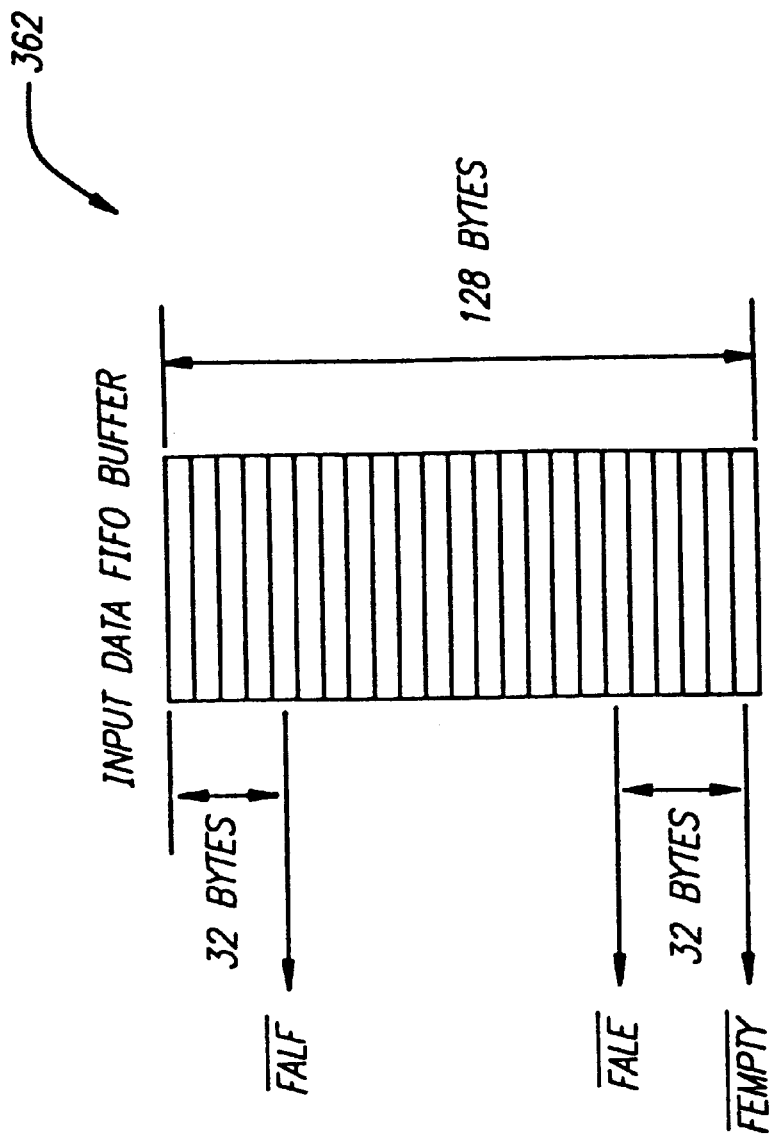
FIG. 14 shows an input data FIFO.

Data enters the audio decoder 345 in parallel through a controller interface 359 shown in FIG. 6, or in serial through a serial port 360. Referring to the flow chart of FIG. 11, the data is first synchronized in step 400 to the system clock (SYSCLK) 361, then sent to an input data FIFO 362 (shown in more detail in FIG. 14). The synchronization step at the system level is shown in more detail in FIG. 12.

The decoders 344 and 345 are required to parse MPEG packet layers in order to extract a presentation time stamp from the bitstream. The presentation time stamp is the essential parameter for audio and video synchronization. MPEG does not guarantee that the packet data field of the packet layer is emulation-free. The decoders 344 and 345 must therefore predict the occurrence of start codes 385 in the system bitstream 373 based on the length field of the previously occurring header 381. (See step 408).

The system level synchronization circuitry may be considered a filter that only passes the packet data field 374 of the packet layer. The user may select which of several elemental video streams the decoders 344 or 345 present as valid packets. The video decoder 344 uses an internal four-bit register for this purpose. This register is described more fully in the "L64112 Digital TV MPEG Decoder Technical Manual" (November 1993) mentioned above. (The system synchronization circuitry may be bypassed only in systems using elemental video streams.) The video decoder 344 does not assume any data alignment for the incoming data stream. The alignment is imposed on the stream by the detection of synchronization symbols in step 410 and 413 of FIG. 12. Packet stuffing data is not written to the channel buffers 346 or 348.

Errors occurring in the packet header may cause synchronization failure. It is possible that the decoders 344 and 345 will initially synchronize incorrectly in step 410 to a bitstream due to emulation of resync codes 385 in the data field. However, the probability of this incorrect synchronization occurring is very low. Mis-synchronization failures can only occur if the decoders 344 and 345 are already not synchronized. If such a failure is encountered, the decoders 344 and 345 will subsequently reacquire synchronization within two packet times.

Figure 13:
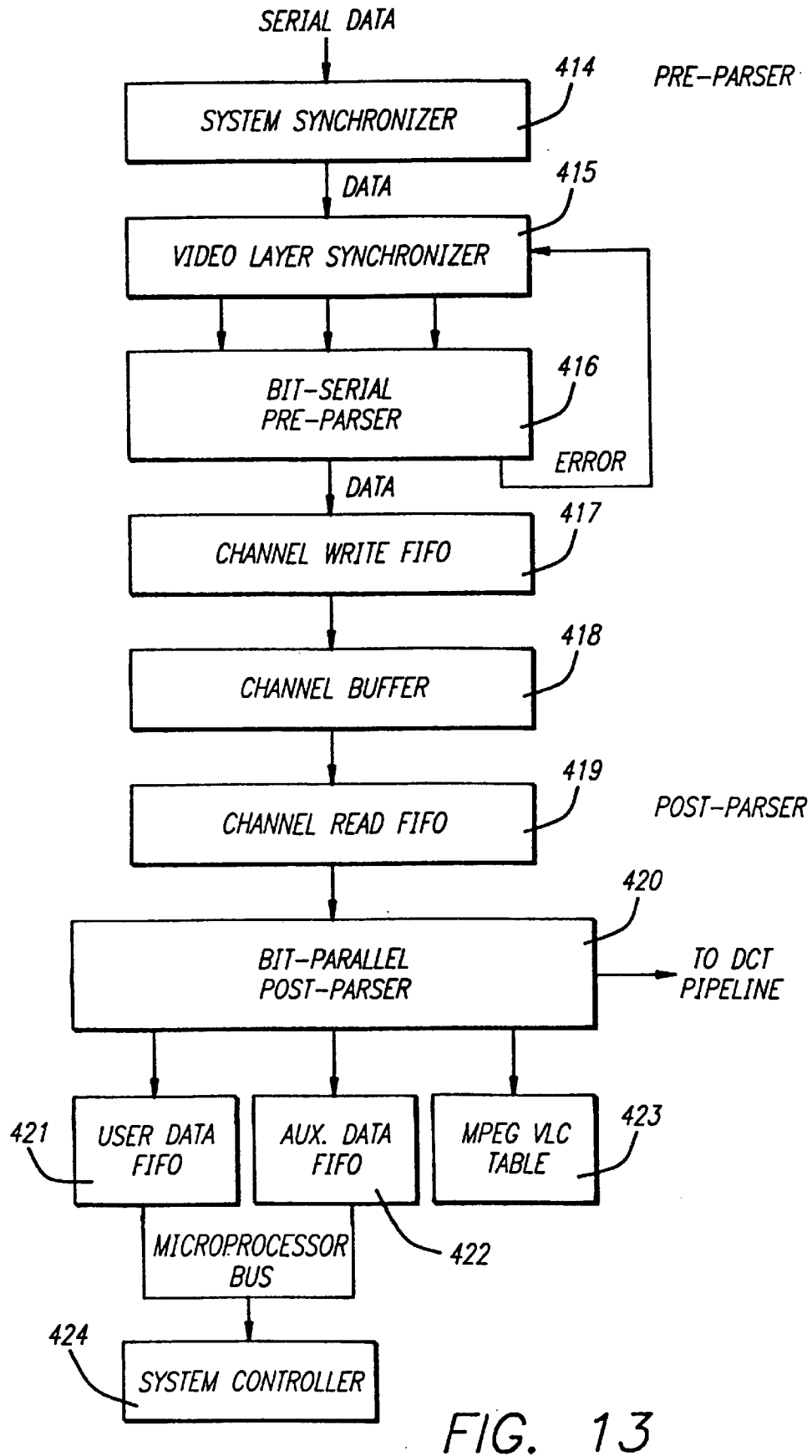
FIG. 13 is a flow chart showing steps in processing MPEG data.

The video decoder 344 parses the elemental video data stream in order to decode the MPEG video. A flow chart for parsing is shown in FIG. 13. The video decoder 344 operates on the video sequence layer and below. The video decoder 344 synchronizes to the bitstream independently of the alignment or error condition of the data from the system synchronizer. The only constraint is that the data should be MPEG video data.

The post-parser operates on data in steps 419 through 424 as it is read out of the channel buffer. The post-parser is capable of operating on one MPEG symbol every cycle.

There are two types of bitstream errors flagged by the video decoder 344—decode errors, and channel errors. If decode errors occur in the bitstream, the post-parser or on-chip microcontroller detects them by checking for correct grammar. The parser or microcontroller generates a maskable interrupt if a decode error is found. Depending on the context of the error, the decoder 344 may perform error concealment to prevent the erroneous data from reaching the picture store. Channel errors occur due to the overflow or underflow of the channel buffer 346. The video decoder 344 generates a maskable interrupt during normal operation if the channel buffer 346 becomes full or empty. In a properly designed system, the channel buffer 346 should never become full, and should only become empty if the decoder 344 loses synchronization.

When an error is flagged, data continues to be decoded at the channel rate up to the next appropriate resync code for this layer. The internal microcontroller then determines the error masking strategy. After an error or if the decoder 344 is not synchronized, the post-parser reads data at one byte (eight bits) per cycle until synchronization is reacquired.

The user may read the status of the three bitstream error flags at any time. A mask word can be set, indicating which of the error flags may generate an interrupt.

The video decoder 344 synchronizes on the first sequence start code which it finds in the bitstream. Assuming no errors, the video decoder 344 will periodically resynchronize on subsequent sequence start codes. Errors either found in the bitstream syntax or signalled from the channel during the processing of the video sequence layer header are not maskable, and are flagged as decode errors. This includes errors detected during the processing of user data. Error recovery is accomplished by waiting for a new sequence start code.

The video decoder 344 only enters the group of pictures layer from the video sequence layer if the device is synchronized to the video sequence layer and no errors have been detected. Spurious group start codes occurring when the video sequence layer is not synchronized do not cause the decoding of data within the group of picture layer. Errors found in the bitstream syntax, or signalled from the channel during the processing of the group of pictures layer header are not maskable, and are flagged as decode errors. Error recovery requires waiting for a new group start code or sequence start code. If an extension start code is found in the group of pictures layer, the extension record is decoded until the next legal start code, and written to the auxiliary FIFO.

The video decoder 344 only enters the picture layer from the group of pictures layer if no errors have been detected in the group of pictures header. Errors in the header of the picture layer will have different propagation effects depending on the picture coding type. However, because an error in this header would typically be the transmutation of one picture type to another or to code an incorrect temporal reference, all errors in the picture layer header are flagged as decode errors. Error recovery requires waiting for a new picture layer, group of pictures layer, or video sequence layer. If the extra information bit is set, the syntax is decoded and written to the auxiliary FIFO. No error is flagged. If an extension start code is found in the picture layer, the extension record is decoded until the next legal start code, and written to the auxiliary FIFO. No error is flagged.

If a D-picture is found in a video sequence an error is flagged. The data from the D-picture is ignored and is not available to the user. Errors in the slice layer and below are concealed using temporal replacement from the last anchor frame with prediction using the last correct motion vector.

The post-parser resynchronizes to any resync symbol in the channel buffer, regardless of its alignment. If the post-parser is not synchronized, it reads symbols at the maximum rate until it either regains synchronization or the channel buffer empties. If the post-parser receives a media error code or flag, it attempts to conceal errors up to the next resync symbol.

The post-parser uses the resync symbols in the channel buffer 346 to keep track of the current grammar layer of the bitstream. The post-parser attempts to conceal errors either flagged as media errors in the bitstream or found to be errors during decoding at the slice layer and below layers. The post-parser detects the following errors:

1. Sequence error in channel;
2. Resync code not in predicted location;
3. Variable length code not legal in this context;
4. Motion vector points outside image area;
5. Too many macroblocks in a slice;
6. Too many blocks in a macroblock; and,
7. Run total>64 in a block.

In the audio decoder 345, the input data FIFO 362 buffers the data and supplies it to a pre-parser 363. Various flags, shown in FIG. 14, signal the extent to which the input data buffer 362 is full or empty. The flags are made available for flow control. The input data FIFO 362 is not part of the channel buffer 348, and its flags do not reflect the state of the channel buffer 348.

Figure 11:
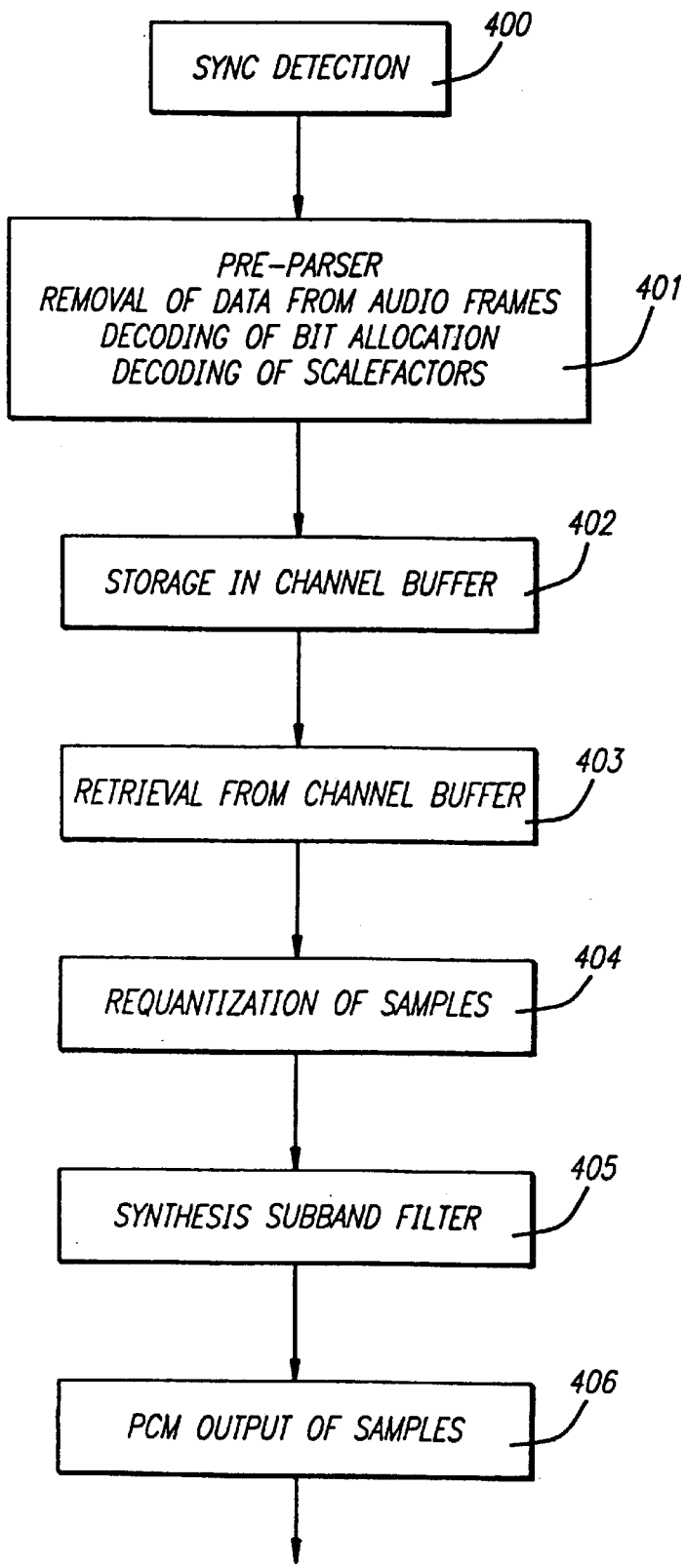
FIG. 11 is a flow chart showing steps in processing an MPEG data stream.
Figure 12:
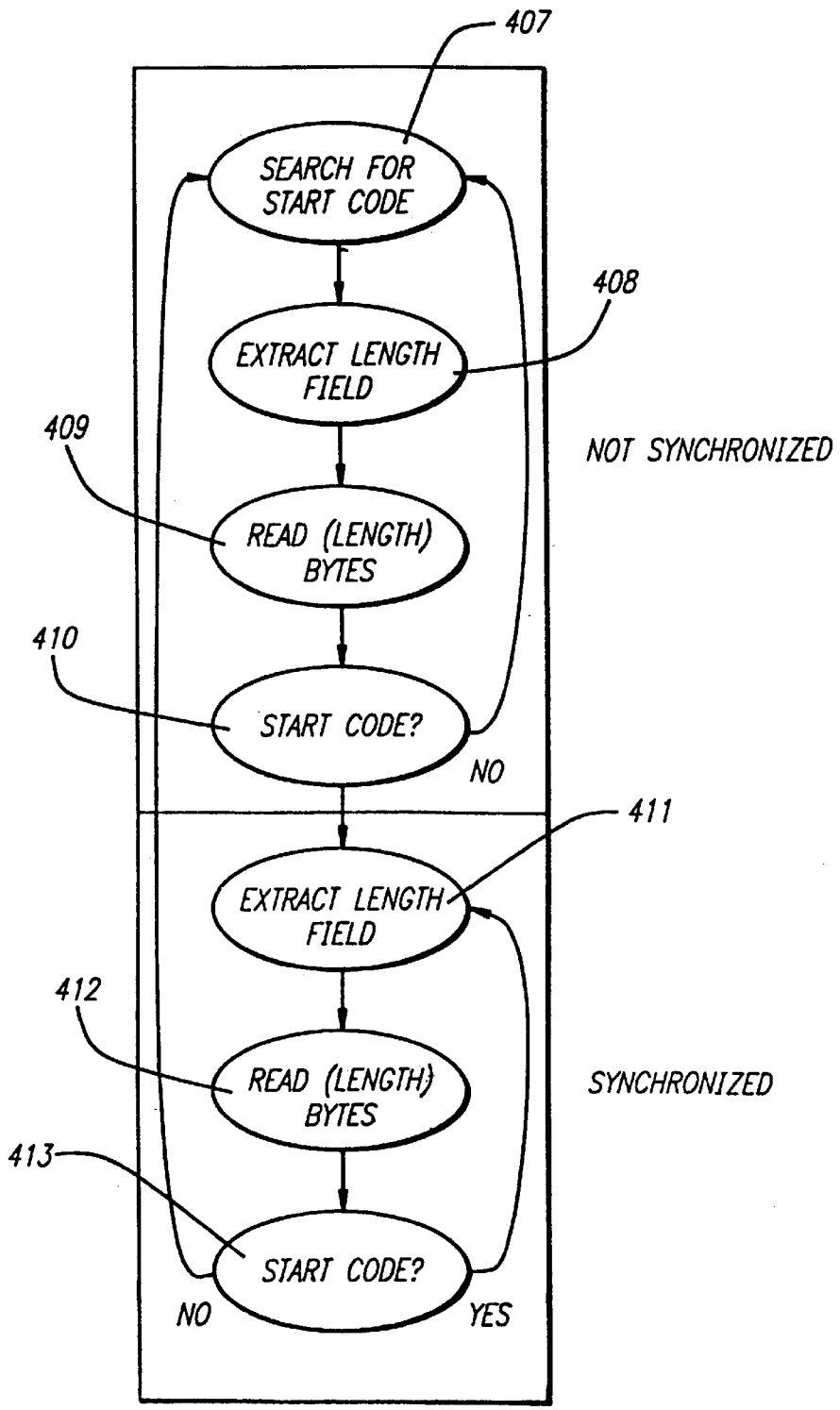
FIG. 12 is a flow chart showing steps in synchronizing with MPEG data.

The pre-parser 363 performs stream parsing in step 401 of FIG. 11. This is also depicted in step 414 of FIG. 13. For ISO system stream parsing and synchronization, the pre-parser 363 detects the pack start code 385 or system header start code and uses one of these to synchronize to the ISO stream in step 414 of FIG. 13. In step 415, the pre-parser 363 then looks for packet header information and attempts packet identification. The pre-parser 363 identifies audio frame information in step 416 and discards all else. Next, in step 417 the pre-parser 363 calculates the CRC and separates the header information from the audio data and sends the audio data to the channel buffer 348 in step 418.

A decoder 364 receives data from the channel buffer 348 and fully decodes the data using an appropriate MPEG algorithm. The reconstructed data is then sent into a PCM serial converter 365.

The DRAM controller 357 handles the read/write and refresh activities of the external channel buffer DRAM 348. The channel buffer 348 stores blocks of partially decoded audio data prior to reconstruction of the data in the decoder 364.

A play director 366 maintains a list of the frames in the channel buffer 348. The play director 366 also holds certain header information required to complete the decoding operation of each frame. The frames are normally accessed as a circular buffer. It is possible to skip or replay frames (cue and review) while they are in the play director 366. The play director 366 is also used in error concealment.

The 16-bit reconstructed stereo pair 355 is output in a PCM format compatible with most serial D-to-A converters 349. Various modes are supported.

An output multiplexer 367 controls routing of serial data signals. It can be program-controlled or hardwired to select one of the following three outputs: (1) the serial output (SERO) is set to zero; (2) input data is unprocessed and passed through unchanged; or (3) the output is the PCM format output of the decoder 364. In the bypass mode, the audio decoder 345 passes all four PCM inputs 360 unaltered to the output 355. All signals retain their temporal alignment.

The audio decoder 345 also includes an ancillary data FIFO 368 coupled to the controller interface 359. A vector RAM 358 is coupled to the decoder 364.

The decoder 364 can operate with bit rates up to 384 Kbits/sec. stereo or dual channel with sampling frequencies of 32 KHz, 44.1 KHz, or 48 KHz. Once the decoder 364 has started decoding, it takes data from the channel buffer 348. The decoder 364 uses a two-pass system. In the first pass, the decoder 364 parses the bitstream, separating out the sync, header information, allocations, and scalefactors, performs the cyclic redundancy check (CRC) check, and removes ancillary data. In the second pass, the decoder 364 provides degrouping, inverse quantization, scaling, and subband synthesis. By performing two passes, the decoder 364 can mask errors by repeating the same frame, and the two-pass approach allows identifying false audio syncs.

Rate control is the ability of the decoder 364 to deliver a continuous PCM output 355 correctly timed while the input 360 is coming in bursts. The rate control mechanism has two parts. The first part is the input data FIFO 362. Part of the input data FIFO 362 compensates for the variations in processing time for different parts of the pre-parser 363. The rest of the input data FIFO 362 allows data burst rates up to 7.5 Mbytes/second (60 Mbits/sec.) for a length of 128 bytes, until the pre-parser 363 processes this data at its 15 Mbit/sec rate. These rates are valid for a system clock rate (SYSCLK) 361 of 30 MHz.

The second channel rate control is the channel buffer 348. This buffer 348 is filled at a 15 Mbit/sec. rate and is emptied at the PCM output sample rate.

The signals shown in FIG. 6 which are not explicitly discussed herein are explained in the "L64111 MPEG Audio Decoder Technical Manual" (September 1993) mentioned above.

Figure 7:
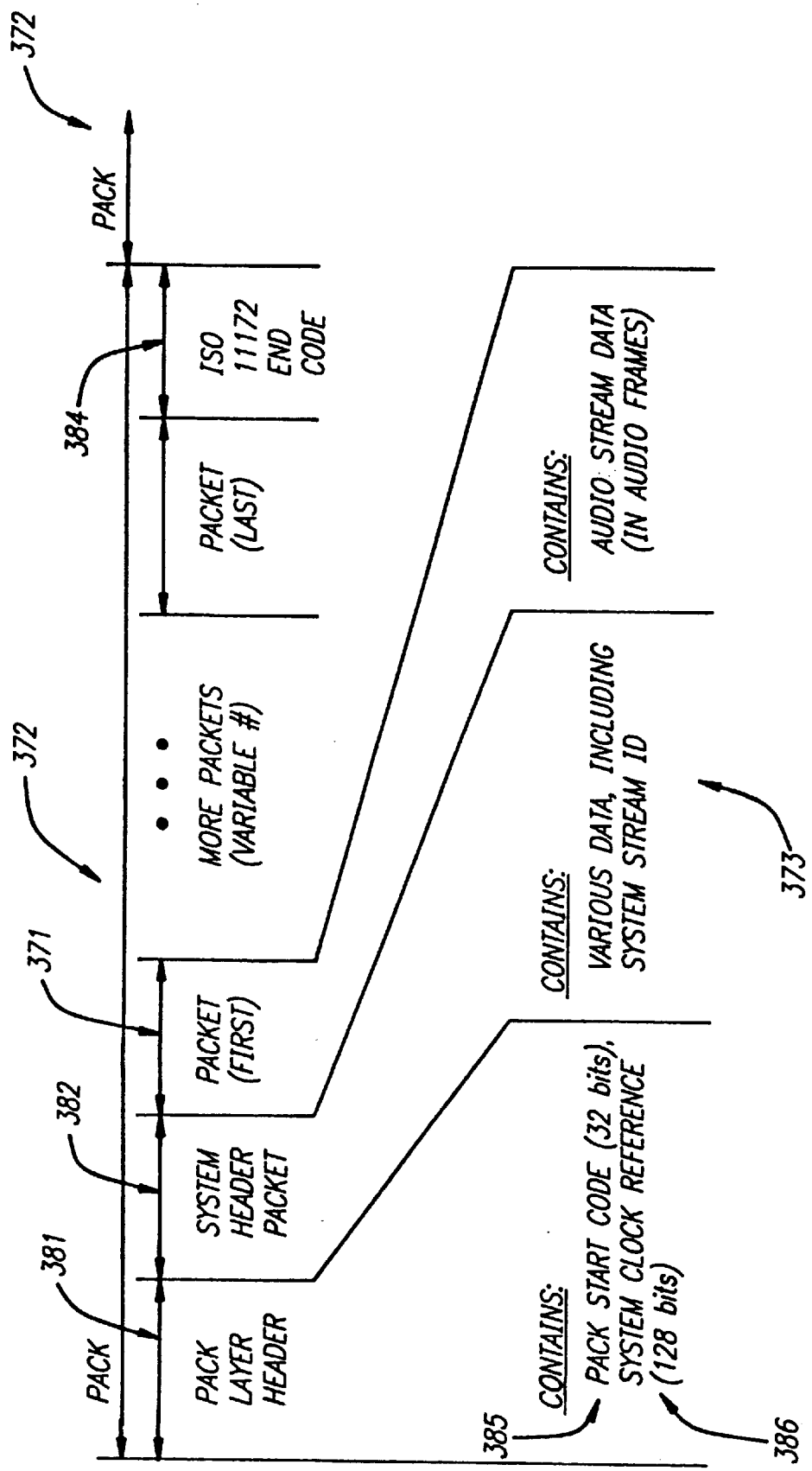
FIGS. 7, 8 and 9 are schematic diagrams depicting the structure of MPEG packet formats.
Figure 8:
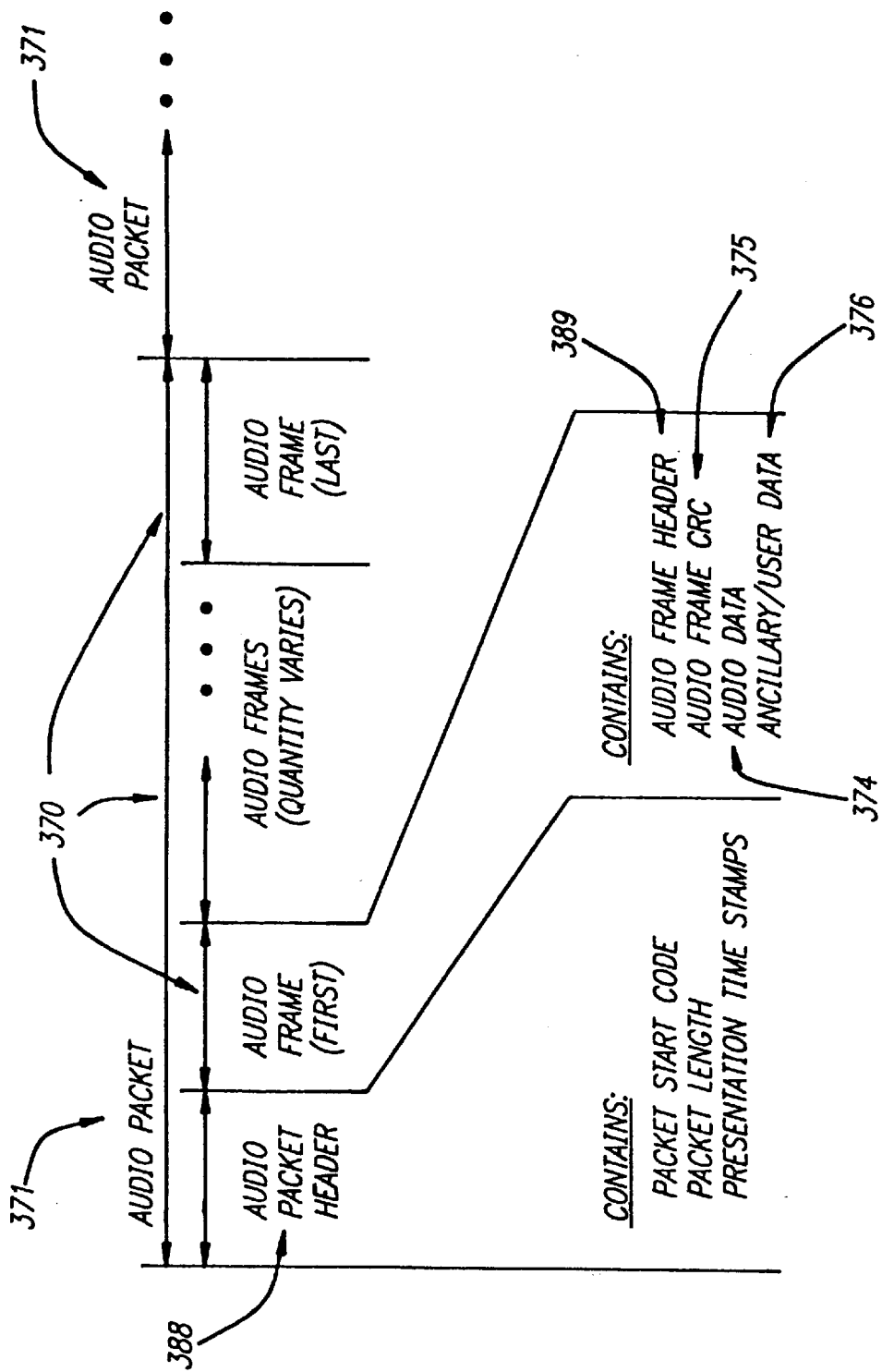
Figure 9:
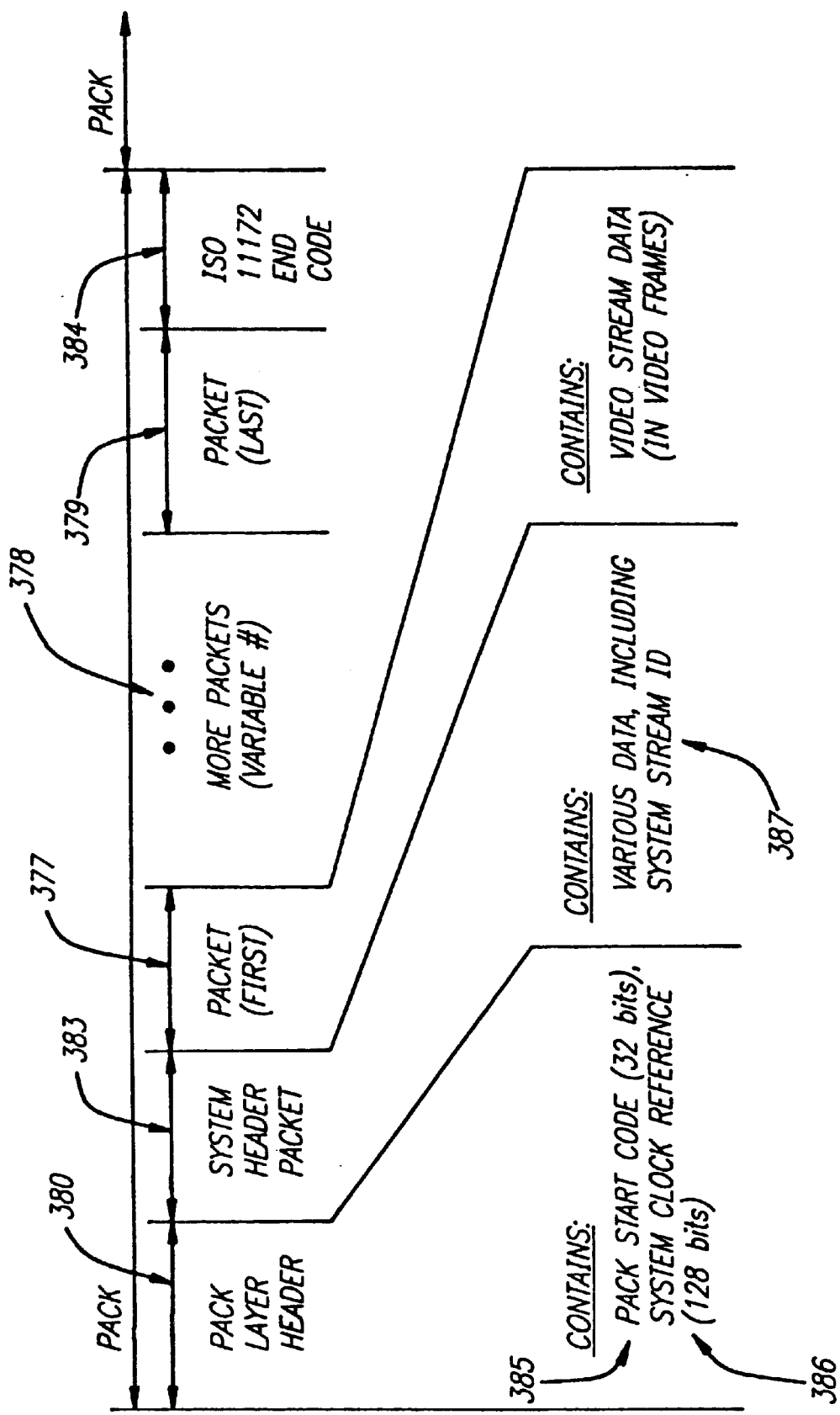

The process of encoding and decoding MPEG data may be explained with reference to FIGS. 7, 8 and 9.

MPEG is a standard for the representation of compressed audio and video signals. It allows for data interchange between compatible systems and standardized decoding methodologies. ISO CD 11172 defines formats for digital data streams for both video and audio. The ISO system stream format is designed to accommodate both audio packets and video packets within the same framework for transmission. Given an elementary stream of data (for audio data, this is called an audio stream), an MPEG encoder 329 first digitally compresses and codes the data. The MPEG algorithm offers a choice of levels of complexity and performance for this process.

Figure 15:
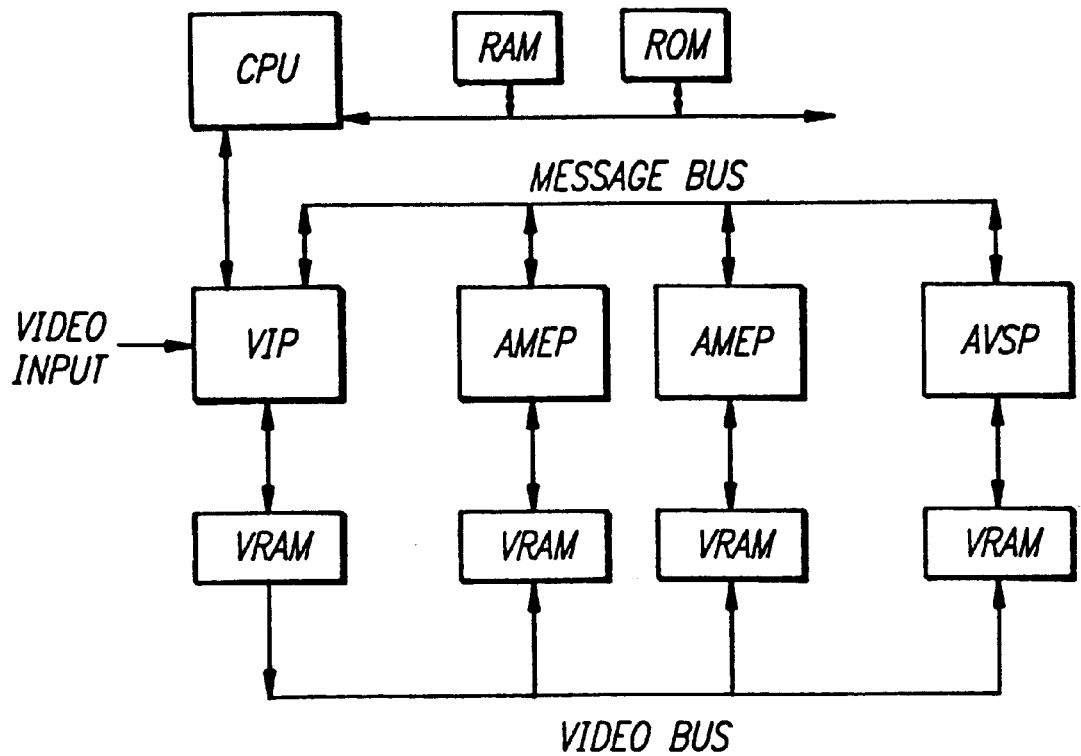
FIG. 15 is a block diagram depicting an MPEG encoder.

A suitable MPEG encoder is shown in FIG. 15. Additional details and description are contained in a document entitled "Introduction to the VISC Architecture," which is available from LSI Logic.

To prepare a stream 373 of compressed audio data for transmission, it is formatted into audio frames 370. Each audio frame 370 contains audio data 374, error-correction data 375, and optional user-defined ancillary data 376. The error correction data 375, referred to as the audio frame cyclic redundancy code (CRC) 375, contains a 16-bit checksum, which can be used to detect errors in the audio frame header 389. The audio frames 370 are then sent in packets 371 grouped within packs 372 in an ISO MPEG system stream 373.

The packs 372 in system streams 373 may contain a mix of audio packets 371 and video packets 378 for one or more channels. Packs 372 may contain packets 371 from separate elementary streams. MPEG can support multiple channels of program material, and a decoder 344 & 345 given access to a system stream 373 may access large numbers of channels.

Encoding a video signal is perhaps more complicated than encoding an audio signal. In order for a video signal to be compressed, it must be sampled, digitized, and represented by luminance and color difference signals (Y, Cr, and Cb). The MPEG standard stipulates that the luminance component (Y) be sampled with respect to the color difference signals (Cr and Cb) by a ratio of 2:1. That is, for every two samples of Y, there is to be one sub-sample each of Cr and Cb, because the human eye is much more sensitive to luminance (brightness) components than to color components. Video sampling takes place in both the vertical and horizontal directions. Once video is sampled, it is reformatted, if necessary, into a non-interlaced signal. An interlaced signal is one that contains only part of the picture content (every other horizontal line, for example) for each complete display scan.

After video is sampled and reformatted, an encoder may process it further to select an appropriate display window within the total image area and to convert it to a different resolution. The encoder must also choose which picture type to use. A picture corresponds to a single frame of motion video, or to a movie frame. There are three picture types:

1. Intra-coded pictures (I-pictures) are coded without reference to any other pictures;

2. Predictive-coded pictures (P-pictures) are coded using motion-compensated prediction from the past I- or P-reference pictures; and, 3. Bidirectionally predictive-coded pictures (B-pictures) are coded using motion compensation from a previous and a future I- or P-picture.

A typical coding scheme contains a mixture of I-, P-, and B-pictures. Typically, an I-picture may occur every half a second, to give reasonably fast random access, with two B-pictures inserted between each pair of I- or P-pictures.

Once the picture types have been defined, the encoder must estimate motion vectors for each 16×16 macroblock in the picture. A macroblock consists of a 16-pixel by 16-line section of luminance component and two spatially corresponding 8-pixel by 8-line sections, one for each chrominance component. Motion vectors give the displacement from the stored previous picture.

P-pictures use motion compensation to exploit temporal redundancy in the video. Motion within the pictures means that the pixels in the previous picture will be in a different position from the pixels in the current block, and the displacement is given by motion vectors encoded in the MPEG bitstream. Motion vectors define the motion of a macroblock, which is the motion of a 16×16 block of luminance pixels and the associated chrominance components.

When an encoder provides B-pictures, it must reorder the picture sequence so that the video decoder 344 operates properly. Because B-pictures use motion compensation based on previously sent I- or P-pictures, they can only be decoded after the referenced pictures have been sent.

As mentioned earlier, a macroblock is a 16×16 region of video, corresponding to 16 pixels in the horizontal direction and 16 display lines in the vertical direction. When sampling is performed by the video encoder, every luminance component of every pixel in the horizontal direction is captured, and every luminance component of every line in the vertical direction is captured. However, only every other Cb and Cr chrominance component is similarly captured. The result is a 16×16 block of luminance components and two 8×8 blocks each of Cr and Cb components. Each macroblock then consists of a total of six 8×8 blocks (four 8×8 luminance blocks, one 8×8 Cr block, and one 8×8 Cb block).

The spatial picture area covered by the four 8×8 blocks of luminance is the same area covered by the each of the 8×8 chrominance blocks. Since there are half as many chrominance samples needed to cover the same area, they fit into an 8×8 block instead of a 16×16 block.

For a given macroblock, the encoder must choose a coding mode. The coding mode depends on the picture type, the effectiveness of motion compensation in the particular region of the picture, and the nature of the signal within the block. After the coding method is selected, the encoder performs a motion-compensated prediction of the block contents based on past and/or future reference pictures. The encoder then produces an error signal by subtracting the prediction from the actual data in the current macroblock. The error signal is separated into 8×8 blocks (four luminance blocks and two chrominance blocks) and a discrete cosine transform (DCT) is performed on each 8×8 block. The DCT operation converts an 8×8 block of pixel values to an 8×8 matrix of horizontal and vertical spatial frequency coefficients. An 8×8 block of pixel values can be reconstructed by performing the inverse discrete cosine transform on the spatial frequency coefficients. In general, most of the energy is concentrated in the low frequency coefficients, which are located in the upper left corner of the transformed matrix.

Compression is achieved by a quantization step, where the quantization intervals are identified by an index. Since the encoder identifies the interval and not the exact value within the interval, the pixel values of the block reconstructed by the IDCT have reduced accuracy.

The DCT coefficient in location 0, 0 (upper left) of the block represents the zero horizontal and zero vertical frequencies and is known as the DC coefficient. The DC coefficient is proportional to the average pixel value of the 8×8 block. Additional compression is provided through predictive coding, since the difference in the average value of neighboring 8×8 blocks tends to be relatively small. The other coefficients represent one or more non-zero horizontal or non-zero vertical spatial frequencies, and are called AC coefficients. The quantization level of the coefficients corresponding to the higher spatial frequencies favors the creation of an AC coefficient of zero by choosing a quantization step size such that the human visual system is unlikely to perceive the loss of the particular spatial frequency unless the coefficient value lies above the particular quantization level. The statistical encoding of the expected runs of consecutive zero-valued coefficients of higher-order coefficients accounts for considerable compression gain.

In order to cluster non-zero coefficients early in the series and encode as many zero coefficients as possible following the last nonzero coefficient in the ordering, the coefficient sequence is specified to be a zigzag ordering. Zigzag ordering concentrates the highest spatial frequencies at the end of the series. Once zigzag ordering has been performed, the encoder performs run-length coding on the AC coefficients. This process reduces each 8×8 block of DCT coefficients to a number of events represented by a non-zero coefficient and the number of preceding zero coefficients. Because the high-frequency coefficients are more likely to be zero, run-length coding results in good video compression.

The encoder then performs variable-length coding (VLC) on the resulting data. VLC is a reversible procedure for coding that assigns shorter codewords to frequent events and longer codewords to less frequent events, thereby achieving video compression. Huffman encoding is a particularly well-known form of VLC that reduces the number of bits necessary to represent a data set without losing any information.

The final compressed video data is now ready to be transmitted to a storage device 343 for later retrieval and decompression by a video decoder 344 or over a transmission medium for reception and decompression by a remotely located decoder 344.

The MPEG standard specifies the syntax for a compressed bitstream. The video syntax contains six layers, each of which either supports a signal processing or system function. The layers and their functions are:

1. Sequence Layer—Random Access Unit: Context;
2. Group of Pictures Layer—Random Access Unit: Video;
3. Picture Layer—Primary Coding Unit;
4. Slice Layer—Resynchronization Unit;
5. Macroblock Layer—Motion Compensation Unit;
6. Block Layer—DCT Unit.

The MPEG syntax layers correspond to a hierarchical structure. A sequence is the top layer of the video coding hierarchy and consists of a header and some number of groups-of-pictures (GOPs). The sequence header initializes the state of the decoder, which allows the decoder to decode any sequence without being affected by past decoding history.

A GOP is a random access point, that is, it is the smallest coding unit that can be independently decoded within a sequence, and consists of a header and some number of pictures. The GOP header contains time and editing information. There are three types of pictures as explained earlier: (1) I-pictures; (2) P-pictures; and, (3) B-pictures. Because of the picture dependencies, the bitstream order (the order in which pictures are transmitted, stored, or retrieved), is not the display order, but rather the order in which the video decoder 344 requires the pictures in order to decode the bitstream.

Because the B-pictures depend on the subsequent I- or P-picture in display order, the I- or P-picture must be transmitted and decoded before the dependent B-pictures. Pictures consist of a header and one or more slices. The picture header contains time, picture type, and coding information. A slice provides some immunity to data corruption. Should the bitstream becomes unreadable within a picture, the decoder should be able to recover by waiting for the next slice, without having to drop an entire picture.

Slices consist of a header and one or more macroblocks. The slice header contains position and quantizer scale information. This is sufficient for recovery from local corruption. Blocks are the basic coding unit, and the DCT is applied at this block level. Each block contains 64 component pixels (picture elements) arranged in an 8×8 order. Pixel values are not individually coded, but are components of the coded block. A macroblock is the basic unit for motion compensation and quantizer scale changes. Each macroblock consists of a header and six component 8×8 blocks: four blocks of luminance, one block of Cb chrominance, and one block of Cr chrominance. The macroblock header contains quantizer scale and motion compensation information.

A macroblock contains a 16-pixel by 16-line section of luminance component and the spatially corresponding 8-pixel by 8-line section of each chrominance component. A skipped macroblock is one for which no DCT information is encoded. The picture area covered by the four blocks of luminance is the same as the area covered by each of the chrominance blocks, due to subsampling the chrominance information to model sensitivity of the human visual system. Each luminance pixel corresponds to one picture pixel, but because the chrominance information is subsampled with a 2:1 ratio both horizontally and vertically, each chrominance pixel corresponds to four picture pixels.

Figure 10:
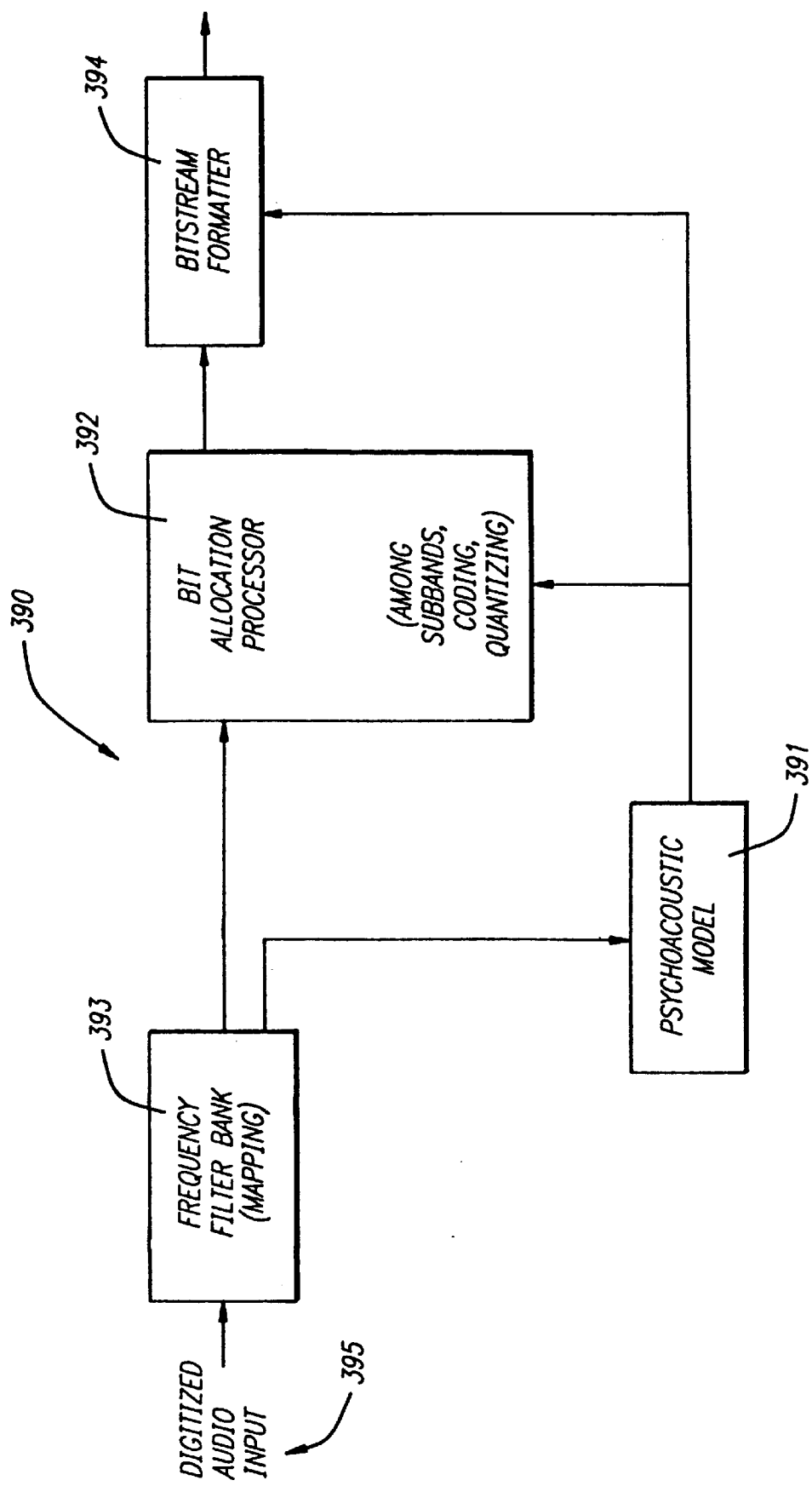
FIG. 10 depicts the general structure of an MPEG encoder.

The general structure of an MPEG encoder 390 is shown in FIG. 10. MPEG audio encoding is intended to efficiently represent a digitized audio stream 373 by removing redundant information from digitized audio input 395. The digitized audio input 395 is first passed through a frequency filter bank 393. Because different applications have different performance goals, MPEG uses different encoding techniques. These techniques, called "layers," provide different trade-offs between compression and signal quality. The MPEG encoder 390 uses two processes for removing redundant audio information: (1) a coding and quantization unit 392; and, (2) a psychoacoustic modelling unit 391. Coding and quantization are techniques that are applied to data 374 that has been mapped into the frequency domain and filtered into subbands by the frequency filter bank 393. The psychoacoustic modeling unit 391 determines the best allocation of data within the available data channel bandwidth based on human perception. The resultant compressed data is then assembled by a bitstream formatter 394 into the MPEG format.

On the receiving end, MPEG audio decoding involves: (1) identifying and removing a channel's audio frames 370 from the audio packets 371 in the system stream 373; (2) managing the temporary storage of frames 370; (3) applying appropriate algorithms for decoding the audio frames 370; (4) merging decoded audio frames 370 back into continuous audio; and, (5) limiting the effect of transmission errors. The audio decoder 345 produces decoded audio data 374 in an industry-standard Pulse Code Modulation (PCM) serial format, allowing the use of commodity parts, i.e., PCM D-to-A converters 349 for audio output.

An ISO system stream 373 contains this compressed data in a specified sequential format. The highest level MPEG system syntax is the ISO system stream 373. The system stream 373 is composed of a sequence of packs 372, as shown in FIGS. 7 and 9.

An MPEG pack 372 is composed of a pack layer header 380 & 381, a system header packet 382 & 383, a sequence of packets 372 & 378, and ends with an ISO 11172 end code 384. The pack layer header 380 & 381 contains a 32-bit pack start code 385 used for synchronization purposes, and a system clock reference or value 386. The system header packet 382 & 383 contains a variety of housekeeping data and in particular contains a system stream ID 387 used to differentiate multiple system streams. A sequence of one or more packets 371, 377, 378, 379 contains either encoded audio or encoded video stream data. The ISO 11172 end code 384 is the final element in an MPEG pack 372.

Any one MPEG packet 371, 378 carries either audio or video data, but not both simultaneously. An MPEG audio packet 371 contains an audio packet header 388 and one or more audio frames 370.

An audio packet header 388 contains the a packet start code which identifies it as an audio packet 371. The packet start code also contains a five-bit audio stream identifier that may be read by the user to identify the audio channel. The audio packet header 388 also contains an indication of the number of bytes remaining in the audio packet 371, and an optional presentation time stamp (PTS). The audio decoder 345 depicted herein makes the PTS data available to the user through registers.

An audio frame 370 contains a slice of the audio data stream 373 together with some supplementary data. Audio frames 370 include an audio frame header 389.

The audio frame header 389 has a sync word data field of 12 bits which has a fixed value of 0×FFF. The decoder 345 uses the sync word to synchronize with the data stream. The audio frame header 389 has a 1-bit ID data field. The decoder 345 uses the ID field to identify whether the data is MPEG coded or not. The audio frame header 389 includes a 2-bit "layer type" data field which defines whether data is encoded as Layer I, II, or III.

The audio frame header 389 has a protection bit, i.e., a CRC is included in the data stream. In addition, the audio frame header 389 has a 4-bit "bitrate index" that defines an index into a table defining the bit rate. A 2-bit data field identifying the sampling frequency is included. A 1-bit padding bit adds additional bytes to an audio frame 370 to match the sample rate to the bit rate.

The audio frame header 389 has includes a private bit which is a user definable spare bit. The next two bits identify whether the channel data is stereo, joint stereo, dual channel, or monaural.

A 2-bit mode extension field is used only in joint stereo mode to indicate joint stereo subbands. A 1-bit field flags whether the data stream contains copyrighted material. The next 1-bit field is called the "original/home" field, and indicates whether this data stream is an original or a copy. The final 2-bit field, called the "emphasis" field, indicates the type of de-emphasis to be used.

The structure of video packets 377 is similar.

The LSI Logic L64111 MPEG audio decoder 345 is a single-chip solution that performs all MPEG-1 audio layer I and II decoding operations in real time. The L64111 MPEG audio decoder 345 is a single LSI component combining an ISO 11172 MPEG system stream decoder and an MPEG audio decoder. The L64111 audio decoder 345 can be used in a stand-alone configuration. Examples of applications include digital cable decoders, CD players, digital VCRs, digital direct-broadcast satellite decoders, laser disk players, CD-ROM players, and workstations.

V. Additional Disclosure

Figure 45:
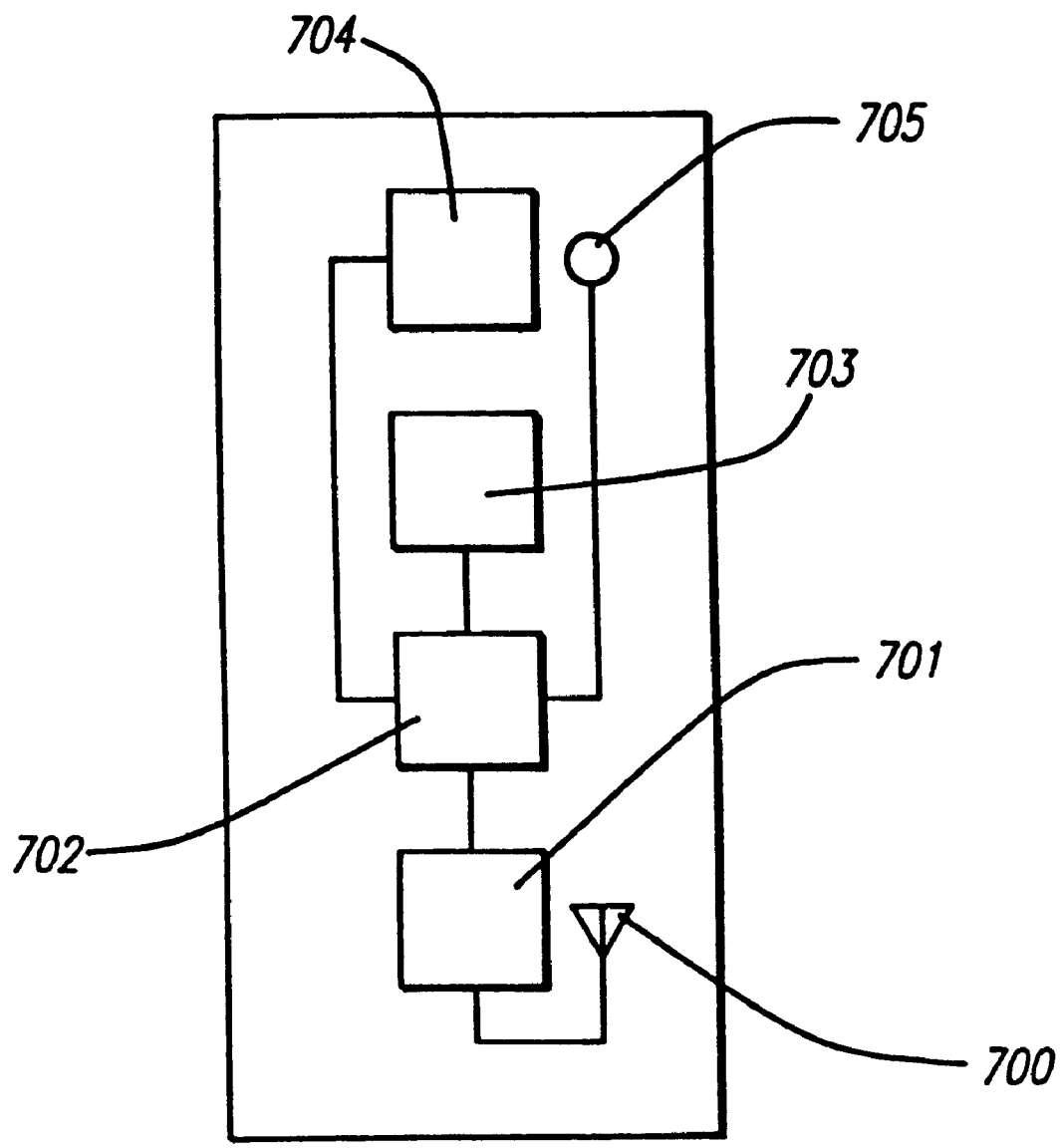
FIG. 45 depicts a wireless network apparatus for use in connection with a transport device.

FIG. 45 depicts embodiment of a wireless device which may be networked for the wireless transmission and reception of audio and video information. The device incorporates a transceiver 701 coupled to an antenna 700. The transceiver 701 preferably operates at VHF, UHF or microwave frequencies, and the dimensions of the antenna 700 may be very small. The transceiver 701 is coupled to a processor controller 702 which may comprise the structure 300 shown in FIG. 2. The digital video network apparatus 702 is coupled to an audio input/output 703 such as a microphone and speaker, which may be combined. It is also coupled to a video display 704 and a video camera 705.

A preferred use of the device shown in FIG. 45 is for a transport device such as an automobile, airplane, bus, boat, space shuttle/rocket, etc. The device depicted in FIG. 45 provides wireless network video display which may be utilized to display a map or traffic information to a user in the transport device, televisions entertainment, current stock information or news, etc. In addition, the device shown in FIG. 45 may be used to transmit video and/or audio and/or data to a network. The transceiver 701 may be suitable for use in a cellular telephone environment.

Suitable process technology for producing a single chip embodiment of the invention is disclosed in U.S. Pat. No. 5,358,886, the entire disclosure of which is incorporated herein by reference, and in application Ser. No. 08/086,217, filed Jul. 1, 1993, the entire disclosure of which is incorporated herein by reference. 0.35-micron CMOS ASIC technology may be used for this purpose. Alternatively, a flip chip die-to-die configuration may be employed, such as is disclosed in application Ser. No. 07/975,185, filed Nov. 12, 1992, by Michael D. Rostoker, the entire disclosure of which is incorporated herein by reference.

In one embodiment, the compression/decompression decoder/encoder circuits have been described as MPEG audio and video compression and decompression circuits for compressing the huge amount of data in digitized images and motion video into compact data streams that can be moved across networks with bandwidths otherwise too narrow to handle them. For example, circuits for decoding an MPEG2 video bitstream as defined in CD13818-2, with operation up to 15 MBits/sec, CCIR601 resolution, and I, P, and B frames, may be used. Resolution of 720×480 pixels at 30 frames per second for NTSC television display format and 720×576 pixels at 25 frames per second for PAL television display format may be achieved in the example described herein. Using the full MPEG2 capabilities of I, P and B frame/field structure to maximize data reduction, CCIR601 resolution only requires a DRAM of 16 MBits in the illustrated embodiment. If B frames are not used, 8 MBits of DRAM will suffice. Alternatively, circuits for decoding an MPEG1 bitstream as defined in DIS11172-2 may be used. Audio decoder circuits compliant with ISO MPEG IS11172-1 may be used. In the illustrated embodiment, two channels of audio data are decoded, including mono, dual, stereo and joint stereo modes, at rates of 384 Kbits/sec.

Circuitry useful in a cable or satellite set top decoder system is disclosed in a document entitled "L6404 MPEG-2, DC2, MUSICAM, AC3 Audio/Video Decoder" (Sep. 20, 1994) available from LSI Logic. Additional disclosure is contained in the manual entitled "MPEG-2 Transport Demultiplexer" (Aug. 15, 1994) and the manual entitled "L64706 Variable Rate QPSK Digital Demodulator" (Jun. 13, 1994) both which are available from LSI Logic.

In embodiments of the invention where Viterbi Decoding is desired, a Viterbi Decoder may be used such as that described in the manual entitled "L64707 Viterbi Decoder" (Jan. 25, 1994) available from LSI Logic.

Other circuits may also be employed. For example, the Joint Photographics Experts Group (JPEG) standard for still-image compression could be implemented in the compression/decompression decoder/encoder circuits. For example, the JPEG DIS 10918-1 standard may be used. The CCITT/ISO H.261 "P×64 video conferencing" standard could be implemented in the compression/decompression decoder/encoder circuits.

Alternative embodiments are disclosed in the "L64702 JPEG Coprocessor Technical Manual" (July 1993) available from LSI Logic. Additional disclosure appears in "JVieW (JPEG Video in a Window) Evaluation Kit User's Guide" (July 1993) and "JPEG Video-Rate BitBuster™ 700 Evaluation Board Installation Guide" (April 1993) both of which are available from LSI Logic.

A system to which the present invention generally relates is disclosed in U.S. Pat. No. 5,229,994, entitled "BRIDGE FOR CONNECTING AN IEEE 802.3 LOCAL AREA NETWORK TO AN ASYNCHRONOUS TIME-DIVISION MULTIPLEX TELECOMMUNICATION NETWORK", issued Jul. 20, 1993, to J. Balzano et al.

EXAMPLES

In this example, an LSI L64112 display controller was programmed for use with MPEG digital video. In this case, the various parameters were set according to the NTSC-M television display format standard assuming a clock rate of 27 MHz and a full 720×480 picture size. This example also allows for one line of auxiliary (AUX) data at line 21 during the vertical blanking interrupt.

The required parameters for NTSC-M television display format (720×480) are set up by programming the horizontal timing parameters, vertical timing parameters, and video output mode parameters as shown in Table 1, Table 2, and Table 3, respectively.

TABLE 1

Horizontal Timing Parameters

| Parameters | Required Value | Programmable Variable Values | Group:Register | Register Content (Decimal) |
|---|---|---|---|---|
| Half-line Time | 31.78 µs | HalfL = 858 | 7:23 [7:0] | 90 |
| Horizontal Sync Width | 4.77 µs | HorSW = 129 | 7:24 [6:5] | 3 |
| Equalization Pulse Width | 2.38 µs | EqPW = 64 | 7:19 [7:0] | 129 |
| Serration Pulse Width | 27.01 µs | SerPW = 729 | 7:20 [7:0] | 217 |
|  |  |  | 7:24 [1:0] | 2 |
| Horizontal Blank Width | 9.53 µs | HozBW = 253 | 7:21[7:0] | 253 |
|  |  |  | 7:24 [2] | 0 |
| Active Image Width | 52.44 µs | ActID = 815 | 7:22[7:0] | 47 |
|  |  |  | 7:24 [4:3] | 3 |

TABLE 2

Vertical Timing Parameters (per field)

| Parameter | Quantity per Field | Programmable Variable Values | Content Group:Register | Register (Decimal) |
|---|---|---|---|---|
| Pre-equalization Halflines | 3 H | PreEq = 6 | 7:25[7:5] | 6 |
| Serration Halflines | 3 H | Serr = 6 | 7:26[7:5] | 6 |
| Post-equalization Halflines | 3 H | PstEq = 6 | 7:27[7:5] | 6 |

TABLE 2-continued

Vertical Timing Parameters (per field)

| Parameter | Quantity per Field | Programmable Variable Values | Content Group:Register | Register (Decimal) |
|---|---|---|---|---|
| Vertical Blanking | 21 H | PrBlk = 20 | 7:25[4:0] | 20 |
|  |  | PsBlk = 1 | 7:27[4:0] | 1 |
| VBI Data at LIne 21 | 1 H | AuxLn = 1 | 6:31[7:0] | 1 |
| Main Picture Lines | 240 H | MainLn = 30 | 7:26[4:0] | 30 |
|  |  |  | 7:24[7] | 0 |

TABLE 3

Video Ouput Mode Parameters

| Parameter | Group:Register | Register Bit(s) | Bit Value | Meaning |
|---|---|---|---|---|
| Pan-scan Quarter Pel | 7:30 | 7:6 | 00 | Move Picture by 0 Pixels |
| 8-bit Output | 7:30 | 5 | 0 | 8-bit Output Mode Disabled[1] |
| 16-bit Output | 7:30 | 4 | 0 | 16-bit Output Mode Disabled |
| Output Rate | 7:30 | 3:2 | 00 | Full-rate Pixel Clock |
| Cr Before Cb | 7:30 | 1 | 0 | Cb before Cr |
| SMPTE 125 Mode | 7:30 | 0 | 0 | SMPTE 125 Mode Disabled (SAV or EAV Codes Not Inserted) |
| Interlaced Display | 7:31 | 7 | 1 | Interlaced Display |
| Chroma LIne Repeat | 7:31 | 6 | 0 | Chroma Line Repeat Disabled (Chroma Field Repeat) |
| Insert Halfline Delay | 7:31 | 5 | 1 | Half-line Delay Enabled |
| BLANK Active Low | 7:31 | 4 | 1 | BLANK Active Low Enabled |
| SYNC Active Low | 7:31 | 3 | 1 | SYNC Active Low Enabled |
| Composite SYNC | 7:31 | 2 | 0 | Composite SYNC Disabled |
| Master Mode | 7:31 | 1 | 1 | L64112 is Master |

[1]If both the 8-bit and 16-bit parameters are set to zero, the 24-bit output mode is enabled.

To program the L64112 display controller with the above parameters, a specific sequence was followed when writing to the registers within the L64112. The presettable auto-incrementing address pointer, located at address zero from the host's perspective, was written with the number of the desired register that was next to be written. It does not matter at this point which register group the register belongs to. Next, the host wrote the desired value at the address of the desired register group. Because the address pointer already contained the register number, the value was written into the proper register of the group. For example, to write the value 110111012 to register 31 of group seven, the value 31 is first written into address zero (the address pointer). Next, the value 110111012 is written to address seven. A sequence of write operations which were used to program a L64112 display controller with the parameters of Table 1, Table 2, and Table 3 is shown as Table 9.4, on page 9-6, of the "L64112 Digital TV MPEG Decoder Technical Manual" (November 1993) mentioned above.

What is claimed is:

1. A digital network system for accommodating a plurality of network protocols comprising:

a backbone bus for communicating digital information;

a first switching interface unit coupled to the backbone bus having at least one port connected to a first network for transferring digital information in a first network protocol, wherein the first switching interface comprises:

an a synchronous transfer mode (ATM) segmentation and assembly unit connected to the fist memory;

an ATM transmission convergence unit connected to the ATM segmentation and assembly unit; and a synchronous optical network/synchronous digital hierarchy (SONET/SDH) framer unit connected to the ATM transmission convergence unit for connecting to the first network;

a second switching interface unit coupled to the backbone bus having at least one port connected to a second network for transferring digital information in a second network protocol, wherein the second switching interface unit comprises an Ethernet media access controller (MAC) unit connected to the second memory and a Manchester encoder/decoder (ENDEC) unit for connecting to the second network;

a first memory coupled to the backbone bus and to the first switching interface for storing digital information to be transferred from the first switching interface unit to the second switching interface unit via the backbone bus;

a second memory coupled to the backbone bus and to the second switching interface for storing digital information to be transferred from the second switching interface unit to the first switching interface unit via the backbone bus; and a controller coupled to the backbone bus for controlling the transfer of digital information from the first switching interface unit to the second switching interface unit;

the first switching interface unit and the first memory being formed on a single substrate; and the second switching interface unit and the second memory being formed on a single substrate.

* * * * *